US011006000B2

(12) United States Patent
Kahn

(10) Patent No.: US 11,006,000 B2
(45) Date of Patent: *May 11, 2021

(54) SYSTEM AND METHOD FOR VERIFYING TELEPHONE NUMBERS

(71) Applicant: NAN90 LLC, West Orange, NJ (US)

(72) Inventor: Ari Kahn, Mount Shasta, CA (US)

(73) Assignee: NAN90 LLC, West Orange, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/937,984

(22) Filed: Jul. 24, 2020

(65) Prior Publication Data

US 2020/0358906 A1     Nov. 12, 2020

Related U.S. Application Data

(63) Continuation of application No. 15/859,734, filed on Jan. 1, 2018, now Pat. No. 10,728,395, which is a (Continued)

(51) Int. Cl.
*H04M 7/00* (2006.01)
*H04L 29/06* (2006.01)
(Continued)

(52) U.S. Cl.
CPC ........ *H04M 7/006* (2013.01); *H04L 65/1073* (2013.01); *H04M 3/4228* (2013.01); (Continued)

(58) Field of Classification Search
CPC ............ H04L 65/1073; H04M 7/0075; H04M 3/4228; H04M 7/128; H04M 7/006
(Continued)

(56) References Cited

U.S. PATENT DOCUMENTS 7,978,685 B1   7/2011   Reams
8,462,920 B2   6/2013   Gonen et al.
(Continued)

FOREIGN PATENT DOCUMENTS

WO      2010071400 A2   10/2010

*Primary Examiner* — Christopher R Crompton
(74) *Attorney, Agent, or Firm* — Greenberg Traurig, LLP

(57) ABSTRACT

Programmatically reversing numerical line identity presented at a communications services gateway into named IP Telephony users with "prior association", delivers dynamic "reverse address resolution" switching connections from ground to cloud, permitting any conventional telephone to dial and connect to any associated IP Telephony endpoint in the world, without changes to the conventional telephone. Reversing line identity into associated named users bridges both the addressability and economic divide between mass conventional "paying" (mobile and fixed) and "free". IP Telephony networks. A system for supporting communications between a user on an IP-addressed-communications-device and a telephony subscriber device, the telephony subscriber device having a corresponding telephone number, includes: one or more service nodes configured to: receive from the user the telephone number of the telephony subscriber device and create an association from the telephone number to the user, wherein the association allows the telephony subscriber device to connect to the user.

20 Claims, 48 Drawing Sheets

Related U.S. Application Data continuation of application No. 15/044,060, filed on Feb. 15, 2016, now Pat. No. 9,860,387, which is a continuation of application No. 13/978,537, filed as application No. PCT/IB2012/050096 on Jan. 9, 2012, now Pat. No. 9,264,552.

(60) Provisional application No. 61/430,865, filed on Jan. 7, 2011.

(51) Int. Cl.
    *H04M 3/42*     (2006.01)
    *H04M 7/12*     (2006.01)

(52) U.S. Cl.
    CPC ......... *H04M 7/0075* (2013.01); *H04M 7/128* (2013.01); *H04M 3/42229* (2013.01); *H04M 2203/6072* (2013.01); *H04M 2203/6081* (2013.01); *H04M 2207/20* (2013.01)

(58) Field of Classification Search
    USPC ......................................................... 370/352
    See application file for complete search history.

(56) References Cited

U.S. PATENT DOCUMENTS

| | | | |
|---|---|---|---|
| 8,472,612 B1 * | 6/2013 | Goringe | H04M 3/5231 |
| | | | 379/266.01 |
| 8,793,490 B1 | 7/2014 | Szwalbenest | |
| 9,338,287 B1 | 5/2016 | Russo | |
| 2012/0079075 A1 * | 3/2012 | Glenn | G06F 1/1656 |
| | | | 709/218 |
| 2012/0099714 A1 * | 4/2012 | Hodge | H04M 3/2281 |
| | | | 379/88.16 |
| 2012/0124656 A1 | 5/2012 | Senac | |
| 2012/0149350 A1 * | 6/2012 | Fan | H04M 3/02 |
| | | | 455/418 |
| 2016/0165446 A1 | 6/2016 | Russo | |
| 2020/0265425 A1 * | 8/2020 | Mohsenzadeh | G06Q 20/3821 |

\* cited by examiner

FIG.2
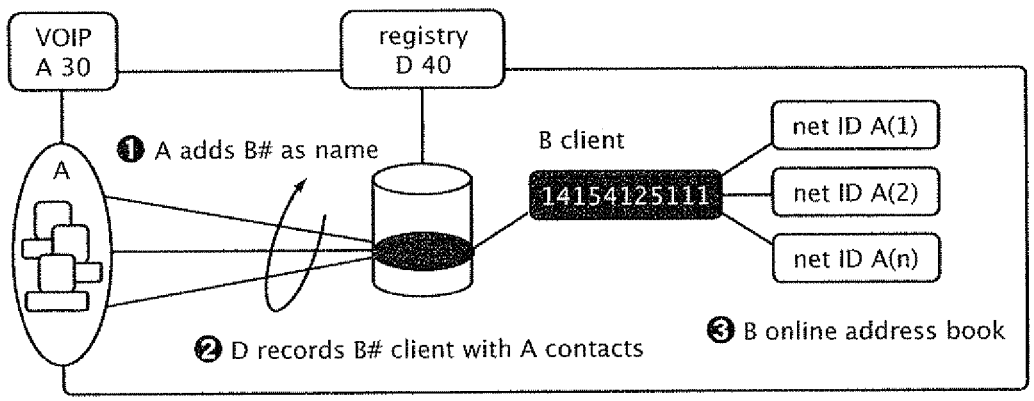
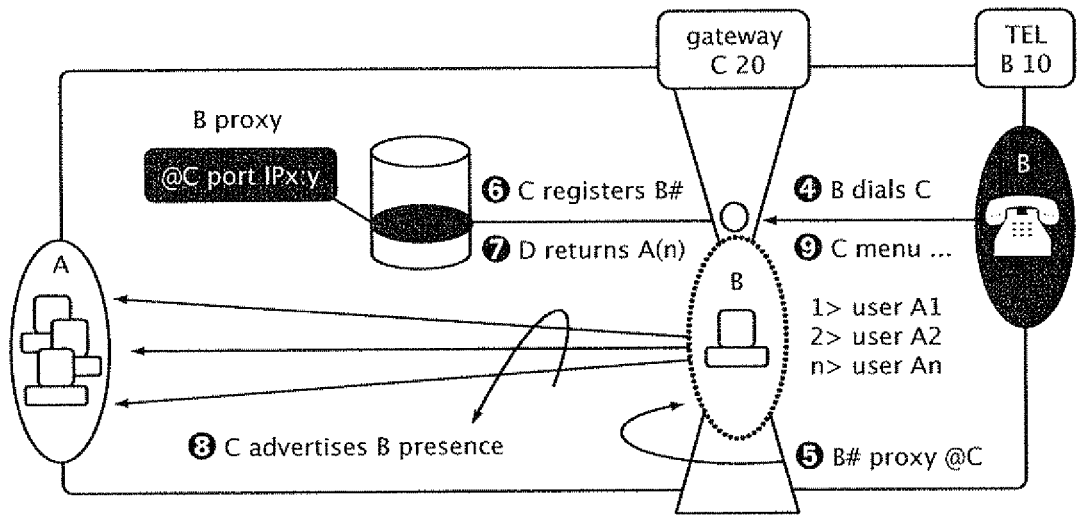
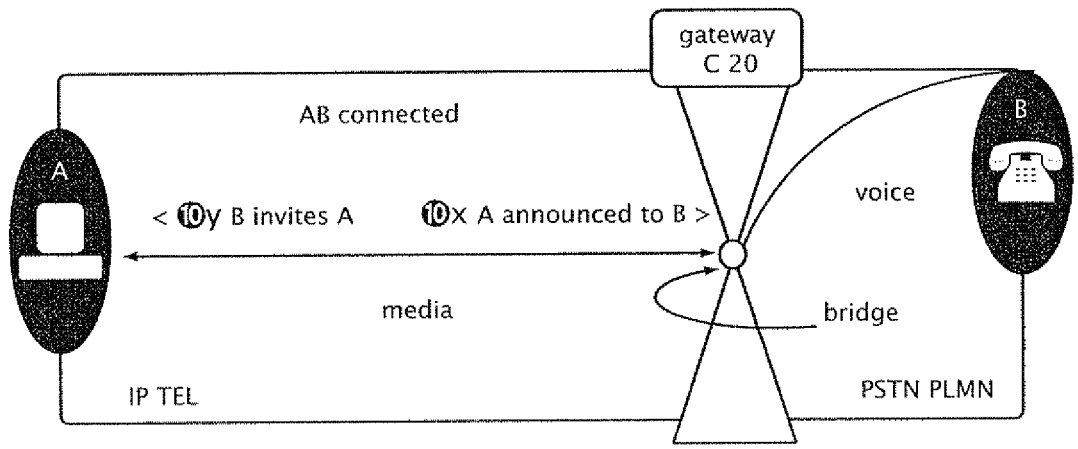

FIG.3
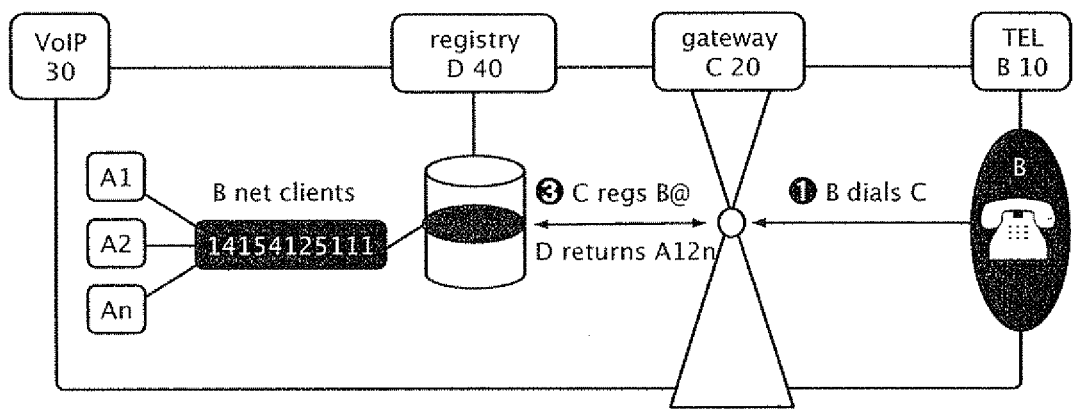
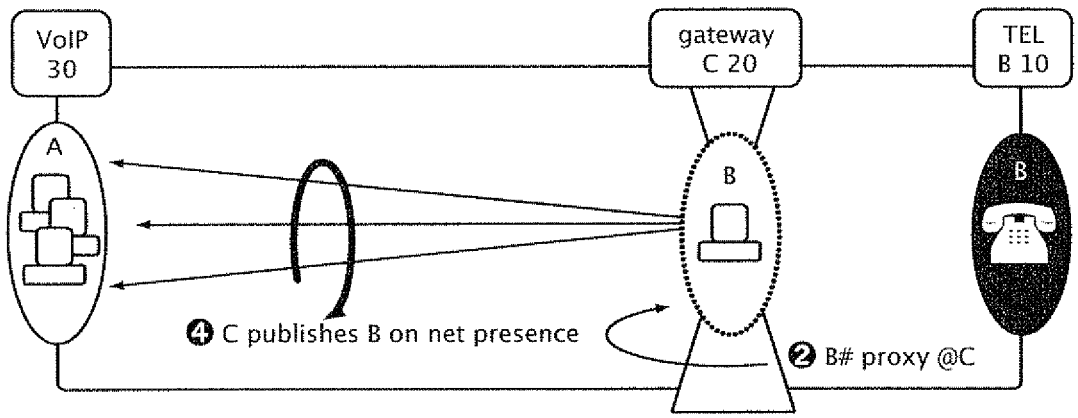
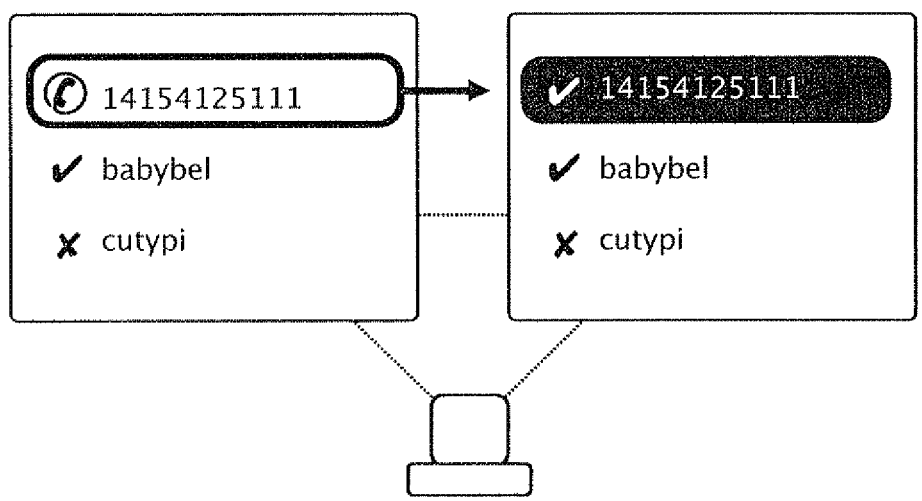

FIG.4
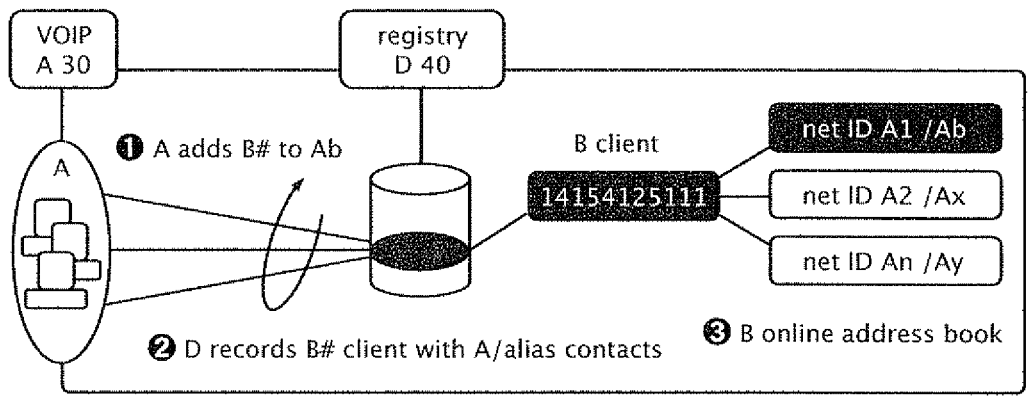
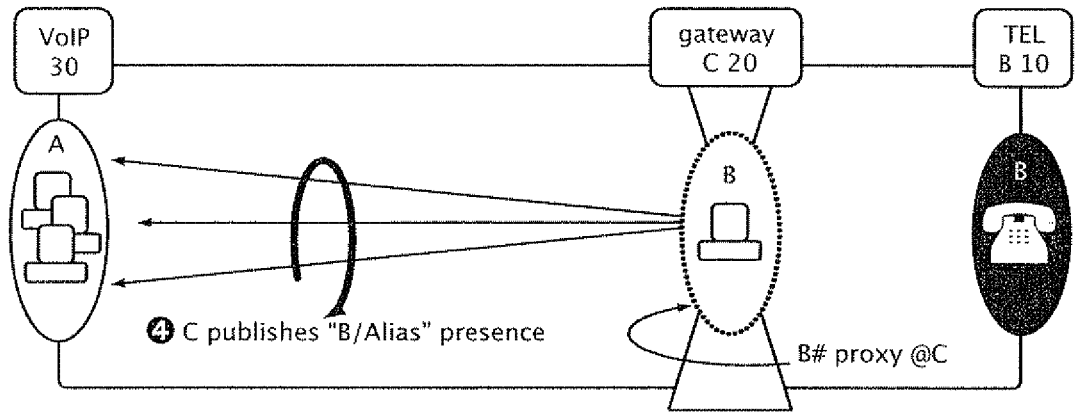
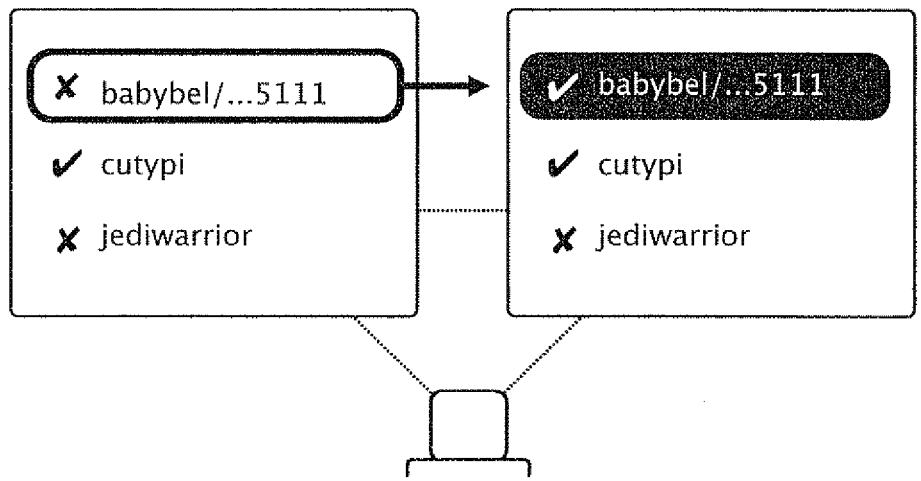

FIG.15
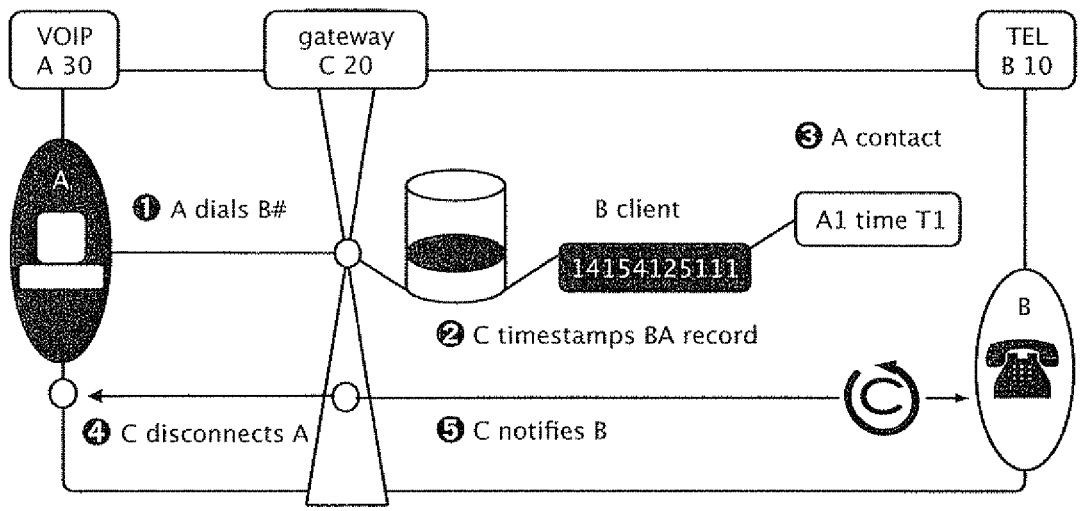
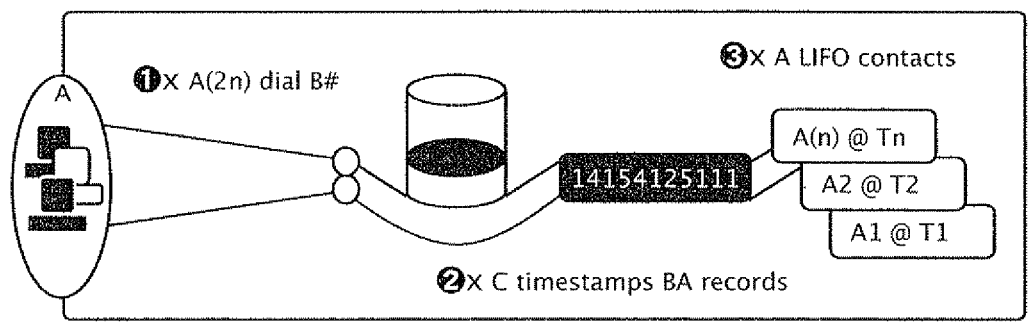
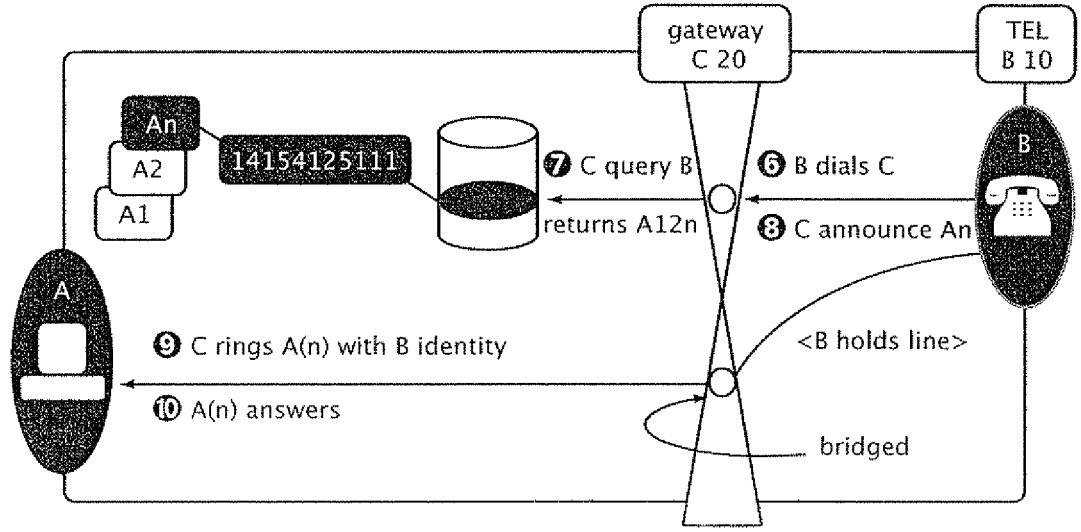

FIG.18
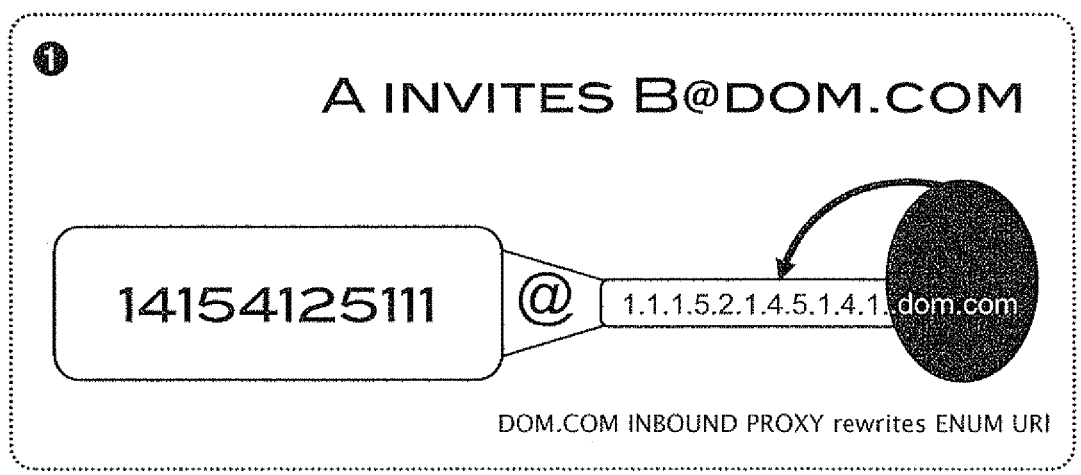
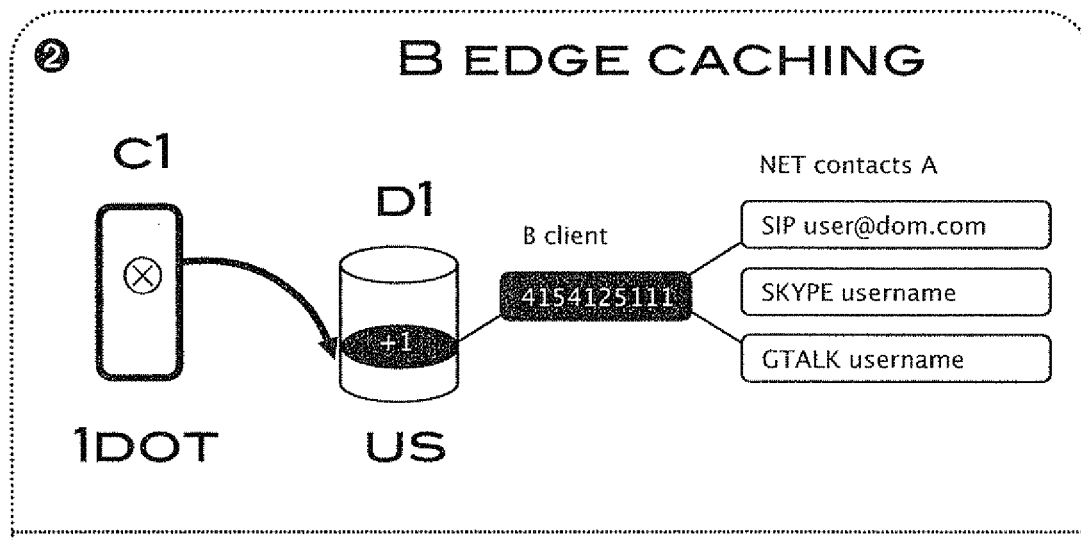
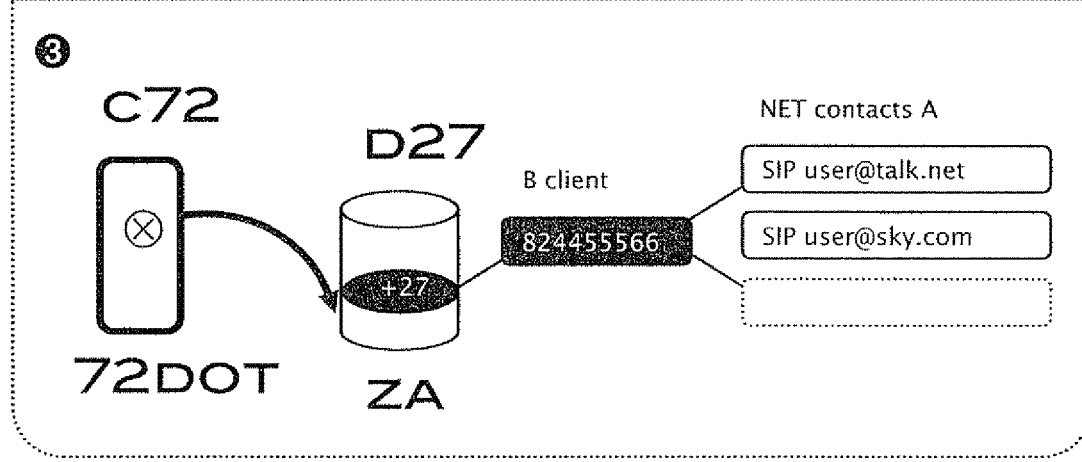

FIG.19
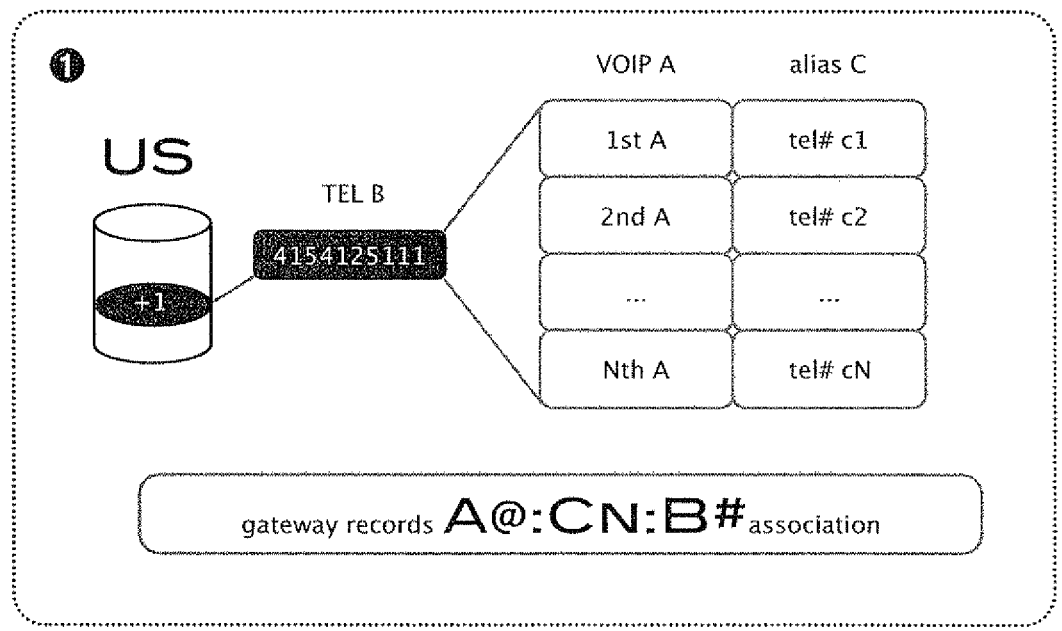
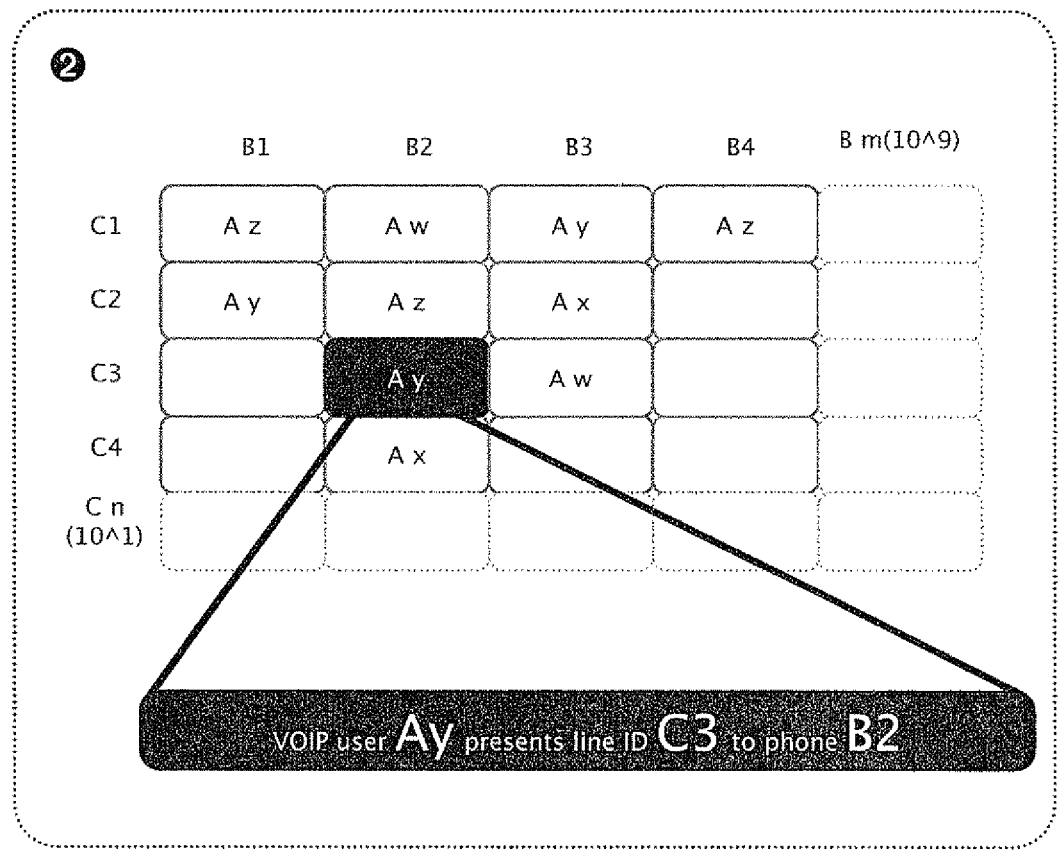

FIG.22
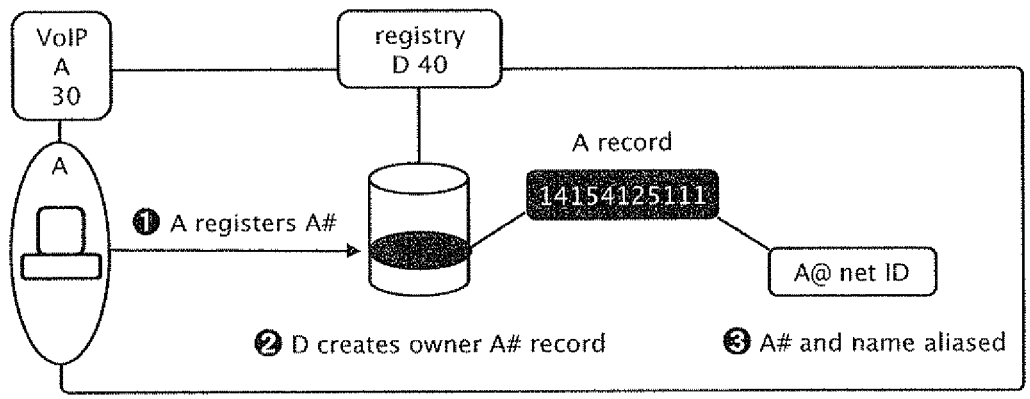
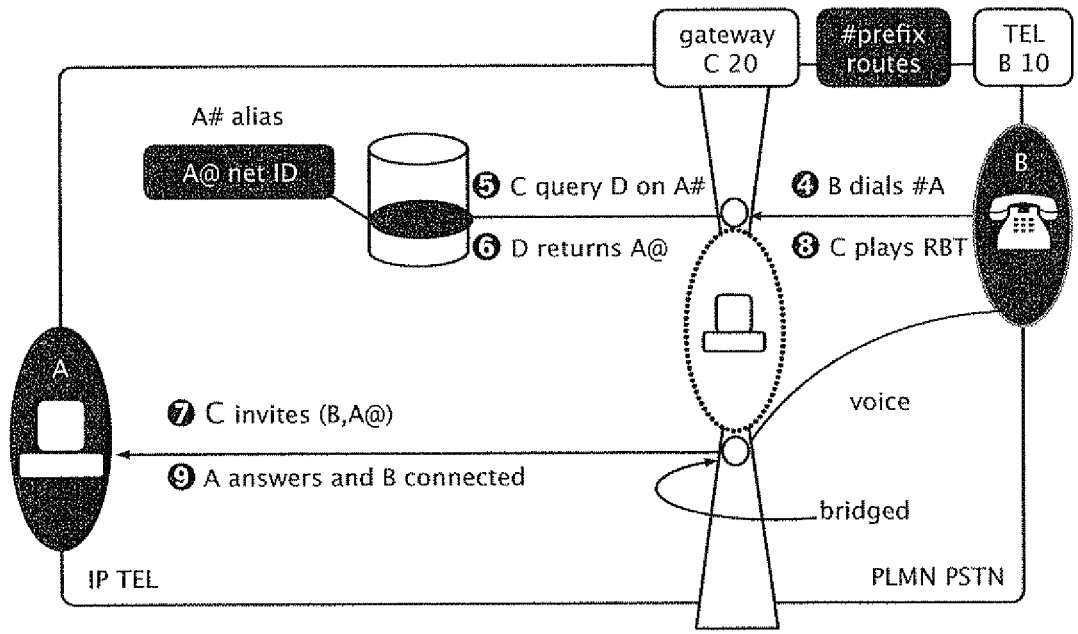

FIG.29
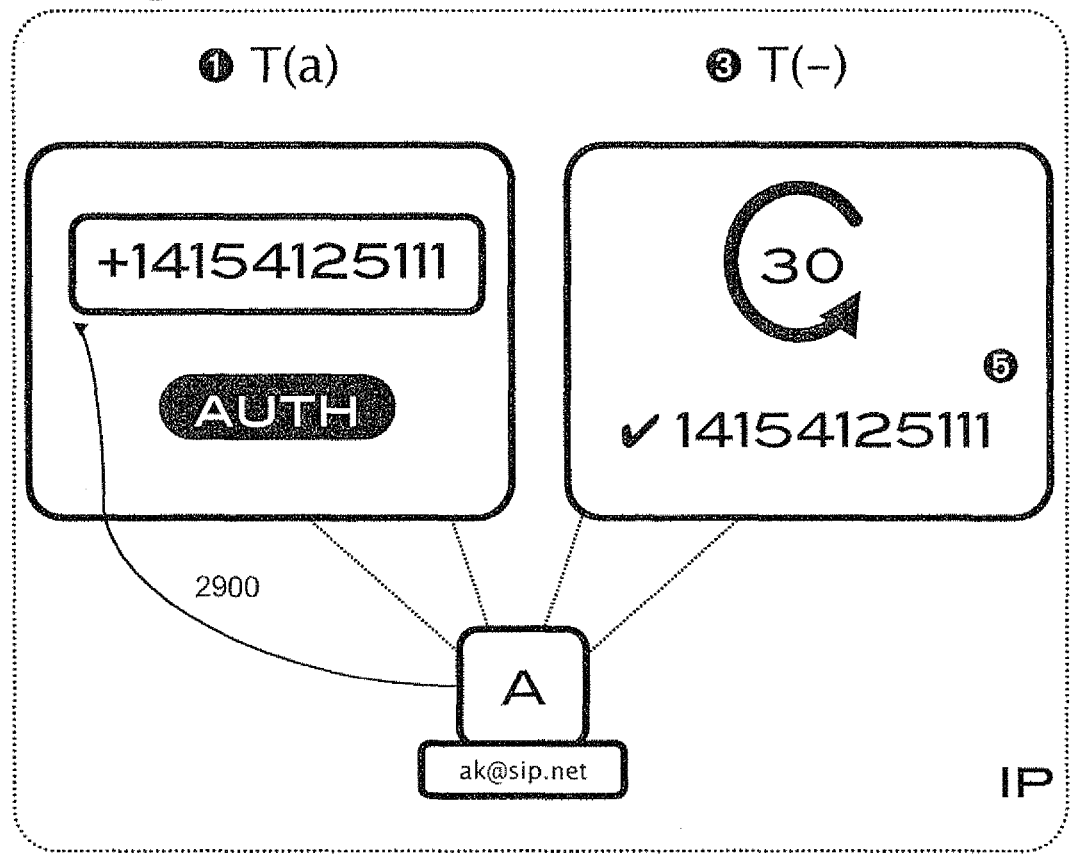
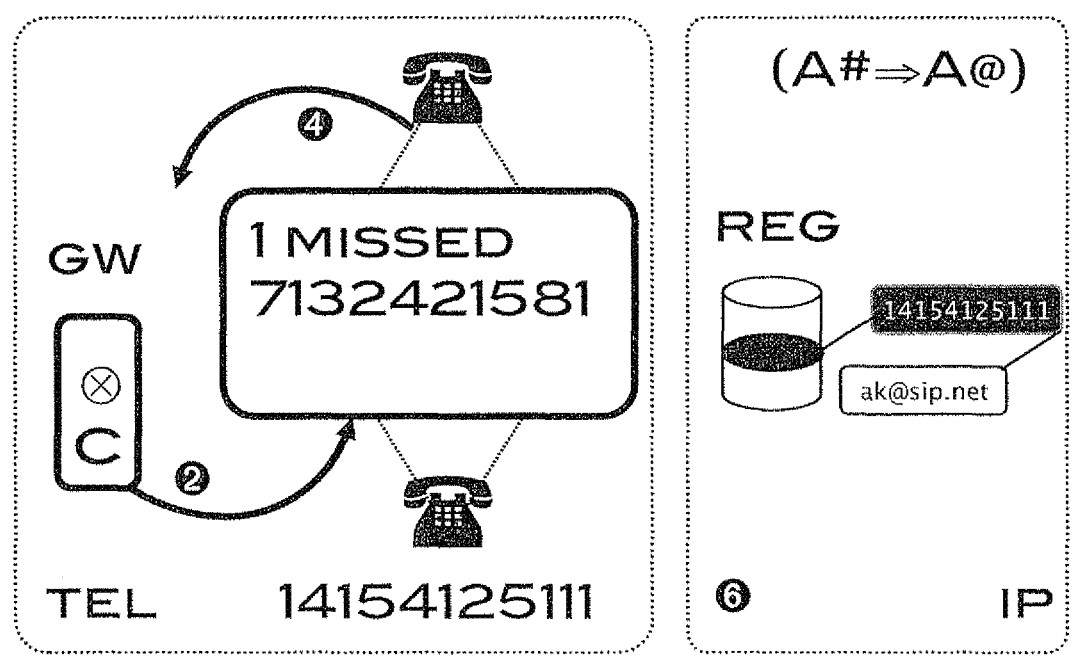

FIG.30
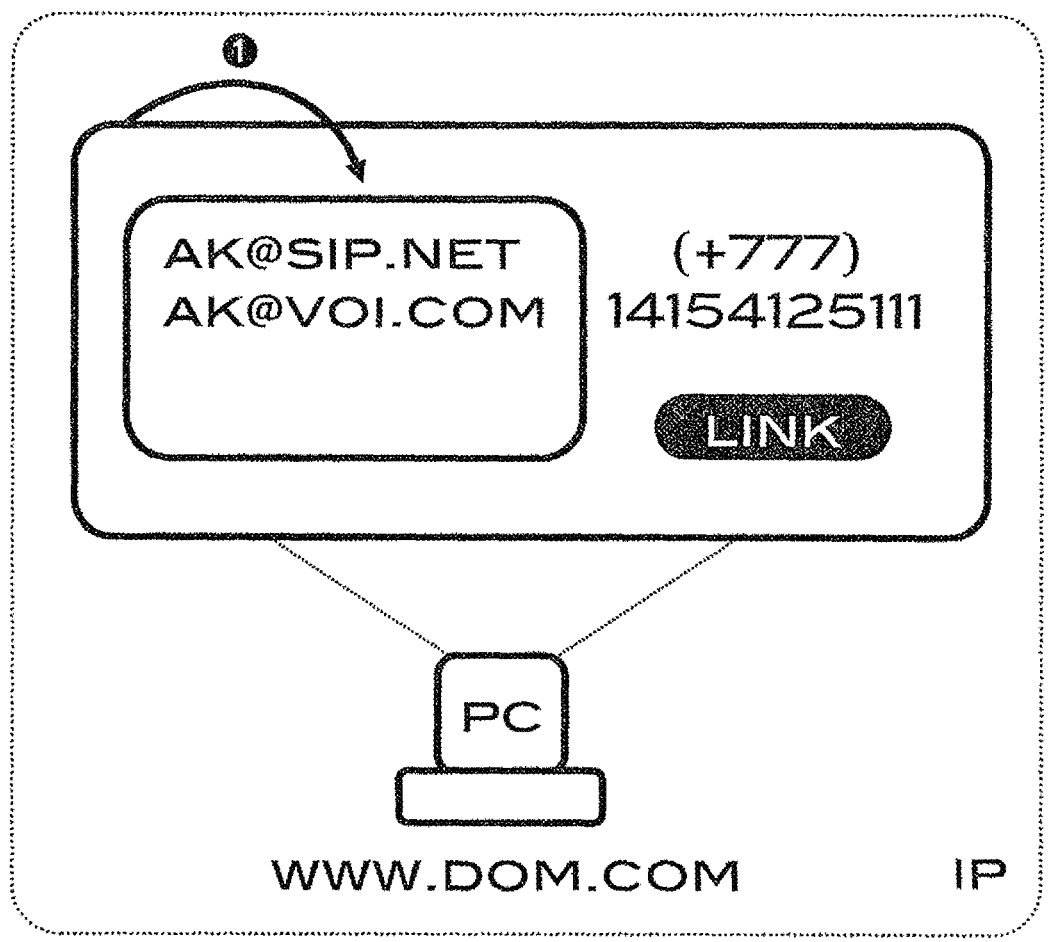
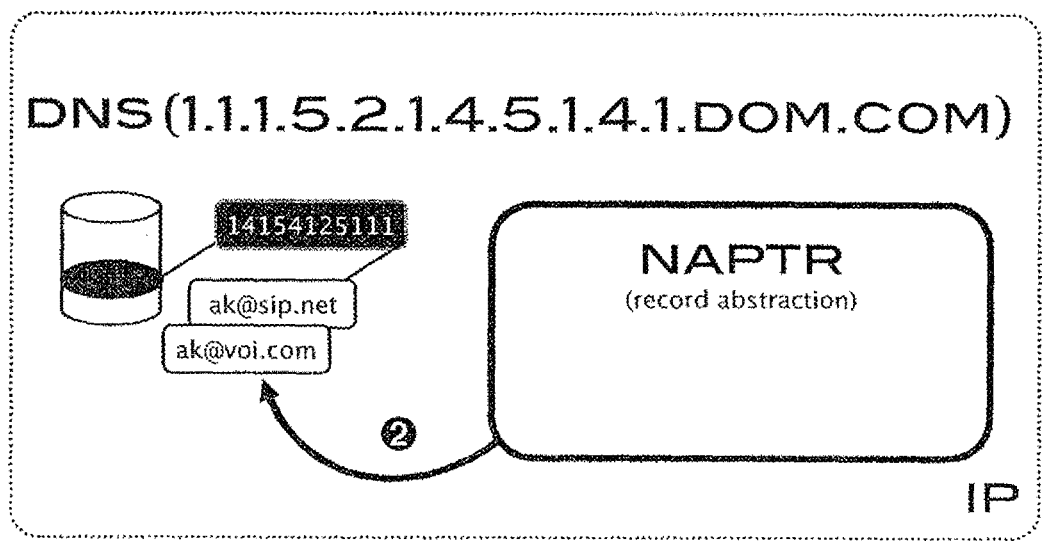

FIG.31
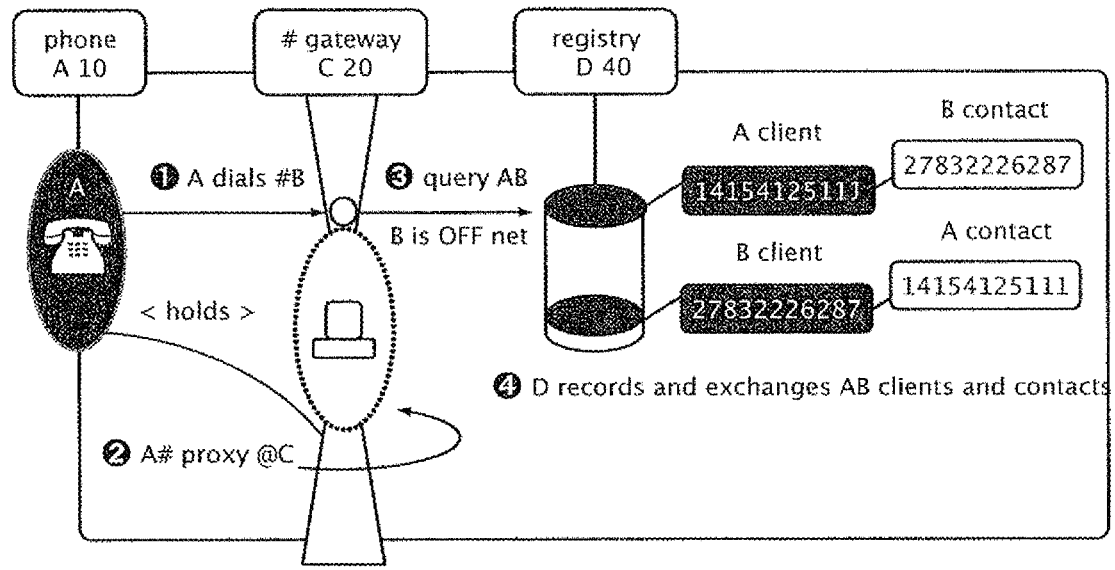
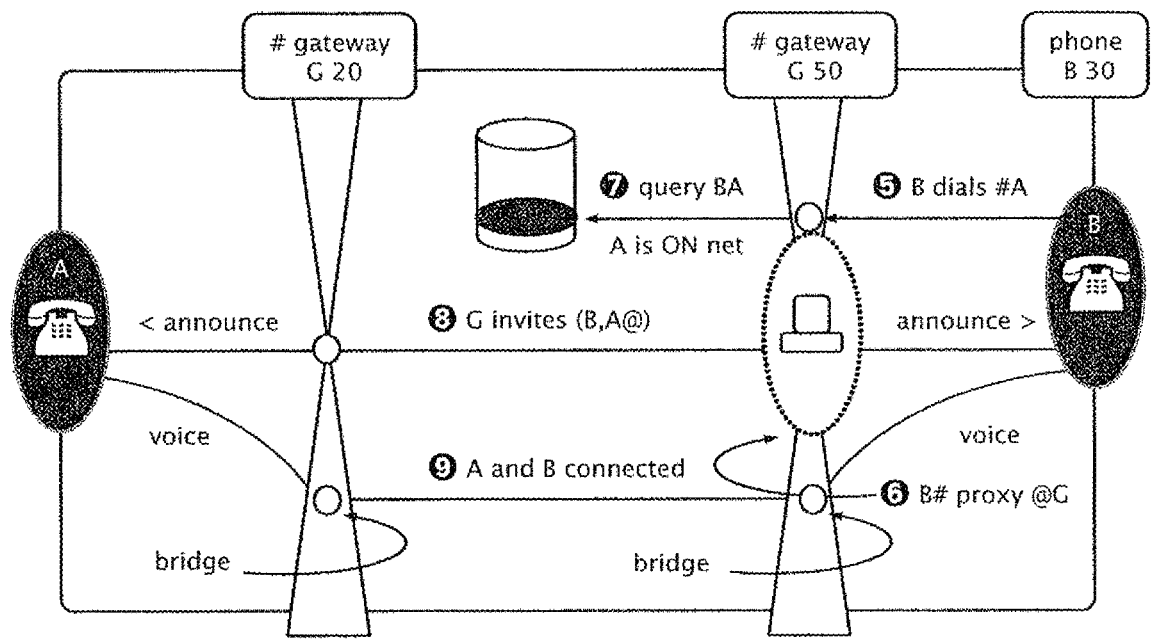

FIG.32
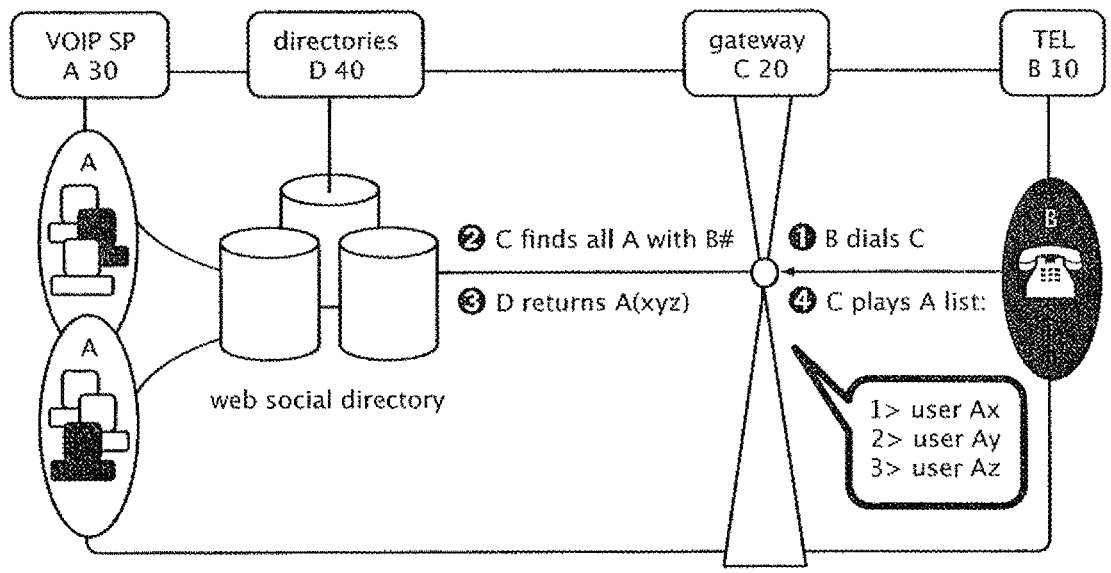
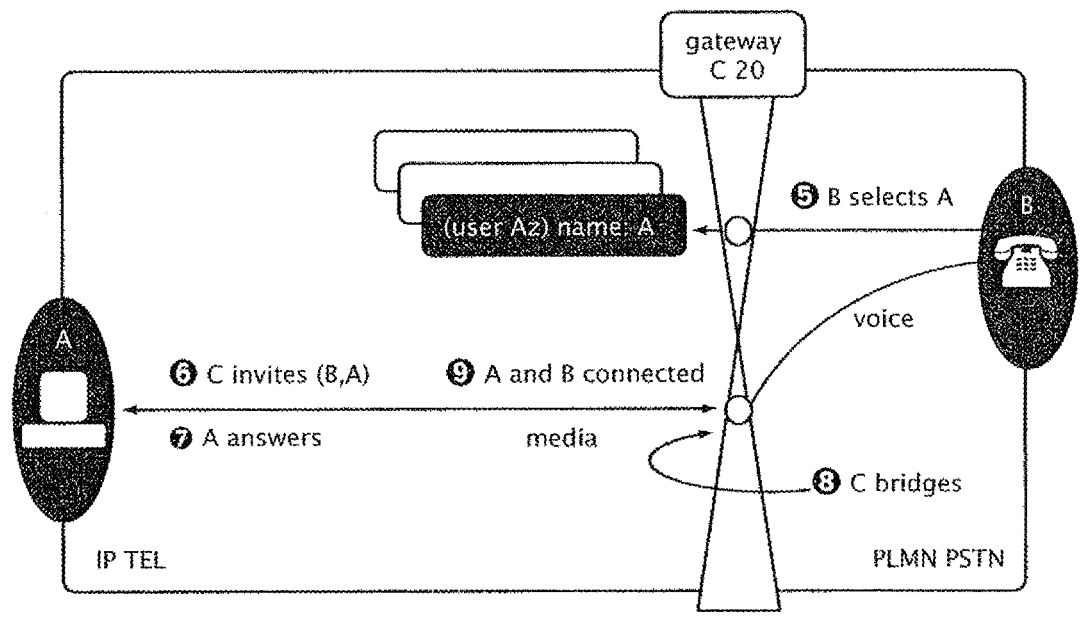

FIG.33
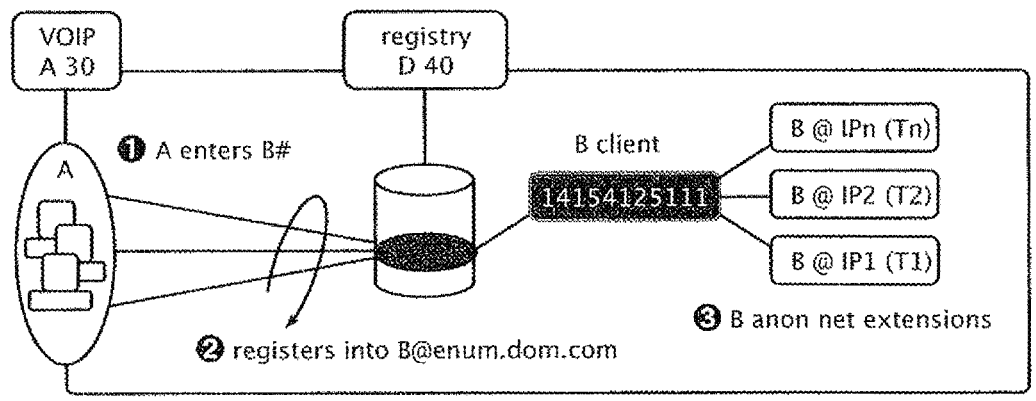
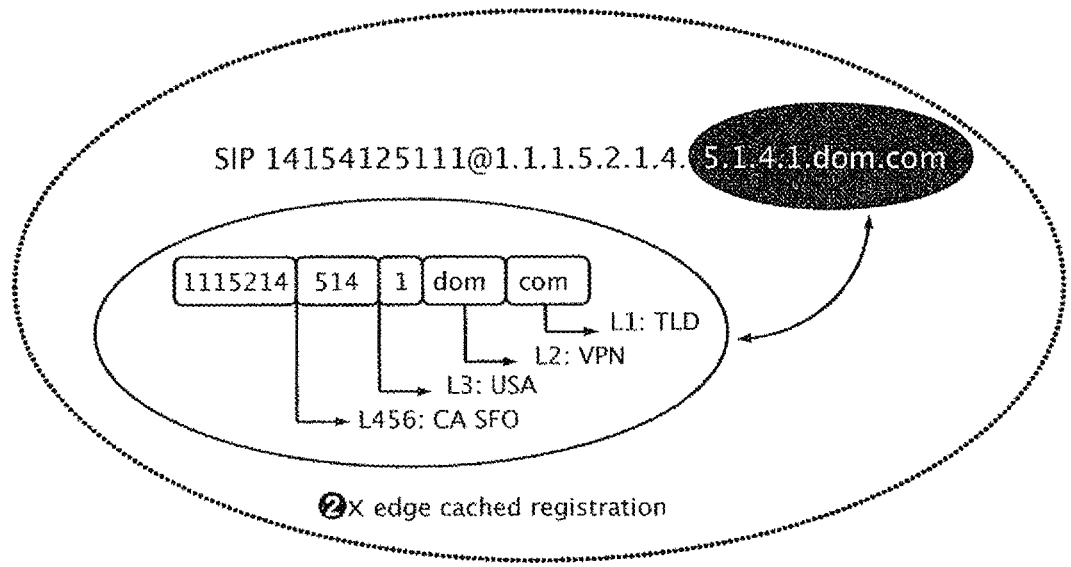
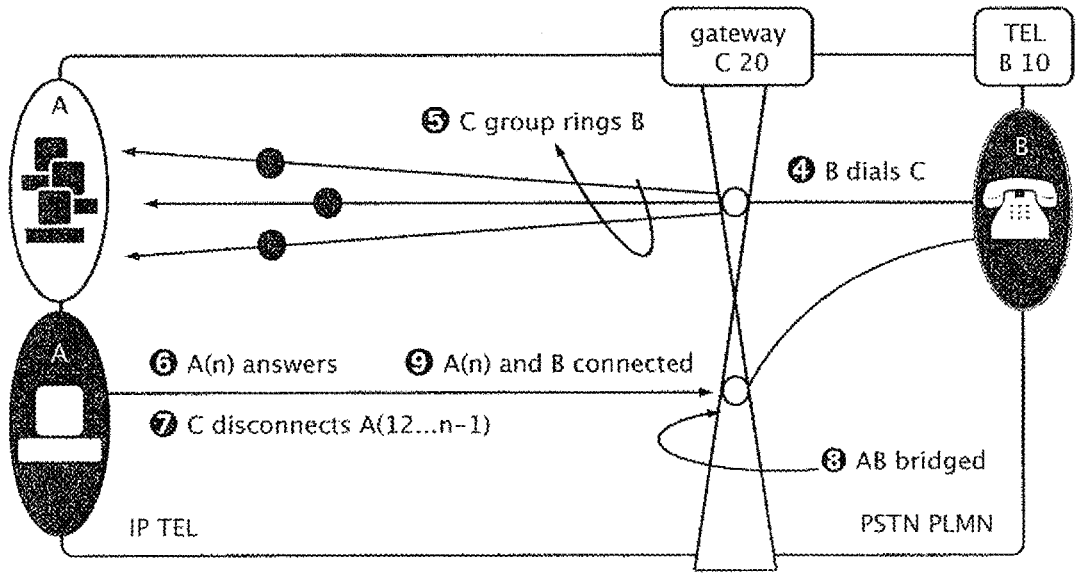

FIG.35

Converging Technology

NET: +DOWNL +REG −PAY
CELL: −DOWNL −REG +PAY

= "ZERO SUM GAME"

Converging Culture

NET: +DOWNL +REG
CELL: +PAY

= + + + ("TRIPLE WIN")

BEHAVIORAL ECONOMICS

INTERCONNECT

FIG.37
PRICE ELASTICITY
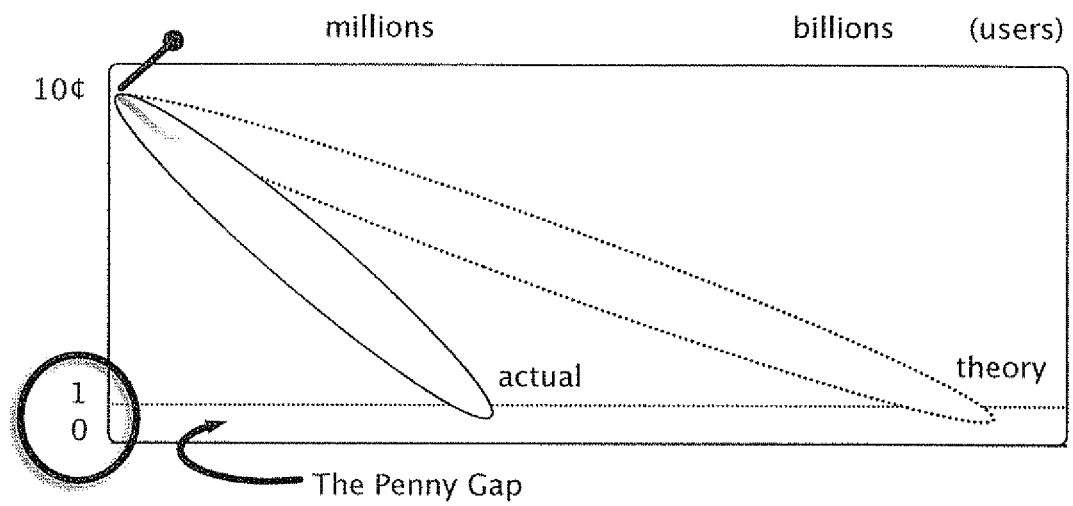
PENNY GAP (VERTICAL)
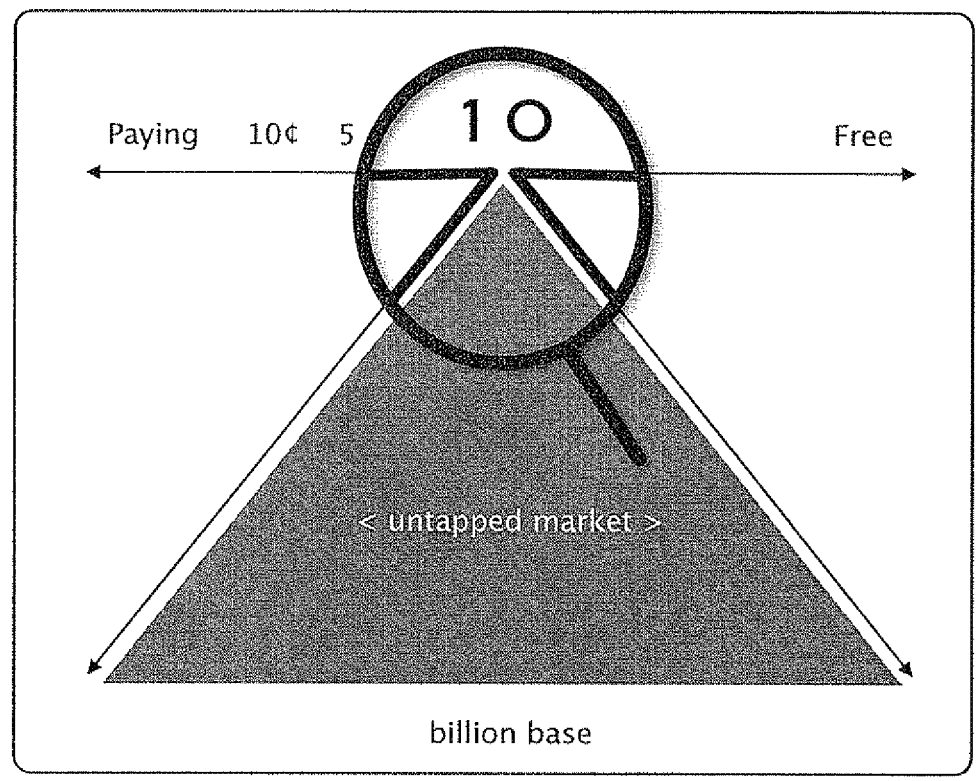

PARABOLIC SOCIAL GEOMETRY

FIG.42
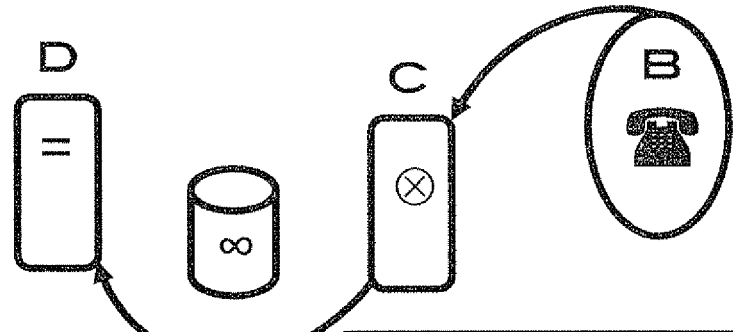
O ZONE DELEGATION
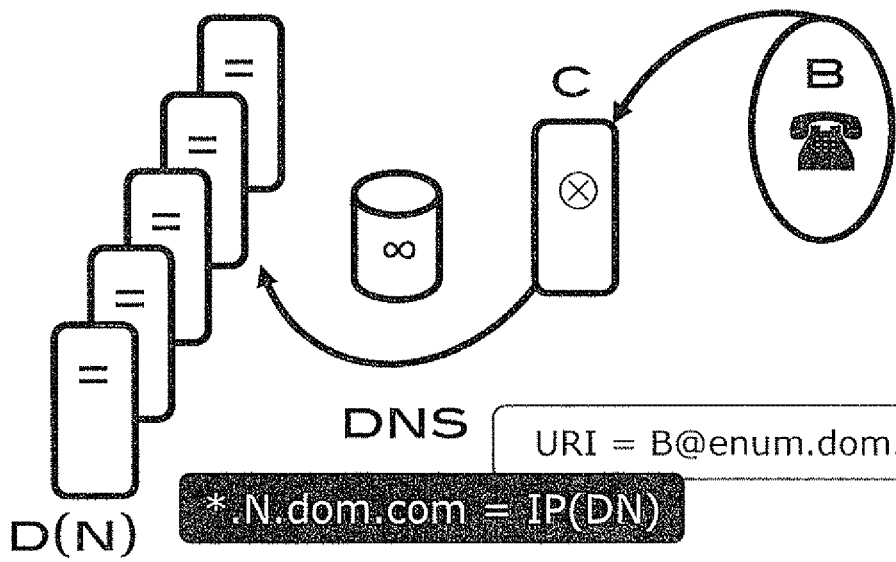
N ZONE DELEGATION

FIG.43

DNS A RECORDS

A: *.frisb.com          > IPx0 wildcards undefined regions

A: *.1.frisb.com        > IPx1 points to US disc server
A: *.7.2.frisb.com      > IPx2 points to ZA disc server
A: *.4.4.frisb.com      > IPx4 points to UK disc server
A: *.1.6.frisb.com      > IPx6 points to AU disc server
A: *.2.7.9.frisb.com    > IPx9 points to IL disc server

GRANULARITY

A: *.5.1.4.1.frisb.com   > IPw points to US SFO disc server
A: *.2.1.2.1.frisb.com   > IPx points to US NYC disc server A: *.3.8.7.2.frisb.com   > IPy points to MTN ZA disc server
A: *.2.8.7.2.frisb.com   > IPz points to VC ZA disc server

SYSTEM AND METHOD FOR VERIFYING TELEPHONE NUMBERS

CROSS-REFERENCE TO RELATED APPLICATIONS

This application is a continuation of U.S. patent application Ser. No. 15/859,734, filed Jan. 1, 2018, which is a continuation of U.S. patent application Ser. No. 15/044,060, filed Feb. 15, 2016, now U.S. Pat. No. 9,860,387, which is a continuation of U.S. patent application Ser. No. 13/978,537, filed Jul. 7, 2013, now U.S. Pat. No. 9,264,552, which is a national phase application of International Application No. PCT/IB2012/050096, which claims the benefit of U.S. Provisional Application No. 61/430,865, filed Jan. 7, 2011, all of which are incorporated by reference herein their entirety.

TECHNICAL FIELD

This disclosure relates to telephony services on a network, and more particularly to Fixed, Mobile and IP telecommunications interworking.

BACKGROUND

Conventional Telephone Systems identify and address users with decimal numbers geographically mapped on the E164 dial plan. As such the archetypal telephone equipment and interface presents a numeric dial pad. Next Generation Networks, exemplified by Voice Over Internet Protocols (VOIP) register and identify its end users "by name rather than number".

Conventional Telephones typically cannot dial the user address of an Internet Client using known methods. While Internet users can easily enter phone numbers and thus readily address conventional telephones, the caveat in calling "off net" to Fixed and Mobile telephones, is that calling "off net" often incurs a terminating penalty. That is, carriers on the ground charge to terminate voice and data traffic onto their networks.

This carrier interoperating business rule forces VOIP service providers to charge its users for calling "off net", and the reason the overwhelming majority of VOIP calls remain on net. However while "free speech" is the mass VOIP consumer proposition and draw card, calling "on net" keeps communication "up in the cloud" and consequently fails to generate the revenue required to commercialize service.

SUMMARY

The challenges facing the VOIP industry are as much related to real world economics as they are to the culture that permeates on line services. Built on "the economics of free" the mass inertia to paying is practically impossible to overcome. Notwithstanding the "free for all", VOIP service providers are being forced out of economic necessity, to "peddle cheap", discounting conventional phone service, and in doing so, tarnishing and eroding their brand, their vision and their service proposition.

Charging pennies, and now fractional pennies, for calls to legacy telephones around the world in order to survive, has become a fiercely competitive business. However, with less than 10 percent of all connections resulting in off net billable traffic, the VOIP Industry remains "up in the cloud and vapor".

While the Internet scrambles to capture the mass mobile paying market, by developing specialized applications that require smart phones and users to "download and register" in order to gain access to online services, the overwhelming majority lacks the means, the knowhow and the device capability to do so.

Conversely, the Mobile industry has invested an untold fortune over decades, pushing mobile data service adoption uphill from "4 to 10%", relentlessly driven by the "StarTrek Tricorder" celluloid fantasy. The cellular reality however, remains one in which some 80% of global operator revenue still accrues from people dialing telephone numbers and talking. Technology changes at the speed of light, human behavior, "at snail's pace".

Ever faster, more capable and more data hungry devices now hold carriers in "golden data handcuffs", disintermediating core voice service and consuming vast amounts of wireless spectrum and network capacity that demand immense and continual infrastructure upgrades. With a constantly shifting event horizon, data business models remain unstable and unproven. The "faster horse" mentality may get networks to an unintended destination quicker:

"More users disappointed with performance more often".

Principally for these reasons, Convergence between core IP and Mobile Telephony has become a 21st Century Telecom Mantra. However without fully grasping the mass behavioral phenomena that govern service adoption, "converging technology without converging culture" can be a massive miscalculation.

Whereas the Internet hallmark is "free", mobile has "paying" as the established core proposition. These extreme, diametrically opposed ecosystems create a massive potential and desire to interconnect without changing user expectations and economic propositions on either.

Annotating now the deeper underlying technical, behavioral, cultural and economic drivers presently shaping the VOIP industry, with reference to the Appended FIGS. 34 through 38.

FIG. 34

Requiring users to "Download, Register and Pay", in short order presents the three inhibitors to mass service adoption. Notably Internet "search", the most storied success on the web, foregoes all three. While many broadband Internet users clear the first two hurdles with ease, the third bar is way too high for a community built on free.

In the VOIP context, while hundreds of millions of users have downloaded and registered "10 Megabyte clients on their desktops", less than "1 percent" have offered up their "VISA cards online to pay for calls". Clearly there is more to net success than gaining mass.

Things are a dramatically different in the cellular world. The mirrored reality here, is while the cellular masses are required to "jump and pay up front" (global service provision model being prepaid) most hesitate when it comes to "downloading and registration". Registering is "the price of free", since personal data is required for effective advertising. However mass markets are notoriously fickle. Many value anonymity.

The "Net Versus Cell" graph in FIG. 34 depicts these inverted megatrends.

The mainstay of Internet Commercialization is third party advertising and sponsorships. However these business models cannot be grafted from "visual to audio". That is while "search, text and banner" adverts have proven to be a sustainable business model on the Net given their "visual proximity to the supported service", audio services engage users on a different plane.

Whereas it is viable to show collateral advertising and sponsorship in the "field of vision", engaging a user in a similar manner while "talking and listening" is significantly more challenging. This is in part due to the fact that the "consumption and the carrot" (the service being offered free in lieu of the advertising) are disassociated. That is the service is "consumed" independently of and irrespective to the sponsorship.

Furthermore, talking and listening being the natural human form of communication is "emotionally charged". Associating brands, products and services with what is essentially an "unscripted production" can have unintended and less than desirable consequence. For example, presenting product C on a call that results in a breakup between A and B can result in a "lifetime of negative brand association". This especially the case when the sponsoring message is presented "in ear, on call".

Sponsored Telephony Services predicated on delivering "out of band" advertising, for example via text and multimedia messages sent either following or preceding conversations, have not reached their promised potential. While these services have reported high "click through" on the advertising channel "conversion" remains problematic ("click delete" is the more common consequence).

FIG. 36 illustrates different origination and termination calling patterns between VOIP and Legacy networks and the resultant interconnect payment. Calls between two IP users are "free on net". Calls from IP to legacy incur cost (IP outgoing interconnect fees, top circles).

Calls from Legacy to IP generate revenue for the Gateway provider (IP inbound interconnect, middle and lower circles) and those that "meet at the edges" (IP inbound interconnect, lower circles) may be switched and bridged.

The conventional VOIP service caveat is "desktop in a mobile world", requiring both users to be online available and connected at the same time in order to talk free. However given the global service reach together with planetary "day/night" time zones and an increasingly mobile society, one user is typically at a fixed location (on net at home/office) while the other is mobile on cell.

Moreover, while IP to Legacy hits the proverbial billing brick wall, additional social factors come in to play when calling off net. Principal amongst these is the fact that telephones lack "presence". While "always on and always connected", there is still no known, acceptable and interoperable telephone presence protocol.

Paradoxically, Caller Line Identity, the very essence of modern telephony, delivers at best "a reverse presence indication", one that indicates to the called party that the "caller is available and wishing to connect". CLI is a double edged sword that undermines call completion, as many users now screen callers.

Playing telephone tag is, however, symptomatic of a much deeper underlying design flaw being the synchronous and unilateral nature of telecommunications, which permits anyone to "push and enter a ring uninvited". The result is a technology, which sees less than "in 3 mobile calls going to successful completion".

Further, many of the calls that do successfully complete are themselves short lived ("I am busy, call you right back") and the cost associated with switching, paging and wireless spectrum consumption for short duration calls is prohibitive.

FIG. 37

"Free is one market, anything else is another".

The mistaken impression is that there is constant elasticity in price, which the cheaper a service costs the more users it will attract. However the greatest gap in service is between "one that is free and one that costs a penny". The Penny Gap is the reverse salient that places severe drag on the VOIP industry. The quantum is almost irrelevant. The mass net psychology has to do with "payment".

FIG. 37 graphically illustrates these two phenomena. With respect to price elasticity, the dotted band stretches to the "theoretical linear uptake", whereas the solid band depicts the "actual limitation". The vertical cross section reveals a "submerged pyramid" beneath the seemingly small penny gap.

The "very known and met need" is in providing ever cheaper "almost free" ways to interconnect. There is therefore a need for the "unknown and unmet need" to programmatically switch and terminate conventional calls into the cloud, and thereby deliver "a reverse free global connection" to the community on the net.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

While the embodiments highlight voice telephony services, select reverse associated addressing schemas and the methods and systems herein that describe them, may be readily applied to alternate and complimentary communication protocols and services, including text, picture, video and multimedia messaging.

FIG. 35

Since it is difficult to overcome "the net resistance to paying" and given that telephony plus advertising may be impractical, the only viable and sustainable mass VOIP economic proposition is in delivery and adoption on mobile, where "pay is in the DNA".

To converge the known systems:

net=+download+register−pay cell=−download−register+pay net and cell="zero sum" (game)

However as illustrated above, "goosing mobile" is contingent on removing "download and registration" from the cell equation. That is, foregoing the downloading and installation of special VOIP software on select and supporting devices. "No download and no registration" equates to "service virtualization".

Restating the virtual equation:

net=+download+register cell=+pay net and cell="++++" (triple win)

Thus in order to deliver seamless and instant, local to global (ground to cloud) connectivity to any phone without change, the service is required to be "resident in the cloud" and accessed "over the air", over the ubiquitous conventionally established voice channel.

FIG. 36

Characterizing the VOIP problem in meteorological terms, terminating IP connections onto Fixed and Cellular networks is "lightening that strikes down and out", discharging energy from "cloud to ground", and incurring the terminating penalty.

However, in Cellular Communication Systems there is a lesser known electrical phenomenon called "Ground to Cloud strikes", where lightening strikes "up" from cell towers on the ground, "spectacularly lighting up the cloud".

The methods and systems disclosed similarly "lights up the VOIP cloud" and industry by uniquely switching legacy originated calls between "Ground and Cloud". These "reversed electrical circuits" are closed between the "positive (+) revenue generating cells" and "negative (−) cloud atmospherics".

FIG. 38

While at first the challenge to converge and uniquely map millions of Internet users to billions of conventional telephones appears unattainable, when reduced to practice the "social geometry" appears to be inversely parabolic rather than exponential, linear or quadratic. That is, at the convergence of these two planetary telephony ecosystems, a mere handful of interconnections actually exist.

The "90:10" rule here is "over ninety percent only ever talk to ten individuals or less" on a regular basis. This small data set makes contact presentation and selection exceedingly manageable, especially given that the disclosed association between the two domains is "discoverable". FIG. 38 (F38) plots this social geometry.

By reversing call line identity presented on the Ground into the Cloud, the methods and systems disclosed permit legacy phones to dial and connect to any associated VOIP endpoint in the world without having to know or manually enter the associated Internet User Identity. This extremely subtle yet profound advance in IP switching, transforms the VOIP service landscape.

Since making telephone calls remains the primary and consequently the most refined mobile phone function and user experience, it is useful to leverage this communications channel to deliver a service and experience.

In both preserving the status quo in the ecosystems and reversing "cloud economics" as described, the methods and systems disclosed uniquely captures and converges conventional Telephony Markets, where callers routinely pay for locally switched connections, with Internet Telephony Communities, who are set on connecting globally and speaking free.

Significantly, the service galvanizes voice by leveraging existing assets and infrastructure. Since legacy connections are circuit switched, they clock minutes of use, locking in conventional call revenue generation. Whereas before VOIP service providers and users had to pay to connect to legacy telephones, they now receive connections generating net positive inbound revenues that are accrued to the VOIP service provider on existing Fixed and Mobile Interconnect.

According to the teachings of the present embodiment there is provided a system for supporting communications between an internet user on an internet-addressed-communications-device and a telephony subscriber device, the telephony subscriber device having a corresponding telephone number, the system including: one or more service nodes configured to: receive from the internet-addressed-communications-device of the internet user the telephone number of the telephony subscriber device; and create an association from the telephone number to the internet user, wherein the association allows the telephony subscriber device to connect to the internet user.

In an optional embodiment, at least one of the service nodes is configured to receive the telephone number of the telephony subscriber device in response to an action by the internet user.

In an optional embodiment, the system includes at least one gateway configured to: receive a communications request from the telephony subscriber device, the communications request including the telephone number of the telephony subscriber device; and cause, by using the received telephone number, retrieval of addressing information for the internet user that is associated with the telephone number, wherein the system is configured to use the retrieved addressing information to cause establishment of a communications connection between the telephony subscriber device and a device then being used by the internet user, thereby supporting communications between the telephony subscriber device and the internet user.

In an optional embodiment, the addressing information for the internet user includes but is not limited to: an Internet service user address, an Internet service user name, an Internet URI, an IP address, an IP communications endpoint address, and a MAC address.

In an optional embodiment, in response to receiving the communications request from the telephony subscriber device, the system is further configured to instantiate a client proxy for the telephone number of the telephony subscriber device, the client proxy operative to facilitate communications between the telephony subscriber device and the internet user.

In an optional embodiment, at least one of the gateways is further configured to: receive information regarding a plurality of internet users for which addressing information is associated with the telephone number, and configure, based on the information received, the client proxy to facilitate communications between the telephony subscriber device and at least one of the internet users for which addressing information has been received.

In an optional embodiment, the client proxy includes status of the telephony subscriber device. In another optional embodiment, the client proxy is configured to publish information for the telephony subscriber device and the associated internet users. In another optional embodiment, the client proxy is configured to translate between communication protocols used respectively by the telephony subscriber device and one or more devices used by the internet user.

In an optional embodiment, the one or more service nodes is further configured to cause associations between the telephone number and addressing information, the addressing information respectively associated with a plurality of internet users; and the system is further configured to permit the telephony subscriber device to establish communications with at least one of the plurality of internet users.

In an optional embodiment, if addressing information of a single available internet user is associated with the telephone number, at least one gateway is configured to: notify the telephony subscriber device of a communications possibility; cause establishment of a connection from the telephony subscriber device to the internet user; and cause the identification of the telephony subscriber device, as a calling party, to the internet user.

In an optional embodiment, at least one service gateway is configured, if a plurality of available internet users is associated with the telephone number, to present to the telephony subscriber device a list of the plurality of available internet users for selection for communication.

In an optional embodiment, the one or more service nodes is configured to cause the association from the telephone number to the internet user based on at least one identifier for the internet user selected from a group consisting of a registered VOIP service screen name of the internet user; a registered Internet URI describing the internet user; a user identity automatically created and assigned by the system; a user name including the telephone number, and a user name including a derivative of the telephone number wherein any of the at least one identifier from the above group may be registered on an ENUM domain based on the telephone number.

In an optional embodiment, the association is based only on: the telephone number of the telephony subscriber device, and the internet user.

In an optional embodiment, the association further includes status of a client proxy.

In an optional embodiment, the system is further configured to: receive, from at least one gateway, a query regarding the telephone number of the telephony subscriber device; and respond to the at least one gateway with information regarding internet users associated with the telephone number of the telephony subscriber device.

In an optional embodiment, the information includes zero or more associations allowing the telephony subscriber device to connect to one or more internet users.

In an optional embodiment, the service node is further configured to create the association in response to a query from the internet user regarding the telephone number.

According to the teachings of the present embodiment there is provided a system for supporting communications between an internet user on an internet-addressed-communications-device and a telephony subscriber device, the telephony subscriber device having a corresponding telephone number, the system including: at least one gateway configured to receive from a service node information regarding internet users associated with a telephone number of the telephony subscriber, the information includes one or more associations, from the telephone number to the internet user, the associations allowing the telephony subscriber device to connect to one or more internet users.

In an optional embodiment, the at least one gateway is further configured to perform a query in response to receiving a communications request from the telephony subscriber device the query to the service node regarding a telephone number of the telephony subscriber. In an optional embodiment, the at least one gateway is further configured to initiate communications between the telephony subscriber device and one or more internet users based on the information. In an optional embodiment, the at least one gateway is further configured to provide connectivity between the telephony subscriber device and one or more internet users.

In an optional embodiment, the at least one gateway configured to: receive a communications request from the telephony subscriber device, the communications request including the telephone number of the telephony subscriber device; and cause, by using the received telephone number, retrieval of addressing information for the internet user that is associated with the telephone number, wherein the system is configured to use the retrieved addressing information to cause establishment of a communications connection between the telephony subscriber device and a device then being used by the internet user, thereby supporting communications between the telephony subscriber device and the internet user.

In an optional embodiment, the addressing information for the internet user includes, but is not limited to: an Internet service user address, an Internet service user name, an Internet URI, an IP address, an IP communications endpoint address, and a MAC address.

In an optional embodiment, in response to receiving a communications request from the telephony subscriber device, the communications request including the telephone number of the telephony subscriber device, the system is further configured to: instantiate a client proxy for the telephone number of the telephony subscriber device, the client proxy operative to facilitate communications between the telephony subscriber device and internet user.

In an optional embodiment, at least one of the gateways is further configured to: receive information regarding a plurality of internet users for which addressing information is associated with the telephone number, and configure, based on the information received, the client proxy to facilitate communications between the telephony subscriber device and at least one of the internet users for which addressing information has been received.

In an optional embodiment, the client proxy includes status of the telephony subscriber device. In an optional embodiment, the client proxy is configured to publish information for the telephony subscriber device and the associated internet users. In an optional embodiment, the client proxy is configured to translate between communication protocols used respectively by the telephony subscriber device and one or more devices used by the internet user.

In an optional embodiment, if addressing information of a single available internet user is associated with the telephone number, at least one gateway is configured to: notify the telephony subscriber device of a communications possibility; cause establishment of a connection from the telephony subscriber device to the internet user; and cause the identification of the telephony subscriber device, as a calling party, to the internet user.

In an optional embodiment, if a plurality of available internet users is associated with the telephone number, at least one gateway is configured to present to the telephony subscriber device a list of the plurality of available internet users for selection for communication.

According to the teachings of the present embodiment there is provided a system for supporting communications between a internet user on an internet-addressed-communications-device and a telephony subscriber device, the telephony subscriber device having a corresponding telephone number, the system including: at least one gateway configured so that upon receiving a communications request from the internet user for connection to the telephony subscriber device the gateway requests an association be created from a telephone number of the telephony subscriber to the internet user, the association allowing the telephony subscriber device to connect to the internet user.

In an optional embodiment, the system further includes a service node configured to create associations, wherein the gateway requests the service node create the association.

According to the teachings of the present embodiment there is provided a method for supporting communications between an internet user on an internet-addressed-communications-device and a telephony subscriber device, the telephony subscriber device having a corresponding telephone number, the method including the steps of: receiving at one or more service nodes, the telephone number of the telephony subscriber device; and creating an association from the telephone number to the internet user, the association allowing the telephony subscriber device to connect to the internet user.

In an optional embodiment, the telephone number is received in response to an action by the internet user. In an optional embodiment, the association from the telephone number of the telephony subscriber to the internet user includes the Internet address of the internet user. In an optional embodiment, the telephone number is provided to the service node from a gateway.

In an optional embodiment, the current method includes the steps of: receiving at a gateway a communications request from the telephony subscriber device, the communications request including the telephone number of the telephony subscriber device; and causing, by using the received telephone number, retrieval of addressing information for the internet user that is associated with the telephone number, wherein the system is configured to use the retrieved addressing information to cause establishment of a communications connection between the telephony subscriber device and a device then being used by the internet user, thereby supporting communications between the telephony subscriber device and the internet user.

In an optional embodiment, the addressing information for the internet user includes but is not limited to: an Internet service user address, an Internet service user name, an Internet URI, an IP address, an IP communications endpoint address, and a MAC address.

In an optional embodiment, in response to receiving the communications request from the telephony subscriber device: instantiating a client proxy for the telephone number of the telephony subscriber device, the client proxy operative to facilitate communications between the telephony subscriber device and internet user.

In an optional embodiment, the current method includes the steps of: receiving, at least one of the gateways, information regarding a plurality of internet users for which addressing information is associated with the telephone number, and configuring, based on the information received, the client proxy to facilitate communications between the telephony subscriber device and at least one of the internet users for which addressing information has been received.

In an optional embodiment, the client proxy includes status of the telephony subscriber device. In an optional embodiment, the client proxy is configured for publishing information for the telephony subscriber device and the associated internet users. In an optional embodiment, the client proxy is configured for translating between communication protocols used respectively by the telephony subscriber device and one or more devices used by the internet user.

In an optional embodiment, the one or more service nodes is further configured for causing associations between the telephone number and addressing information, the addressing information respectively associated with a plurality of internet users; and permitting the telephony subscriber device to establish communications with at least one of the plurality of internet users.

In an optional embodiment, if addressing information of a single available internet user is associated with the telephone number, at least one gateway is configured for: notifying the telephony subscriber device of a communications possibility, causing establishment of a connection from the telephony subscriber device to the internet user; and causing the identification of the telephony subscriber device, as a calling party, to the internet user.

In an optional embodiment, if a plurality of available internet users is associated with the telephone number, at least one gateway is configured for: presenting to the telephony subscriber device a list of the plurality of available internet users for selection for communication.

In an optional embodiment, the one or more service nodes is configured for causing the association from the telephone number to the internet user based on at least one identifier for the internet user selected from a group consisting of a registered VOIP service screen name of the internet user, a registered Internet URI describing the internet user; a user identity automatically created and assigned by the system; a user name including the telephone number; and a user name including a derivative of the telephone number, wherein any of the at least one identifier from the above group may be registered on an ENUM domain based on the telephone number.

In an optional embodiment, the association is based only on: the telephone number of the telephony subscriber device, and the internet user.

In an optional embodiment, the association further includes status of a client proxy.

In an optional embodiment, the current method includes the steps of receiving, from at least one gateway, a query regarding the telephone number of the telephony subscriber device; and responding to the at least one gateway with information regarding internet users associated with the telephone number of the telephony subscriber device.

In an optional embodiment, the current method includes the step of: initiating, by the gateway, communications between the telephony subscriber device and one or more internet users based on one or more associations in the information.

In an optional embodiment, the current method includes the step of facilitating by the gateway, communications between the telephony subscriber device and one or more internet users.

In an optional embodiment, the information includes zero or more associations allowing the telephony subscriber device to connect to one or more internet users.

In an optional embodiment, the service node is further configured to create the association in response to a query from the internet user regarding the telephone number.

According to the teachings of the present embodiment there is provided a method for supporting communications between an internet user on an internet-addressed-communications-device and a telephony subscriber device, the telephony subscriber device having a corresponding telephone number, the method including the steps of: sending, from a service node, information regarding internet users associated with a telephone number of the telephony subscriber; and receiving, to at least one gateway, the information, wherein the information includes one or more associations, from the telephone number to the internet user, the associations allowing the telephony subscriber device to connect to one or more internet users.

In an optional embodiment, the at least one gateway is further configured for performing a query in response to receiving a communications request from the telephony subscriber device the query to the service node regarding a telephone number of the telephony subscriber. In an optional embodiment, the at least one gateway is further configured for initiating communications between the telephony subscriber device and one or more internet users based on the information. In an optional embodiment, the at least one gateway is further configured for providing connectivity between the telephony subscriber device and one or more internet users.

In an optional embodiment, the at least one gateway is further configured for: receiving a communications request from the telephony subscriber device, the communications request including the telephone number of the telephony subscriber device; and causing, by using the received telephone number, retrieval of addressing information for the internet user that is associated with the telephone number, wherein the system is configured to use the retrieved addressing information to cause establishment of a communications connection between the telephony subscriber device and a device then being used by the internet user, thereby supporting communications between the telephony subscriber device and the internet user.

In an optional embodiment, the addressing information for the internet user includes, but is not limited to: an Internet service user address, an Internet service user name, an Internet URI, an IP address, an IP communications endpoint address, and a MAC address.

In an optional embodiment, in response to receiving a communications request from the telephony subscriber device: instantiating a client proxy for the telephone number of the telephony subscriber device, the client proxy operative to facilitate communications between the telephony subscriber device and the internet user.

In an optional embodiment, the current method further includes the steps of receiving, at least one of the gateways, information regarding a plurality of internet users for which addressing information is associated with the telephone number; and configuring, based on the information received, the client proxy to facilitate communications between the telephony subscriber device and at least one of the internet users for which addressing information has been received.

In an optional embodiment, the client proxy includes status of the telephony subscriber device. In an optional embodiment, the client proxy is configured for publishing information for the telephony subscriber device and the associated internet users. In an optional embodiment, the client proxy is configured to translate between communication protocols used respectively by the telephony subscriber device and one or more devices used by the internet user.

In an optional embodiment, if addressing information of a single available internet user is associated with the telephone number, at least one gateway is configured for notifying the telephony subscriber device of a communications possibility; causing establishment of a connection from the telephony subscriber device to the internet user; and causing the identification of the telephony subscriber device, as a calling party, to the internet user.

In an optional embodiment, if a plurality of available internet users is associated with the telephone number, at least one gateway is configured for presenting to the telephony subscriber device a list of the plurality of available internet users for selection for communication.

In the system and method of the present embodiment, information can include parameters selected from the group consisting of net contacts; and an Internet address of the internet users. In the system and method of the present embodiment, information can include two or more associations, and a selection process is used to resolve which one or more internet users to initiate connections for the telephony subscriber device. In the system and method of the present embodiment wherein information includes two or more associations, a selection process is used to resolve which one or more internet users to initiate connections for the telephony subscriber device, wherein the selection process includes using secondary caller line identity.

In the system and method of the present embodiment, the association from the telephone number of the telephony subscriber to the internet user can include an Internet address of the internet user.

In the system and method of the present embodiment, the telephone number of the telephony subscriber can be selected from a group consisting of decimal number according to ITU recommendation E.164; and a calling line identifier (CLI) of the telephony subscriber device.

In the system and method of the present embodiment, the association can be a unidirectional association from the telephone number of the telephony subscriber to the internet user.

In the system and method of the present embodiment, the telephone number can be a unique telephone number identifying the telephony subscriber device, and the association between the telephone number and the user is dependent on the telephone number without necessarily being dependent on a gateway telephone number.

According to the teachings of the present embodiment there is provided a system for interconnecting telephony user domains including: a service access gateway between a first numerically addressed telephony user network and a second alphanumerically addressed telephony user network, said service access gateway configured to automatically associate a first user calling a gateway from the first network, with other users on the second network who have previously identified the first user on the first network, thereby reverse mapping a numerical calling line identity presented at the gateway by the first numerically addressed telephony user network into the associated alphanumerical user identities on the second alphanumerically addressed telephony user network; and present and selectively bridge connections between the first user on the first numerically addressed telephony user network and associated users on the second alphanumerically addressed telephony user network.

According to the teachings of the present embodiment there is provided a method for facilitating communications between a respective first and second telephony domain including the steps of receiving, at a service node associated with the first domain, from a user identity registered in the first domain, a unique telephone number identifying a second user in the second domain; associating addressing information of the user in the first domain, with the received unique telephone number; receiving a connection request from the second domain, originating from a telephony device identified by the received unique telephone number; routing the connection request to a communications gateway between the first and second telephony domains; retrieving addressing information to locate the user in the first domain who is associated with the calling line identity of the second user in the second domain; and using the retrieved addressing information, facilitating communication from the second user in the second domain to the user in the first domain.

According to the teachings of the present embodiment there is provided a computer-readable storage medium having embedded thereon computer-readable code for supporting communications between an internet user on an internet-addressed-communications-device and a telephony subscriber device, the telephony subscriber device having a corresponding telephone number by: receiving at one or more service nodes, the telephone number of the telephony subscriber device; and creating an association from the telephone number to the internet user, the association allowing the telephony subscriber device to connect to the internet user.

In an optional embodiment, the computer-readable storage medium has embedded thereon additional computer-readable code for receiving at a gateway a communications request from the telephony subscriber device, the communications request including the telephone number of the telephony subscriber device; and causing, by using the received telephone number, retrieval of addressing information for the internet user that is associated with the telephone number, wherein the system is configured to use the retrieved addressing information to cause establishment of a communications connection between the telephony subscriber device and a device then being used by the internet user, thereby supporting communications between the telephony subscriber device and the internet user.

According to the teachings of the present embodiment there is provided a computer-readable storage medium having embedded thereon computer-readable code for supporting communications between an internet user on an internet-addressed-communications-device and a telephony subscriber device, the telephony subscriber device having a corresponding telephone number by: receiving a communications request from the telephony subscriber device, the communications request including the telephone number of the telephony subscriber device; and causing, by using the received telephone number, retrieval of addressing information for the internet user that is associated with the telephone number, wherein the retrieved addressing information is used to cause establishment of a communications connection between the telephony subscriber device and a device then being used by the internet user, thereby supporting communications between the telephony subscriber device and the internet user.

According to the teachings of the present embodiment there is provided a computer program that can be loaded onto a server connected through a network to a client computer, so that the server running the computer program constitutes a service node in a system according to any one of the system embodiments. According to the teachings of the present embodiment there is provided a computer program that can be loaded onto a computer connected through a network to a server, so that the computer running the computer program constitutes a service node in a system according to any one of the system embodiments. According to the teachings of the present embodiment there is provided a computer program that can be loaded onto a server connected through a network to a client computer, so that the server running the computer program constitutes a gateway in a system according to any one of the system embodiments. According to the teachings of the present embodiment there is provided a computer program that can be loaded onto a computer connected through a network to a server, so that the computer running the computer program constitutes a gateway in a system according to any one of the system embodiments.

According to the teachings of the present embodiment there is provided a system for supporting communications between a first user and at least one other user including: a service node configured to: receive from the first user a handle; create, based on the handle, a first registration to the first user, receive from at least one other user the handle; and create, based on the handle, at least one additional registration respectively to the at least one other user, wherein when the first registration and at least one additional registration are active, a connection is invited between the first user and the at least one other user, the connection facilitating a direct communication between the first user and the at least one other user.

In an optional embodiment, after terminating the connection, the first registration and the at least one additional registration remain active, thereby facilitating re-connection of Internet communication devices registered with the handle. In an optional embodiment, registrations are universal resource locators (URLs). In an optional embodiment, a domain is created linking the URL to the first user. In an optional embodiment, registration includes registering, based on the handle, a VoIP communications endpoint at the network address of the user.

According to the teachings of the present embodiment there is provided a system for supporting communications between a first user and at least one other user including: a service node configured to: receive from the first user a handle; register, based on the handle, a first IP communications endpoint at the network address of the first user, receive from at least one other user the handle; and register, based on the handle, at least a second IP communications endpoint at the respective network address of the at least one other user; wherein the first and at least a second IP communications endpoints are configured to permit inviting a connection between endpoints registered with the handle.

In an optional embodiment, after terminating the connection, the first IP communications endpoint and at least a second IP communications endpoints remain active, thereby facilitating re-connection of Internet communication devices registered with the handle. In an optional embodiment, the IP communications endpoints are Universal Resource Locators (URLs). In an optional embodiment, the Universal Resource Locators (URLs) are the same.

According to the teachings of the present embodiment there is provided a method for supporting communications between a first user and at least one other user, the method including the steps of receiving, at a service node, from the first user a handle; creating, based on the handle, a first registration to the first user; receiving, at the service node, from at least one other user the handle; and creating, based on the handle, at least one additional registration respectively to the at least one other user, wherein when the first registration and at least one additional registration are active, a connection is invited between the first user and the at least one other user, the connection facilitating a direct communication between the first user and the at least one other user.

In an optional embodiment, after terminating the connection: maintaining the first registration and the at least one additional registration in an active state, thereby facilitating re-connection of Internet communication devices registered with the handle. In an optional embodiment, registration includes: registering, based on the handle, a VoIP communications endpoint at the network address of the user.

According to the teachings of the present embodiment there is provided a method for supporting communications between a first user and at least one other user, the method including the steps of receiving, at a service node, from the first user a handle; registering, based on the handle, a first VoIP communications endpoint at the network address of the first user; receiving from at least one other user the handle; and registering, based on the handle, at least a second VoIP communications endpoint at the respective network address of the at least one other user, wherein the first and at least a second VoIP communications endpoints are configured to permit inviting a connection between endpoints registered with the handle.

In an optional embodiment, after terminating the connection: maintaining the first VoIP communications endpoint and at least a second VoIP communications endpoints in an active state, thereby facilitating re-connection of Internet communication devices registered with the handle.

According to the teachings of the present embodiment there is provided a computer-readable storage medium having embedded thereon computer-readable code for supporting communications between a first user and at least one other user by: receiving, at a service node, from the first user a handle; creating, based on the handle, a first registration to the first user, receiving, at the service node, from at least one other user the handle; and creating, based on the handle, at least one additional registration respectively to the at least one other user, wherein when the first registration and at least one additional registration are active, a connection is invited between the first user and the at least one other user, the connection facilitating a direct communication between the first user and the at least one other user.

According to the teachings of the present embodiment there is provided a computer-readable storage medium having embedded thereon computer-readable code for supporting communications between a first user and at least one other user by: receiving, at a service node, from the first user a handle; registering, based on the handle, a first VoIP communications endpoint at the network address of the first user; receiving from at least one other user the handle; and registering, based on the handle, at least a second VoIP communications endpoint at the respective network address of the at least one other user, wherein the first and at least a second VoIP communications endpoints are configured to permit inviting a connection between endpoints registered with the handle.

According to the teachings of the present embodiment there is provided a computer program that can be loaded onto a server connected through a network to a client computer, so that the server running the computer program constitutes a service node in a system according to any one of the system embodiments. According to the teachings of the present embodiment there is provided a computer program that can be loaded onto a computer connected through a network to a server, so that the computer running the computer program constitutes a service node in a system according to any one of the system embodiments.

According to the teachings of the present embodiment there is provided a controller for supporting communications between an internet user on an internet-addressed-communications network and a telephony subscriber, the controller configured for: obtaining a telephone number associated with the telephony subscriber; determining whether an internet user identity corresponding to the telephone number identity is registered with the internet-addressed-communications network; if no internet user identity corresponding to the telephone number identity is registered, automatically creating and registering with the internet-addressed-communications network, a new internet user identity corresponding to and using the telephone number identity and recording the internet user as a contact for the new internet user identity corresponding to the telephone number identity.

According to the teachings of the present embodiment there is provided a method for supporting communications between an internet user on an internet-addressed-communications network and a telephony subscriber, the method including: obtaining a telephone number associated with the telephony subscriber, determining whether an internet user identity corresponding to the telephone number identity is registered with the internet-addressed-communications network; if no internet user identity corresponding to the telephone number identity is registered, automatically creating and registering with the internet-addressed-communications network, a new internet user identity corresponding to and using the telephone number identity and recording user as a contact for the new internet user identity corresponding to the telephone number identity.

In an optional embodiment, obtaining the telephone number includes the internet user entering the telephone number. In an optional embodiment, the internet user enters the telephone number as a contact screen name.

In an optional embodiment, if an internet user identity corresponding to the telephone number identity is registered with the internet-addressed-communications network, recording the internet user as a contact for the internet user identity corresponding to the telephone number identity.

In an optional embodiment, wherein the new internet user identity is automatically created and registered with a screen name including the telephone number identity.

In an optional embodiment, obtaining the telephone number includes: retrieving a plurality of recorded contacts for the internet user, and determining any phone numbers in any retrieved contacts for the internet user.

In an optional embodiment, the current method further includes using the new internet user identity to establish communications between the telephony subscriber and the internet user, thereby supporting communications between the telephony subscriber and the internet user.

In an optional embodiment, the current method further includes the step of configuring a client proxy to support communications between at least one telephony subscriber, having a telephone number, and the internet user.

In an optional embodiment, the client proxy translates communication protocols used respectively by the telephony subscriber device and one or more internet-addressed-communications-devices used by the internet user.

In an optional embodiment, the addressing information of an available internet user is associated with the telephone number, the method further includes: notifying the telephony subscriber of a communications possibility; causing establishment of a connection to the internet user; and causing the presenting of the identity of the telephony subscriber as a calling party.

In an optional embodiment, presenting to the telephony subscriber a list of internet users on the internet-addressed-communications network, from which list the telephony subscriber can select an internet user with whom to establish communications.

According to the teachings of the present embodiment there is provided a for supporting communications between an internet user on an internet-addressed-communications network and a telephony subscriber, the controller configured for-allowing the internet user to request a communications connection with a telephone user by dialing a phone number of the telephone user, determining whether the telephony subscriber is in communication with the internet-addressed communications network by: assembling a client service user name using the dialed phone number; and querying a service registry with the assembled client user name for an address of an internet client proxy for the telephony subscriber; if the service registry does not contain an active address for a proxy of the telephony subscriber, then routing the communication connection request to an Internet hosted Interactive Voice Response (IVR) messaging system, allowing the user to use the IVR messaging system to create a message for the telephone subscriber and if the service registry does contain an active internet address for a client proxy of the telephony subscriber, routing the communication connection request from the internet user to an internet address associated with the client proxy for telephony subscriber.

According to the teachings of the present embodiment there is provided a method for supporting communications between an internet user on an internet-addressed-communications network and a telephony subscriber, the method including: allowing the internet user to request a communications connection with the telephony subscriber by dialing a phone number of the telephone user; determining whether the telephony subscriber is in communication with the internet-addressed communications network by: assembling a client service user name using the dialed phone number, and querying a service registry with the assembled client user name for an address of an internet client proxy for the telephony subscriber; if the service registry does not contain an active address for a proxy of the telephony subscriber, then routing the communication connection request to an Internet hosted Interactive Voice Response (IVR) messaging system, allowing the internet user to use the IVR messaging system to create a message for the telephone subscriber; and if the service registry does contain an active internet address for a client proxy of the telephony subscriber, routing the communication connection request from the internet user to an IP address associated with the client proxy for telephony subscriber.

In an optional embodiment, after routing the communication connection request from the internet user to an IP address associated with the telephony subscriber, notifying the telephony subscriber of an incoming communication connection request from the internet user. In an optional embodiment, the IP address associated with the telephony subscriber is an IP address of the Internet client proxy for the telephony subscriber.

In an optional embodiment, the current method further includes the step of awaiting acceptance of the incoming communication connection request, from the telephony subscriber.

In an optional embodiment, the telephony subscriber selects a predetermined key to accept the incoming communication connection request. In an optional embodiment, the telephony subscriber issues a predetermined voice command to accept the incoming communication connection request. In an optional embodiment, the telephony subscriber declines to accept the incoming communication connection request, by not responding to the announcement. In an optional embodiment, if the telephony subscriber does not accept the incoming connection request, the connection is rerouted to an internet messaging platform.

In another optional embodiment, the current method includes if telephony subscriber accepts the incoming connection request from user, placing any currently active connection on hold and connecting the user.

According to the teachings of the present embodiment there is provided a computer-readable storage medium having embedded thereon computer-readable code for supporting communications between an internet user on an internet-addressed-communications network and a telephony subscriber by: obtaining a telephone number associated with the telephony subscriber; determining whether an internet user identity corresponding to the telephone number identity is registered with the internet-addressed-communications network; if no internet user identity corresponding to the telephone number identity is registered, automatically creating and registering with the internet-addressed-communications network, a new internet user identity corresponding to and using the telephone number identity; and recording the internet user as a contact for the new internet user identity corresponding to the telephone number identity.

According to the teachings of the present embodiment there is provided a computer program that can be loaded onto a server connected through a network to a client computer, so that the server running the computer program constitutes a controller in a system according to any one of the system embodiments. According to the teachings of the present embodiment there is provided a computer program that can be loaded onto a computer connected through a network to a server, so that the computer running the computer program constitutes a controller in a system according to any one of the system embodiments.

According to the teachings of the present embodiment there is provided a computer-readable storage medium having embedded thereon computer-readable code for supporting communications between an internet user on an internet-addressed-communications network and a telephony subscriber by: allowing the internet user to request a communications connection with the telephony subscriber by dialing a phone number of the telephone user; determining whether the telephony subscriber is in communication with the IP-addressed communications network by: assembling a client service user name using the dialed phone number; and querying a service registry with the assembled client user name for an address of an internet client proxy for the telephony subscriber; if the service registry does not contain an active address for a proxy of the telephony subscriber B, then routing the communication connection request to an internet hosted Interactive Voice Response (IVR) messaging system, allowing the internet user to use the IVR messaging system to create a message for the telephone subscriber, and if the service registry does contain an active internet address for a client proxy of the telephony subscriber, routing the communication connection request from the internet user to an internet address associated with the client proxy for telephony subscriber.

According to the teachings of the present embodiment there is provided a computer program that can be loaded onto a server connected through a network to a client computer, so that the server running the computer program constitutes a controller in a system according to any one of the system embodiments. According to the teachings of the present embodiment there is provided a computer program that can be loaded onto a computer connected through a network to a server, so that the computer running the computer program constitutes a controller in a system according to any one of the system embodiments.

According to the teachings of the present embodiment there is provided a controller for authenticating a user on an Internet device using a telephony subscriber device of the user, the telephony subscriber device having a corresponding telephone number, the controller configured for receiving, at a gateway, the telephone number via an Internet network from the user; initiating a phone call from the gateway via a telephony network to the user's telephony subscriber device, the phone call including a call-back telephone number; initializing a countdown timer with a given time; and authenticating the user to the Internet device if a phone call is received at the gateway from the user's telephony subscriber device; and the phone call is received before the countdown timer expires.

According to the teachings of the present embodiment there is provided a method of authenticating a user on an Internet device using a telephony subscriber device of the user, the telephony subscriber device having a corresponding telephone number, the method including the steps of receiving, at a gateway, the telephone number via an Internet network from the user; initiating a phone call from the gateway via a telephony network to the user's telephony subscriber device, the phone call including a call-back telephone number; initializing a countdown timer with a given time; and authenticating the user to the Internet device if a phone call is received at the gateway from the user's telephony subscriber device; and the phone call is received before the countdown timer expires.

In an optional embodiment, the telephony network is a POTS (plain old telephone system) network. In another optional embodiment, the phone call from the gateway via a telephony network to the user's telephony subscriber device is a missed call. In another optional embodiment, the callback telephone number is randomly generated on the gateway prefix. In another optional embodiment, the countdown timer automatically counts down to zero, thereby timing the phone call received at the gateway from the user's telephony subscriber device. In another optional embodiment, if the countdown timer expires before phone call is received at the gateway from the user's telephony subscriber device, authentication fails for the user. In another optional embodiment, if the phone call received at the gateway from the user's telephony subscriber device is to a telephone number other than the callback number, authentication fails for the user. In another optional embodiment, if the phone call received at the gateway to the call-back number is from other than the user's telephony subscriber device, authentication fails for the user.

According to the teachings of the present embodiment there is provided a computer-readable storage medium having embedded thereon computer-readable code for authenticating an internet user on an internet device using a telephony subscriber device of the internet user, the telephony subscriber device having a corresponding telephone number, by: receiving, at a gateway, the telephone number via an internet network from the internet user; initiating a phone call from the gateway via a telephony network to the internet user's telephony subscriber device, the phone call including a call-back telephone number; initializing a countdown timer with a given time; and authenticating the internet user to the internet device if: a phone call is received at the gateway from the internet user's telephony subscriber device; and the phone call is received before the countdown timer expires.

According to the teachings of the present embodiment there is provided a computer program that can be loaded onto a server connected through a network to a client computer, so that the server running the computer program constitutes a controller in a system according to any one of the system embodiments. According to the teachings of the present embodiment there is provided a computer program that can be loaded onto a computer connected through a network to a server, so that the computer running the computer program constitutes a controller in a system according to any one of the system embodiments.

BRIEF DESCRIPTION OF DRAWINGS

For a better understanding of the embodiments described in this application, reference should be made to the Detailed Description below, in conjunction with the following drawings in which like reference numerals refer to corresponding parts throughout the figures.

FIG. 2: Detailed logical interaction between core elements.

FIG. 3: Tele IP Presence Protocol fundamentals.

FIG. 4: Tele IP Presence Protocol aliased.

FIG. 15: Timed VOIP terminated switching.

FIG. 18: Universal Edge caching data model.

FIG. 19: Paired OFF net ring back matrix.

FIG. 22: Detailed logical interaction between prefixed core elements.

FIG. 29: Returned Telephone number authentication entity relationships.

FIG. 30: Global IP phone number assignment in one embodiment.

FIG. 31: Example Telephone pairing over IP.

FIG. 32: Example Web social telephony mash up.

FIG. 33: Example Instant callback service channel.

FIG. 35: Behavioral economics converging technology and culture.

FIG. 37: Price elasticity and the penny gap.

FIG. 42: FRISB disc dynamic DNS zone delegation.

FIG. 43: FRISB sample zone A records.

DETAILED DESCRIPTION

Figure 1:
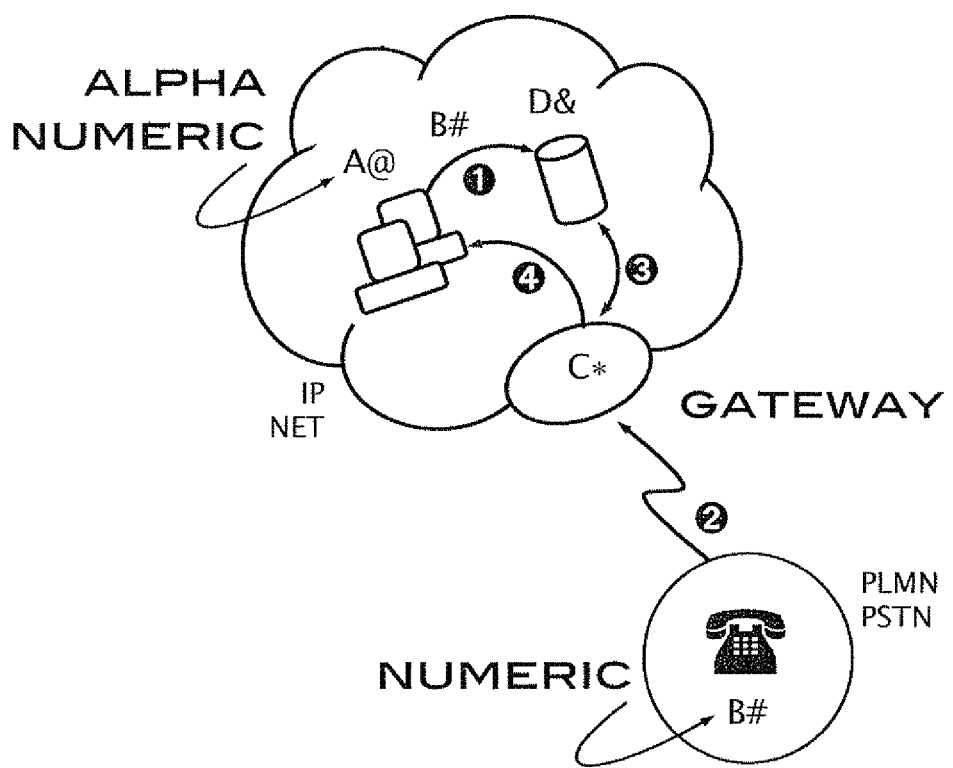
FIG. 1: Abstracted core service elements in a contact embodiment.

Programmatically reversing numerical line identity presented at a communications services gateway into named IP Telephony users with "prior association", delivers dynamic "reverse address resolution" switching connections from ground to cloud, permitting any conventional telephone to dial and connect to any associated IP Telephony endpoint in the world, without changes to the conventional telephone. Reversing line identity into associated named users bridges both the addressability and economic divide between mass conventional "paying" (mobile and fixed) and "free" IP Telephony networks.

A system for supporting communications between a user on an IP-addressed-communications-device and a telephony subscriber device, the telephony subscriber device having a corresponding telephone number, includes: one or more service nodes configured to: receive from the user the telephone number of the telephony subscriber device and create an association from the telephone number to the user, wherein the association allows the telephony subscriber device to connect to the user.

Terms

In the context and scope of the embodiments the term "Voice Over Internet Protocol" (VOIP) is generally used synonymously and interchangeably with "Internet", "IP Telephony", "Endpoint", "User Agent", "Session Initiation Protocol (SIP)" and other Internet Telephony Protocols Methods and Systems.

The public switched telephone network (PSTN) is the network of the world's public circuit-switched telephone networks, inter-connected by switching centers. In the context of this document, the term telephony communications device generally refers to an end-user device on the PSTN. End user devices include, but are not limited to land (fixed)-line telephones, mobile telephones, fax machines, and modems.

The terms "Telephone", "Phone", "Mobile", "Cell", "telephony subscriber device" and other communication devices (portable or otherwise) are generally used synonymously and interchangeably with, for example, PLMN (Public Land Mobile Networks) and PSTN (Public Switched Telephony Networks) compatible devices. A telephony subscriber device operates via a network that is separate from the network on which an internet device operates. A variety of separate telephony networks can be used. Typically, the telephony network is a POTS (plain old telephone service) network, having connections between telephony subscriber devices (telephones) and gateways that are physically separate from the connections between the Internet device and the gateways. As the protocols are different between the Internet network and telephony network.

In the context of this document, the term "internet" generally refers to connection of a network to other networks. The resulting system of interconnected networks is called an internetwork, or simply an internet. The most notable example of an internet is the Internet, a worldwide network of networks based on many underlying hardware technologies, but unified by an internetworking protocol standard, the Internet Protocol Suite, often also referred to as TCP/IP. The terms "internet" and "Internet" may be used interchangeably in this document.

The term "alphanumeric" may be used interchangeably with "alpha", that is, an identity comprising both alphabetical characters and numeric digits. While alphanumeric terms typically include at least alphabetical characters mixed with numbers and/or symbols, alphanumeric includes reference to terms that can be all alphabetical characters, all numeric characters, symbols, and a mixture of character types. The term "numeric", refers to conventional telephone numbers having numerical digits that may be symbolically prefixed and/or mixed with standard telephone keypad symbols, for example, the Star (*) or Pound (#) keys and combinations thereof.

In the context of this document, the term "internet address" generally refers to the address and/or designator to identify where a device is located on a network. One skilled in the art will be aware of the context and use of alternative terms, including but not limited to "network address", "physical address", "hardware address", "address of the PC", and "address of the internet device".

The term "Gateway" described herein could be any gateway, including for example, a "PSTN Internet Gateway", "Trunking Gateway", "Media Server", "Proxy Server", IMS (Internet Multimedia Subsystem), IPBX (Internet Protocol Branch Exchange), "Soft Switch", Signaling Controllers and other such telecommunication interconnecting service nodes.

The term "Registry" could be used synonymously and interchangeably with "database registry", "service registry", "Registrar", B2BUA (Back to Back User Agent), Inbound Proxy, VOIP service platforms such as Asterisk™, FreeSWITCH™ and other such communication platforms. Registry and Gateway may logically be one and the same platform; they may be physically separate nodes and combinations thereof.

The term PC (Personal Computer) may be used synonymously and interchangeably with any Internet Connected Device, such as, but not limited to, computing devices or any device (portable, handheld or otherwise) capable of connecting to a network (e.g., the Internet).

In the context of this document, the term "internet communications device" generally refers to devices on an internet capable of providing telephony services, typically but not limited to voice communications. One skilled in the art will realize that the terms can be used alternatively, depending on context: Internet communications devices, VoIP phone, computer, subscriber of a VoIP network, and generally IP-addressed-communications-devices. In this document, internet devices may be located on a network, an internet, or the Internet, as will be obvious to one skilled in the art.

The term "Client" described herein could be used synonymously and interchangeably with VOIP client, "User Agent" (UA), SIP phone, "Softphone", "Webphone", Adobe Flash™ Phones, SUN Java™ Phones, Skype™ clients and other VOIP capable technologies and telephones that may be downloadable phones implemented in software code, phones embedded in multifunctional devices and standalone IP telephone devices. The term "Client" could also generally include any client in a client/server arrangement.

The term "ON net" may describe a telephone that is connected to a Gateway between Telephone and Internet networks. For example, when a telephone is "ON net" there is an associated VOIP proxy representing the telephone as a "numbered VOIP client", where the client name comprises the phone number, and where a proxy IP Address and Port are assigned and registered to reference and locate the active client endpoint.

The term "OFF net" may describe a telephone (or communication device) that is disconnected from a Gateway, and as such there may be no proxy associated with the telephone number. Consequently the telephone, for example, cannot be located "ON net", as there is no recorded active IP endpoint in a VOIP service registry that can be referenced.

The capital character "A" used throughout this disclosure, may describe internet users in the singular and the plural, and the capital character "B", may describe the telephone with corresponding telephone number "B #" with which User A wishes to establish contact. In many instances, A may therefore refer to the connection "source" (the caller) and B may refer to the "destination" (the called or call recipient). User (A) having an internet-addressed-communications-device is typically inside a VoIP network, in contrast to telephony subscriber device (B) that is typically inside a conventional PSTN. In other words, B is outside, or a non-subscriber of, the VoIP network of A.

However, since select methods and systems disclosed describe a discontinuity between completing the connection between A and B, in that in selected embodiments telephone user B reverse establishes communication via a services gateway C back to the associated internet user A, in such cases technically B may be the "source" and A may be the "destination".

In communication networks, an originating endpoint may be designated as "party A" and a terminating endpoint may be designated as "party B", however in order to maintain logical consistency in describing the systems and methods disclosed, while B is still the intended connection destination and A the source, the physical connection establishment may actually reverse the relationship and the endpoints.

This is because selected embodiments logically require party A to disclose "telephone number identifying information" to the service provider permitting party B to originate and complete an inbound connection back to A. In one embodiment this identifying information is a numerical identity of a communications device utilized on network B. In another embodiment this identification information is the numerical identity of a communications device logically coupled to the services provided on network A (for example, the authenticated telephone number associated with internet user A).

Legends applied to the accompanying figures may include:
 "The cloud", representing the IP network.
 "The telephone", representing legacy Fixed and Mobile telephony networks.
 "The pots icon", plain old telephone system, representing a telephony capable device, without any special software capability required.

The enumerated circles (1 2 3 4 5 6 7 8 9 10) mark logical service steps. In describing steps, Figure X is abbreviated "FX". The "A B C D" nomenclature and associated symbols (@ # & *) denote core service nodes and functionality, defined herein as:

A: an alphanumeric "named" VOIP user identity (example: ak@starlogik.com) on an alphanumeric telephony domain;
B: a telephony subscriber device on a numeric telephony domain;
C: a gateway interconnecting the alphanumeric and numeric telephony domains; and
D: a service node and/or registry storing A and B user associations and VOIP registered endpoints.
These nodes may include symbolically:
@ ("at") an IP address and port of a VOIP user A;
("pound") a conventional telephone number B, (for example: 14154125111);
& ("and") an association and/or database relationship between B and A; and
("star") a telephony switching element within C.

Note that the use of the "A C D" nomenclature and associated symbols (@ # & *) in the claims are for clarity, and should not be considered as limiting the invention to a specific embodiment.

FIG. 1

FIG. 1 (F1) illustrates the system overview which shows abstracted core service elements in context with each other.

F1 shows two telephony domains, a first numerically addressed conventional fixed/mobile telephony network (B # plain old telephone) and a second alphanumeric addressed Internet network (A @ PC in cloud) with interconnecting Gateway (C*). Logical entity relationships and service steps include:

F1 Step1. Internet user A @ who is a user on the second alphanumerically addressed IP network, enters the telephone number B # of a contact on the first numerically addressed network, into VOIP client software. The VOIP client software may be resident on user A's Internet device or in the network.

The VOIP service records the telephone number B # in association with the Internet user identity A @, thus binding and associating internet user A @ with telephone number B # in a database registry on service node D, in particular creating an association from the telephone number B # to the Internet user identity A @. In the context of this document, telephone numbers of a numerically addressed telephony subscriber device B are more generally referred to by the term "identifier the telephony subscriber device B #". A telephone number B # is typically a unique number identifying a corresponding telephony subscriber device (B).

The telephone user receives a call on telephone B indicating a system call back number (not shown). The system call back number is preferably a general number for all telephone users B in an area, and not specifically tied to the Internet user A @. F1 Step2. Telephone user B dials the phone number of service access gateway C.

F1 Step3. Registry D is queried by gateway C on the caller line identity B # to determine the associated VOIP contact for user A.

F1 Step4. Gateway C resolves user address A @ to the current IP endpoint where its VOIP client is registered, which could be through login or other known methods, ringing the destination A with caller line identity B #.

Thus a named VOIP user A @ may be bound to telephone number B # with whom communication is desired, in a service registry D, and when B dials a telephony access gateway C then connecting the caller B back to the VOIP user A @. The vector:
 AB: BC: BA
Which yields a reverse switching matrix that may be symbolically represented as:
 A B D
 B C D
 D B A
Where registry D is the persistent data store binding A and B.

Thus telephony connections are switched on "source", the caller identity, rather than switching purely on dialed "destination", the called identity, thereby reverse mapping the conventional E164 dial plan of the caller. This reverse switching permits alphanumeric contact from any legacy telephone without change, thus enabling legacy telephones into "future IP compatible devices". That is, any conventional telephone designed before IP telephony was introduced, phones that have a numeric only keypad and phones without any specialized software capability, are permitted to dial and connect to any IP telephony endpoint without modifying the handset.

This "IP retrofitting" that delivers backward device compatibility, is made possible by hooking the new service functionality into a conventionally established call to a gateway access node. Any Internet VOIP user who identifies a conventional telephone number as contact, becomes instantly "discoverable" to the same calling telephone identity presenting at the gateway to the IP cloud.

This reversed switching algorithm can be used to advance IP Telephony convergence in that it permits any conventional telephone user to dial, programmatically discover, and connect to any VOIP user in the world who has previously identified them by phone number.

By entering and associating conventional telephone numbers of contacts they wish to establish communication with, an Internet and alphanumerically addressed client thus becomes "reverse addressable" on the conventional numeric keypad.

On identifying telephone contacts, VOIP users can reverse identify themselves to the same, thereby conclusively resolving the conundrum "how to address alphanumeric connections on a numeric dial pad" (by addressing the numeric telephone counterpart on the alphanumeric device in advance).

This "reverse switching singularity", in logically transforming all legacy telephones into IP compatible devices without physically modifying the telephone, delivers a defining VOIP service virtualization to "paying customers", whose online telephone numbered accounts are systematically created, and whose online contacts are automatically hydrated by and with the users who identify them.

Since the data that comprises online telephony contact can persist in a Service Registry, the "reversed calling line identity" now defines the relationship between VOIP (named) users and their associated (numeric) telephone contacts, making it possible to reverse connect the latter with the former on extracting call line identity at a local gateway interconnecting the two domains.

FIG. 2

FIG. 2 shows detailed logical interaction between core elements.

F2 Step1. Internet user A(30) enters the telephone number B(10) of a contact into the VOIP client software. In one embodiment the telephone number B is entered into the client contact list and thus identified prior to actually dialing the number. In another embodiment user A calls telephone B by entering the phone number using a software telephone dial pad or using the numeric keys on the PC keyboard and B is thus identified on dialing.

In the present embodiment being described and illustrated, the telephone number is entered as a conventional VOIP contact with the exception being that the "screen name" is set as the phone number. That is telephone contact B is recorded by entering their "number as named object" (NANO) which the system then transforms into a corresponding "virtual numbered VOIP client", accessible only to a matching telephone identity calling a service gateway.

Describing this NANO client creation in greater detail, by accepting a phone number as the named contact, a "numbered VOIP name space" and community may be canonically captured and generated. And while any conventional VOIP user is permitted to generate the NANO client, by entering its phone number, "unilaterally assisting them into creation without permission", only a telephone with a matching identity may access it.

While selected embodiments imply the "automatic acceptance" of any VOIP user A into the contact list of NANO client B, basic service software functionality may permit telephone user B to selectively accept or decline VOIP contacts as they are automatically inserted. NANO clients may also be alerted to their automatic account creation, advised of the local Gateway telephone access number and notified of contact insertion. These alerts may be delivered via any number of bearers, including SMS and email (when the latter address is included by the identifying net contact). One such welcoming text display could read:

welcome to nano.
from: ak@starlogik.com
call me on 17132421581

Similarly offering NANO account "management functions" will be evident to the skilled artisan. For example, the ability to "PIN protect" telephone access to the B NANO client. In one such embodiment, the system may automatically generate a PIN password that is securely delivered to the B party on their NANO client creation (when the first VOIP contact A enters the B phone number as described).

Alternatively an automated calling attendant may dial and welcome the client reading the PIN to the B telephone owner. Proxy hosted menus and services presented to the connected B party may use standard voice scripting and rendering protocols such as VoXML, to transport voice logic from the application to the Gateway, where IVR (Interactive Voice Response) then generates and manages the audio interface presented to the caller. Once such service may allow PIN bypassing (deactivation) for seamless telephony access to the NANO client.

Further, similar basic software functionality in the NANO B client may permit telephone user B to selectively set status indication on a per contact basis, to prevent unwanted disclosure. Thus, while the embodiments and associated illustrations present the "minimum set of features" they are in no way limited nor restricted to them.

Describing this NANO technology in more detail, conventional VOIP systems typically preclude users from registering numeric only identities, and in particular numeric telephone identities comprising 10 or more digits. Given that the primary identifier for online service creation is an email address, many such online services derive and extend their user communities and directories on authenticating users via email links.

For example, a user with an email address "ak@starlogik.com" wishing to register with an online service "ABC dot com" using the unique (unallocated) screen name "AK", may receive an email at the above address containing a link with an authorizing session identifier "12345abcd" (as in "www.abc.com/?a=2345abcd").

Continuing with this example, since ABC dot com is awaiting activation and confirmation of the link sent to the email address disclosed, when the link is activated the service can with high degree of certainty conclude that the email address belongs to the registering user, since the user is required to have authorized access to the email account in order to activate the service link sent.

While users may know each other by email address, their registered (screen) names are typically unknown. In order to facilitate the location of a particular user, many services provide a directory lookup that can locate registered users by email address, and when located then return the associated "screen name".

If the registered user has elected to disclose additional personal information, for example a telephone number, with the service provider, then it is conceivable to locate the screen name by searching the directory on such a "phone number field". However as described above, searching for a user by entering a telephone number as the registered screen name, would typically fail to locate such a user.

Consequently if a VOIP user searches a service directory for a user by a specifying the telephone number as the screen name, the service would typically return, "user not found". This directory exception may now become the placeholder for a global new service rule:

"The automatic and systematic creation of the B numbered user account, and the automatic population of the A identities as its online contacts".

This system generated "numbered account", the virtual client whose screen name is now set to their telephone number, is then made accessible only to the matching telephone identity calling a service Gateway, where the calling device identity is now equal to the system registered VOIP user account name.

Thus, a single modification to a service registry procedure that previously would preclude users from manually registering a telephone number as a VOIP user, and which would consequently return a "user not found" exception when searching for a screen name comprising a telephone number, can now permit conventionally registered VOIP clients to unilaterally add phone numbers (10 digit and longer numeric identities) as system generated and registered VOIP contacts that automatically assemble their own contact lists and inherit the presence properties of conventional VOIP clients.

While it is conceivable to permit users to register online and authenticate their telephone number as the screen name, thereby "unifying internet and telephony identities" (as disclosed below in one related embodiment), such a service is predicated on the user having internet access to begin with.

Rather than prescribing Internet access, NANO B clients may be generated and administered virtually, from the existing VOIP user base A who identify them in advance by phone number. As such, the mass telephone market B, is registered and captured without any such Internet access and capability required whatsoever. All that is required for B party participation is a conventional telephone call to a local access Gateway.

Continuing now with FIG. 2:

F2 Step2. Upon entering the B number as described, the VOIP service provider creates a virtual account using the telephone number B as the service screen name and records Internet user identity A as a contact, thus binding and associating internet user A with telephone number B in a database registry D(40).

F2 Step3. NANO client B is thus systematically created and automatically hydrated with net contacts A(I) through A(n), each who have entered telephone number B as a contact in their VOIP client.

F2 Step4. Telephone user B dials VOIP access gateway C(20) presenting caller line identity B at the signaling layer (not shown). In one embodiment, the call is held in the signaling state, that is the call is not answered and thus not connected, until it has been ascertained that at least one associated VOIP user A is online, as per Steps 7 and 8 below.

F2 Step5. On receiving the inbound connection from B, Gateway C instantiates a virtual NANO client (B #) that serves as the VOIP client proxy to caller B. That is the B client proxy is automatically spawned on B connecting to C.

This VOIP proxy is a "server side client application", programmatically launched and controlled, with the gateway supporting and translating communication protocols between the IP and Legacy telephony domains. The proxy application is thus logically coupled to Gateway C and may physically execute on attendant servers at Gateway C (as shown).

Alternatively the client proxy application may execute remotely at a node connected to Gateway C. In either configuration, Gateway C and Proxy B are referenced interchangeably in this disclosure. The B client proxy instantiation is flow charted in FIG. 8 below.

F2 Step6. B Proxy automatically "signs into the service", registering its IP address and port ("IP x:y") in service registry D(40) permitting other VOIP clients to locate its current address.

F2 Step7. On registering with the service, B proxy receives a list of its automatically associated net contacts A(n) as described.

F2 Step8. On receiving the contact list, the B client proxy "advertises" its online presence to each contact, using known methods. Online presence information may include the current IP address and port where the B proxy is located. Similarly Proxy B receives online status information for each contact A.

On receiving the online presence published, conventional VOIP client software at A adjusts the B status indicator to reflect "online presence" as described below. Although the advertised presence illustrated shows unilateral publication from the B proxy to A clients, it is typically a bidirectional process. That is on publishing its presence to A, B receives online status indication from A in return (not shown).

F2 Step9. Substantially simultaneously to advertising its online presence, B Proxy presents caller B with an interactive session, titled "C menu". In one embodiment this interactive session plays music on hold (MOH) to B until a VOIP user A originates an inbound call to B (by clicking the now online contact displayed in the VOIP client address list).

Since Proxy B has advertised its "on net presence", MOH allows VOIP users who have greater call and contact "visibility", compared with the B telephone audio interface, to drive the connection. This advantageously allows caller B to connect to the Gateway and "await the arrival and announcement" of the incoming and previously rendezvoused connection from A.

If a single Internet contact A is associated with phone identity B, or alternatively if only one net contact A is online and available, the Gateway in one embodiment may announce that default (automatically selected) contact by name to the caller using known text to speech methods, and request the B party to "hold the line", at which point it is then set to ring the A party presenting B as the calling identity.

By announcing the default contact and by requesting caller B to hold the line, the service presents what may be termed a "secondary caller line identity". With secondary CLI, the service identifies the intended destination to B prior to ringing and alerting A, and as such limits the B party exposure. If caller B chooses not to hold the line and thereby not connect through to the default contact A, the destination remains unaware of the decision to cancel the call.

F2 Step10. On identifying the intended destination A, through a default selection as above, else through explicit B selection as detailed below, A and B are logically connected.

F2 Step10x. If VOIP user A initiates contact by selecting the now "online phone contact B", the call is routed to the B Proxy client where the calling party A is announced to telephone user B, in what is herein termed a VOIP originated call.

It is important to note, unlike conventional call completion and ringing, where a call to telephone B would necessarily terminate and ring the device over the legacy PSTN/PLMN network, since the B party is already connected to the service Gateway and may be located at the registered Proxy IP endpoint, it is alerted to the incoming call "ON net".

That is the VOIP call is routed and terminated at the B servicing Gateway and Proxy, rather than conventionally ringing the telephone over the legacy network. "ON net" call presentation is described below in greater detail with reference to FIG. 7.

In one embodiment the call announcement at Step10x may present as a "soft ring", that is a ring that is played "in channel" directed to the already connected (ON net) B party, followed by text to speech rendition of the A party user name. In another embodiment, on VOIP user A initiating contact to the online telephone B, A may be prompted to speak their name and thereby be announced by "a personally recorded sound bite" which is then played to B.

On receiving and accepting the A party announcement, A and B are bridged and connected and full duplex speech paths are established. If VOIP user A initiates contact and B is presently engaged on an active call with another VOIP user, standard multi call handling functions may be activated by the B proxy client and made available to the telephone user B. Such call control functions include automatically placing the active B call on hold to answer the new A call, and allowing user B to selectively conference active calls.

In another embodiment the interactive session presented to B plays a list of VOIP contacts for selection. If a plurality of Internet contacts A(n) are located (as shown) in one embodiment Gateway C engages caller B in an interactive session to determine which associated net user B wishes to establish contact with.

The list of associated VOIP contacts presented (the B party "net extensions"), may be partitioned between contacts that are "online and available" and contacts which are "offline and unavailable". This interactive selection process is described in greater detail below with reference to FIG. 15.

F2 Step10y. If B makes a net contact selection, Gateway C "invites" destination A by ringing the user with the caller line identity presented by B. If A answers the call, A and B are bridged and connected with full duplex speech paths, in what is herein termed a VOIP terminated call.

To the skilled artisan it will be clear that at Step10x/y VOIP user A may be connected and talking to conventional telephone user B, at no charge. Conversely, telephone user B may be globally connected and talking to Internet user A, at the local call rate incurred in connecting to Gateway C.

The artisan will also appreciate the hybrid nature of the resultant call, where the first communication BC is circuit switched voice, and the second communication CA is packet switched media.

FIG. 3

Describing the "Tele ON net presence" in greater detail with reference to FIG. 3, which highlights the Tele IP Presence Protocol fundamentals, seamless tele-presence is delivered to legacy VOIP clients without change.

F3 Step1: Telephone user B(10) dials and presents caller line identity B to VOIP access Gateway C(20).

F3 Step2: C instantiates a virtual NANO client (B #) that acts as the VOIP client proxy to caller B. Since the Proxy appears to the VOIP community as a conventional client, service properties, including "online presence" are inherited.

F3 Step3: B Proxy registers its telephony IP address and port (IPx:y) with service registry D(40) permitting other VOIP clients to locate it. On registration, B proxy receives a list of previously recorded net contacts A(n) as described above.

F3 Step4: On receiving its net contact list, the B client proxy "advertises" its online presence to each contact. In the context of this disclosure, the term advertising is used to describe the process whereby one VOIP client notifies another of a change in its online status.

In P2P systems clients typically both notify and receive notification in return. In one such system the B Proxy broadcasts its online presence to all its A contacts listed and receives the online status of each A contact in return.

F3 Step5: In the absence of a telephony presence protocol, conventional VOIP client software would typically present telephone contacts as generic "phone icons", without any status indication whatsoever.

F3 Step6: On receiving online presence information published by B, conventional VOIP client software may now adjust the B contact status indicator to reflect "online status" as shown and represented by the "check mark".

Certain state indicators may be automatically selected and presented, for example, if caller B is actively engaged on a call with another user, the client proxy may publish an "on call" status. For simplicity, the default status described and indicated in the embodiments is "ON/OFF net".

It will be clear to the skilled artisan that more "granular online presence" may be indicated by the B Proxy client, for example by permitting phone B to select amongst a plurality of online status indicators, including common states such as "available", "invisible", "busy" and "Do Not Disturb".

While this illustration presents the NANO client "screen name" as the telephone number, it is common for VOIP client address books to allow users to enter a more recognizable "username", which is then displayed in conjunction with or in place of the screen name.

For example, assuming VOIP client A enters "AK" as the username for the NANO "14154125111" screen name, the displayed contact in the panels depicted in Steps 5 and 6 could then read "AK 14154125111" or simply "AK".

The numeric screen name presentation in the embodiments has been adopted to avoid confusion between the newly disclosed and system generated "telephone number screen name" and the conventional "alphanumeric screen name".

This also serves to highlight that a telephone contact may now be presented as a "conventional VOIP client" albeit it a purely numerical one.

FIG. 4

Continuing with Tele Presence as disclosed above and describing now a more personalized function with reference to FIG. 4, which illustrates Tele IP Presence Protocol Aliased.

F4 Step1. VOIP user A(30) enters the telephone number B(10) of an existing and conventional VOIP contact with screen name Ab, thereby aliasing the resultant NANO B client as net contact Ab. Similarly, any conventional VOIP contact "An" may have their telephone number thus associated.

Since NANO client B has "owner alias Ab" information recorded, this online presence may indicate to user A that "Ab" rather than simply "B" is now online. Similarly if B requests connection to A, named caller identity (Ab) may be presented rather than just B ("number") line identity.

F4 Step2. On entering the telephone number B of contact Ab, service registry D creates or updates the B NANO client address book by recording both "A as the net contact" and "Ab as the net owner alias".

F4 Step3. The B client now has both the net contact A and the B screen name alias whose telephone number was entered by A. This telephone number is unauthenticated, since A is the disclosing party. However in a related embodiment, owner authenticated phone numbers may be automatically propagated to users online address books, thereby automatically and securely populating the telephone number field of a contact.

While it is typical for online contact address books to support any number of related information fields, of which a phone number may be one, these collateral contact fields are "passive" in nature. That is they do not display nor inherit any VOIP client functionality.

In one embodiment, the aliased system permits VOIP user A to record a single unified "VOIP and NANO telephony contact", by adding a telephone number to an existing VOIP address book entry. However unlike a passive phone number field, the system automatically "activates and transforms" the embedded telephone number field into a NANO virtual client as described.

As such when the telephone and its associated NANO client registers as "ON net", rather than separately indicating and identifying "B online presence", the online status indicator for the aliased contact is updated, thereby presenting a consolidated status and single view of the contact.

As described in FIG. 3 above, when B dials and connects to Gateway C, it instantiates and registers the B Proxy client with service registry D(40). On registration, B proxy receives a list of previously recorded net contacts A(12n).

F4 Step4. On receiving the contact list, the B client proxy "advertises" its online presence to each contact. However in addition to publishing the B client details, the aliased system and method now publishes both B and the alias data set. This permits net contact A to update the status of the alias.

F4 Step5. By example, a conventional VOIP contact with screen name "babybel", which also has a telephone number 14154125111 (abbreviated " . . . 5111") is shown in "OFF line" status as indicated by the "X" icon.

F4 Step6. Continuing with this example, on receiving online presence information published by Proxy B, VOIP A client software may now adjust the VOIP contact "babybel" to reflect "online status", as shown by the "check mark". While a conventional online icon is displayed, an icon depicting "tele-presence" (that is the contact is online via phone) may be indicated to differentiate from "conventional presence" (where the contact is connected via PC).

FIG. 5

Figure 5:
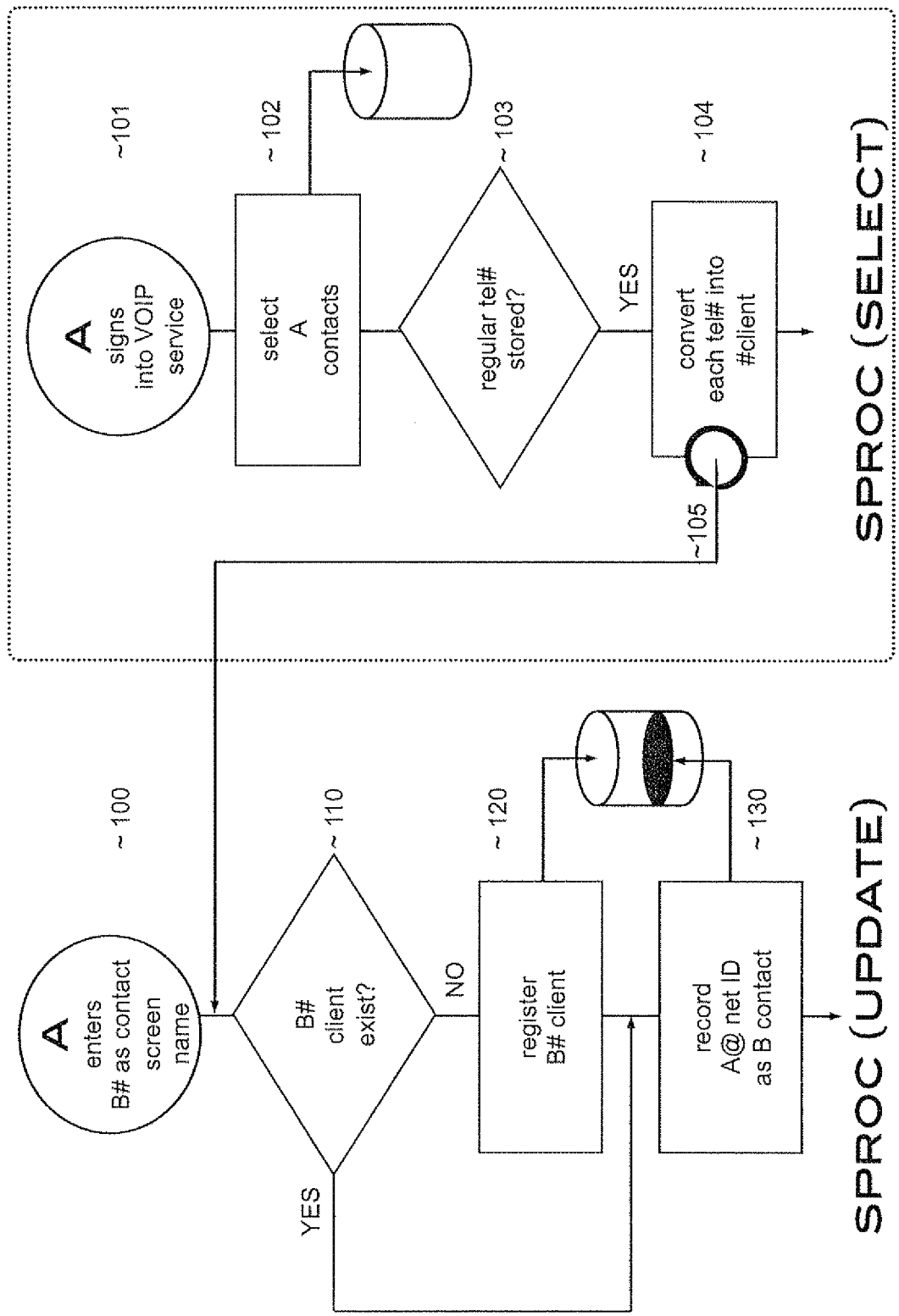
FIG. 5: Sample Stored Procedures transforming contacts.

With reference to FIG. 5, Sample Stored Procedures transforming contacts from conventional telephone numbers into NANO virtual numbered clients is flowcharted.

The left panel charts a typical stored database procedure that executes on updating contacts (for example inserting a new, changing an existing) in a registry.

The right panel charts a typical procedure that automatically executes on selecting previously recorded contact information from a service registry.

The latter procedure permits the VOP service provider to automatically convert all conventionally recorded telephone number contacts that are already in the system to the new NANO client format as disclosed without user intervention.

Describing the Left Panel:

F5 Label~100: User A enters phone number B as a contact screen name.

F5 Label~110: Service checks whether a B # client exists in the service registry.

F5 Label~110: [No] IF no such B # client exists logic flows to ~120

F5 Label~110: [Yes] IF the B # client exists logic flows to ~130

F5 Label~120: Service creates a new VOIP client with B # as the screen name in the service registry.

F5 Label~130: Service records user A as a VOIP contact in the B client contact list. B now has A as a net contact.

With reference to the Right Panel:

F5 Label~101: User A signs into the VOIP service.

F5 Label~102: On authenticating A (not shown) the service retrieves all recorded contacts from a service registry.

F5 Label~103: Service determines if any regular phone number contacts exist in the returned contact data set. If so logic flows to ~104 otherwise regular service login continues (not shown)

F5 Label~104: Service automatically converts each conventionally recorded telephone contact into the corresponding B # client as described per ~110 in the Right Panel above.

FIG. 6

Figure 6:
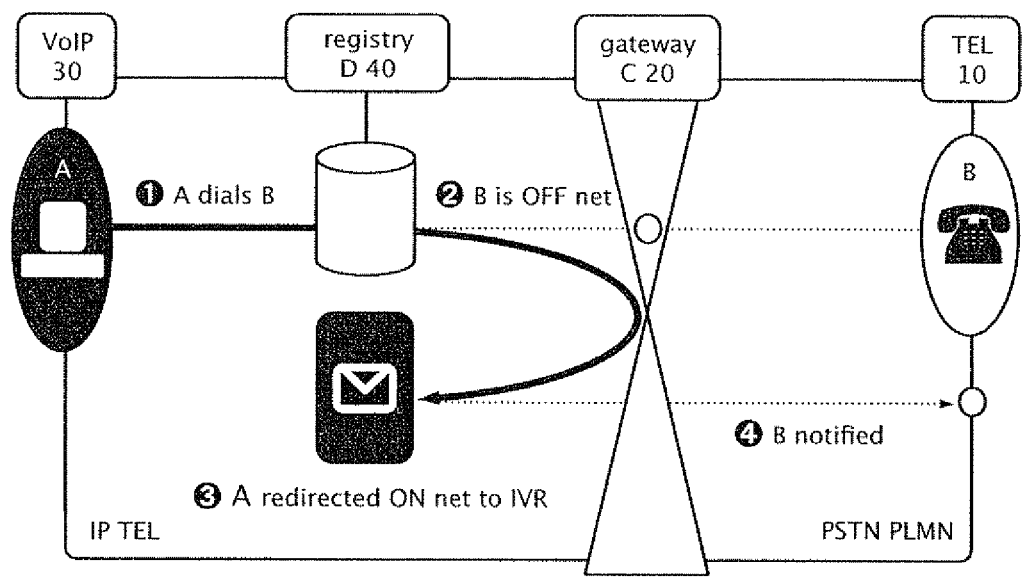
FIG. 6: VOIP originated call flow to phones OFF net.

Describing now with reference to FIG. 6, a VOIP originated call flow to phones OFF net, being the state assigned to phones that are disconnected from the service gateway.

F6 Step1. Internet user A(30) dials telephone number B(10). The call is switched and routed toward Gateway C(20) interconnecting to the PSTN. C is an "edge gateway" that is local to the B destination network.

F6 Step2. In one embodiment, VOIP client A is aware of the B phone status and location as advertised and disclosed in the Tele IP Presence protocol described in FIG. 3. As such, call routing logic may be determined at the client.

In another embodiment, a VOIP proxy server (not shown) determines which gateway to route the connection toward, based on the country and in some instances the network code in the B number. Such a proxy server now queries registry D(40) to determine whether the NANO B client proxy is active and registered, as described earlier in FIG. 2.

In a further embodiment Gateway C, on receiving the inbound connection from A, performs the query to determine whether the NANO B client proxy is active and registered. Regardless of which network node determines the availability of the B client proxy, since in this example telephone B is not connected to C, it has no active proxy and IP endpoint in D and is thus determined to be "OFF net".

F6 Step3. On determining that telephone B is "OFF net", that is it is disconnected from gateway C, the network node currently processing the connection request from A, redirects the call to an Internet hosted messaging platform, an IVR (Interactive Voice Response) system as shown, thereby terminating the connection on the Internet.

F6 Step4. On caller A selecting a messaging feature directed toward destination B (as detailed in FIG. 10 below), telephone B is notified. Messages deposited by A destined for telephone B, are stored in a mailbox automatically created for B on the Internet platform. Notifications sent to B may include the actual message, or may include a linked reference to the message, the content of which is retrieved when B connects to the service by activating the link.

The advanced "ON/OFF net" device state determination and resultant switching for VOIP originated calls addressed to legacy telephones, uniquely ensures that all such Internet originated calls terminate on the Internet, and consequently remain within "the free service domain".

While nominal cost may be attracted in delivering notification messages, there is no associated "clocked terminating penalty", no air time consumption and billing, as all circuitry required to connect when B is "ON net" and to record and deposit a voice message when B is "OFF net", is established on the Internet, rather than over legacy networks as is required with conventional switching methods.

FIG. 7

Figure 7:
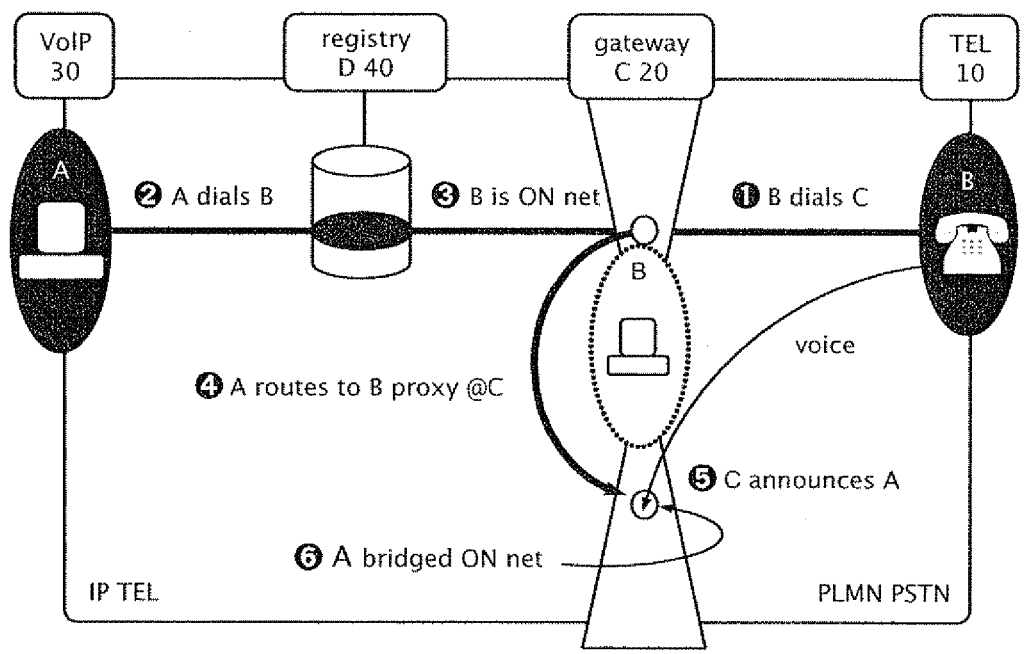
FIG. 7: VOIP originated call flow to phones ON net.

Continuing with Internet call routing, FIG. 7 describes a VOIP originated call flow to phones "ON net", being the state assigned to phones that are connected to the service gateway.

F7 Step1. Telephone B(10) dials and connects to Gateway C(20), instantiating a B client proxy that registers its IP address and Port with registry D(40) as described above in FIG. 2.

F7 Step2. Internet user A(30) dials telephone number B(10). The call is switched and routed toward Gateway C(20) interconnecting to the PSTN.

F7 Step3. In one embodiment, VOIP client A is aware of the B phone status and location as advertised and disclosed in the Tele IP Presence protocol described in FIG. 3. As such, call routing logic may be determined at the client.

In another embodiment, a VOIP proxy server (not shown) determines which gateway to route the connection toward, based on the country and in some instances the network code in the B number. Such a proxy server now queries registry D(40) to determine whether the NANO B client proxy is active and registered, as described earlier in FIG. 2.

In a further embodiment Gateway C, on receiving the inbound connection from A, performs the query to determine whether the NANO B client proxy is active and registered. Regardless of which network node determines the availability of the B client proxy, in this example telephone B has already connected to C, it has an active proxy and IP endpoint registered in D and is thus determined to be "ON net".

F7 Step4. On determining that telephone B is "ON net", that is, connected to gateway C, the network node currently processing the connection request from A routes the call to the B client proxy at C, terminating the connection on the Internet.

F7 Step5. On terminating the call at the B client proxy, the calling party A is announced to telephone user B as described in FIG. 2 Step 10x above. The VOIP originated call is thus routed and terminated at the B servicing Gateway and Proxy, rather than conventionally ringing the telephone over the legacy network.

F7 Step6. On accepting the announced call A and B are bridged. The telephony bridge is constructed by merging the RTP media stream established on the call path between A and C ("the internet leg") and the TDM voice circuit between B and C ("the conventional leg"). The bridge performs any protocol conversions between the telephony domains.

FIG. 8

Figure 8:
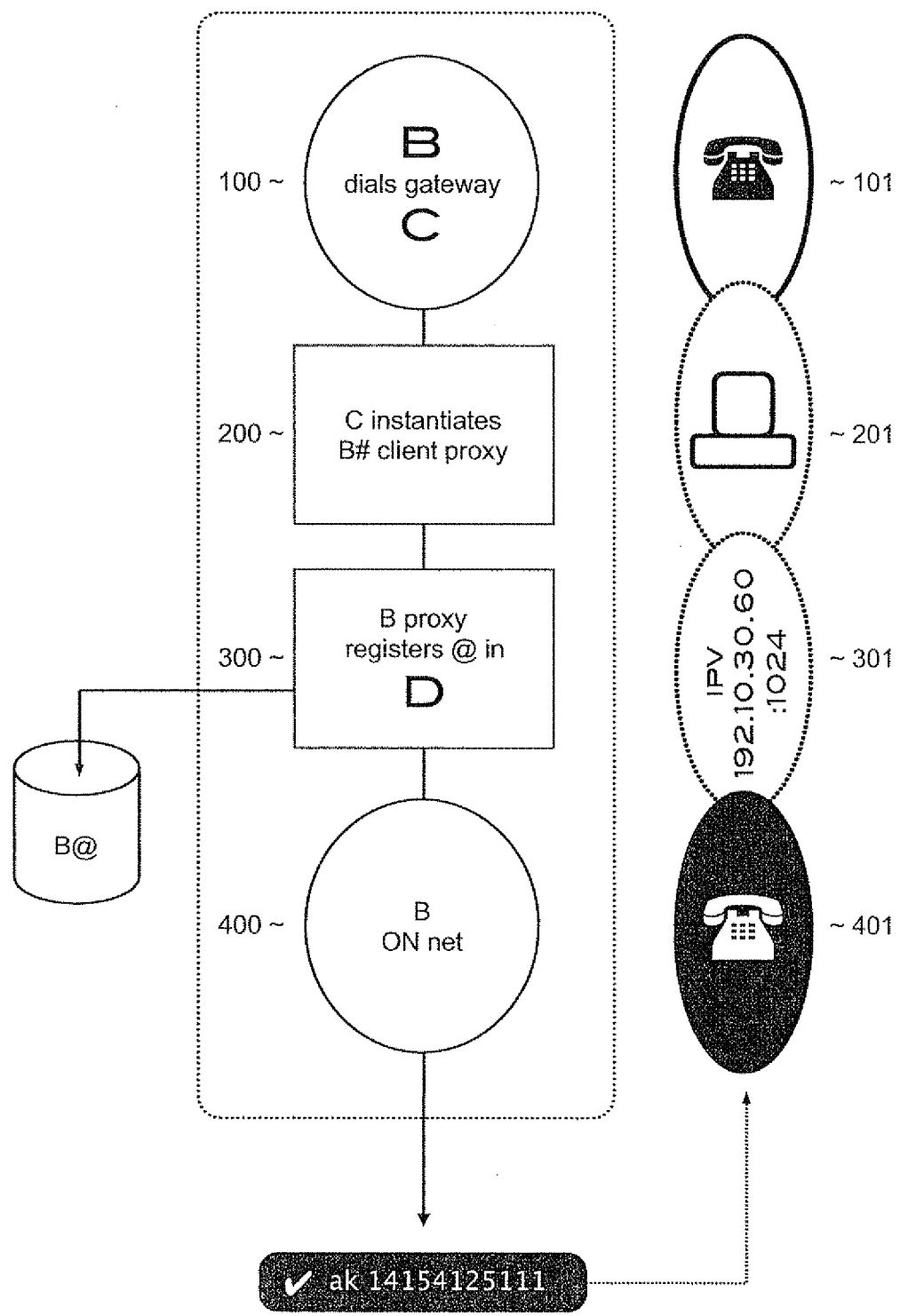
FIG. 8: VOIP virtual client proxy instantiation.

The disclosed telephony IP presence protocol that governs the "ON/OFF net" caller state is in the affirmative, the "ON net" state, contingent on the establishment of the NANO client proxy. FIG. 8 flow charts the VOIP virtual client proxy instantiation.

F8 Label~100: Telephone user B(10) dials Gateway C(20).

Prior to dialing Gateway C, phone B is in an "OFF net" and disconnected state, depicted by Graphic ~101 (solid white filled elliptical, enclosed black phone). The "OFF net" state is the default state, determinant in the absence of the VOIP proxy and resultant IP address registration.

F8 Label~200: On call setup, C receives calling line identity information (B #) associated with device B. C then programmatically spawns a virtual VOIP client that signs into the VOIP service using B # as the service screen name. The Client Proxy is depicted by Graphic ~201 (dotted white elliptical, enclosed black PC).

As mentioned earlier in the embodiments, this VOIP proxy is a "server side" client application, programmatically launched and controlled, with the gateway supporting and translating communication protocols between the IP and Legacy telephony domains.

The proxy application is thus logically coupled to Gateway C, and may physically execute on attendant servers at Gateway C. Alternatively the client proxy application may execute remotely at a node connected to Gateway C. In either configuration, Gateway C and Proxy B are referenced interchangeably.

In one embodiment the VOIP client application thus launched uses a default system password coupled to the B # screen name when signing into the service. In another embodiment the system may request a password from the caller prior to the Proxy signing into the service.

During this client proxy instantiation and service registration, B may remain in a logically connected state to C. That is, B may be connected to C via a call setup and thus signaling channel, until such time as the call is explicitly answered and accepted by C. Alternatively, B may physically connect to C, that is C may answer the call establishing a voice circuit between B and C.

One advantage to holding the connection in the signaling state is that caller B is not charged until the client registration is complete. In one embodiment, B may hear an extended "ringing" and remain in this quasi connected state until at least one associated VOIP net user A is available and online to receive a call, as described earlier.

In a further embodiment, B is only physically connected when a VOIP user A requests a connection to B, as per FIG. 2 Step10x. In one such an embodiment, B would hear an extended primary ring, while connecting to the gateway, followed by a secondary "ring" on the gateway answering B, to indicate an inbound connection has presented, followed by the caller A announcement as described.

F8 Label~300: On signing into the VOIP system, the VOIP client proxy registers its IP address and Port with registry D(40). This Internet address describes the VOIP endpoint to which calls may be directed. The IP address is depicted by Graphic ~301 (dotted elliptical, enclosed IPV4).

By example, one such virtual client proxy registration may be recorded, and subsequently located, as user "14154125111@sky.com", where "14154125111" is the B calling line identity and "sky.com" the VOIP service provider realm. Dialing this Virtual VOIP client would then resolve to the IPV4 address "192.10.30.60" and port "1024" endpoint as depicted.

F8 Label~400: When the B client proxy registration is complete, B is "ON net" as depicted by Graphic ~401 (solid black filled elliptical, enclosed white phone) and by the conventional VOIP client online status indicator ("ticked"). B telephony presence is then advertised to associated VOIP users A as described in FIG. 2 above.

FIG. 9

Figure 9:
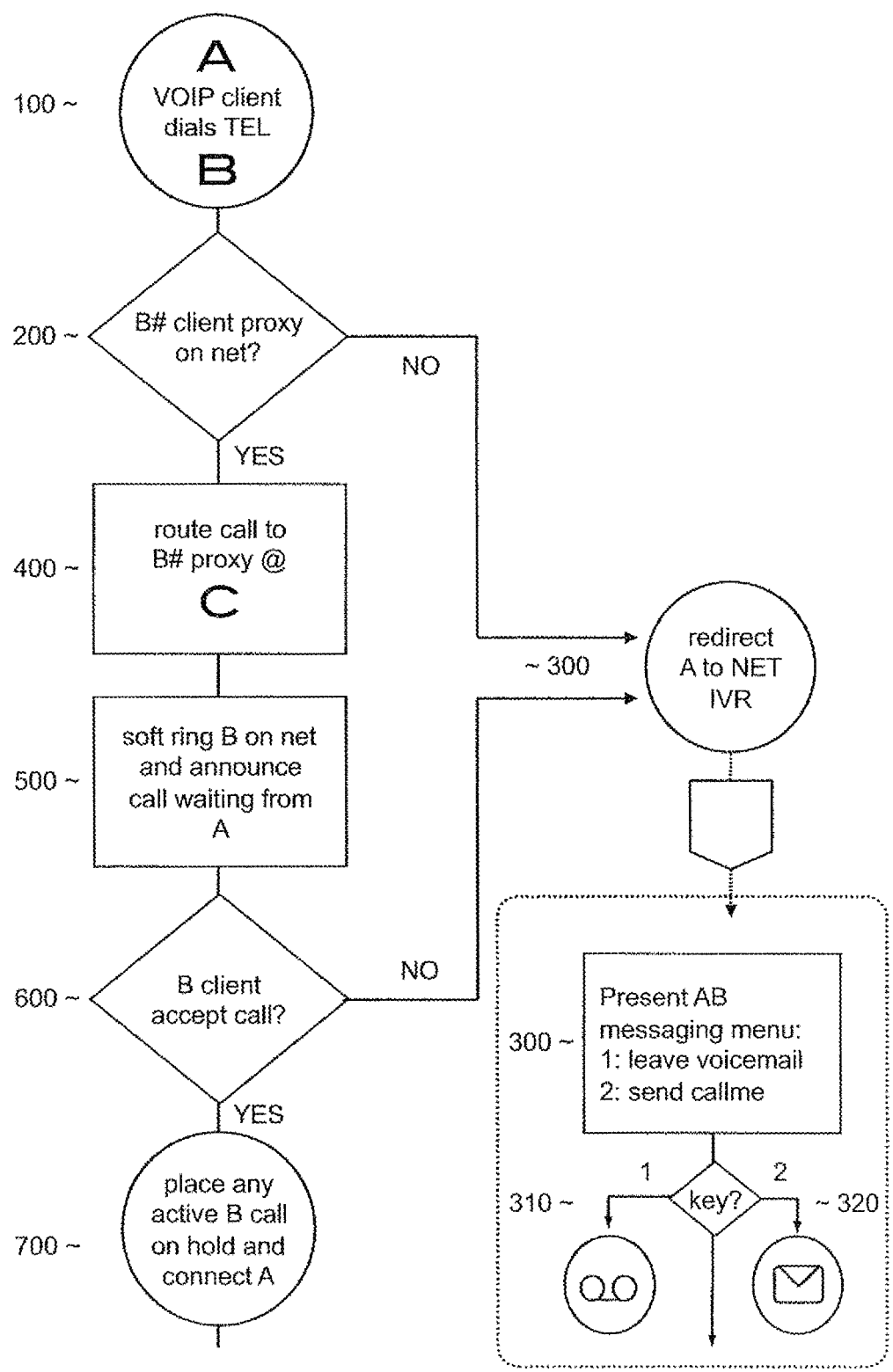
FIG. 9: VOIP ON/OFF net switching flow chart.

The IP telephony presence protocol described, controls IP originated call routing described now with reference to FIG. 9, which presents the VOIP ON/OFF net switching flow chart.

F9 Label~100: VOP user A dials telephone user B.

F9 Label~200: During call processing the VOIP system determines whether phone B is ON/OFF net.

In one embodiment this determination is made on assembling the NANO B client service name, by example "14154125111@sky.net", to which the connection request is addressed. On addressing the connection thus, the service then resolves the user name into the current location of the B proxy client by querying a service registry (not shown).

F9 Label~200: [No] If the service registry does not contain an active and current address location for the B proxy client, B is OFF net and logic then flows to ~300.

F9 Label~200: [Yes] If the service registry does contain an active and current address location for the B proxy client, B is ON net and logic then flows to ~400.

F9 Label~300: Caller A is routed to an Internet hosted Interactive Voice Response (IVR) messaging platform. The messaging functions provided by this platform are described in greater detail in FIG. 10 following.

F9 Label~400: Caller A is routed to the IP address and Port where the B client proxy is located at Gateway C.

F9 Label~500: On receiving the incoming call request from A, Gateway C in one embodiment alerts the connected phone B by presenting a short secondary ring ("the soft ring")"in channel" and announcing the A user identity, as described earlier in FIG. 2 Step10x above.

F9 Label~600: On presenting the call from user A, gateway C awaits acceptance from user B. In one embodiment B may be requested to press a predetermined key in order to accept the call. In another embodiment B may accept the call on issuing a predetermined voice command. In one embodiment B may decline to accept the call by failing to provide any response or input to the announcement.

F9 Label~600: [No] If B does not accept the call, the connection is rerouted to the Internet messaging platform as per ~300 above F9 Label~700: [Yes] If B accepts the call, C places any active B call on hold and connects A as described earlier in FIG. 2 Step10x above.

FIG. 10

Continuing with IP call routing in FIG. 9 Label~300, the Internet Messaging functions presented to VOIP user A calling phone user B, who is either OFF net or declines to accept the call are now described with reference to FIG. 10, which illustrates delivering OFF net call notifications.

F10 Label~300: VOIP user A is presented with a messaging menu directed towards phone user B (the "AB" menu as depicted).

In one such service menu, A is prompted to press "1" to send a call back message, "2" to leave a voice message recording and to "disconnect" in order to deposit a "missed call" notification.

F9 Label~310: On selecting option "I", the messaging platform automatically constructs and sends a "callme" text to phone B.

F9 Label~311: One such callme text message delivered to B, includes the A Internet user identity ("AK@sky.com") in addition to the local return gateway access phone number ("73132421581").

F9 Label~320: On selecting option "2", the messaging platform permits A to record a voice message for B. This voice message is then deposited in a "B numbered account" automatically created on the Internet Platform, with user A identity information recorded as the sending party.

F9 Label~321: One such voice message notification delivered to B, includes the A Internet user identity ("AK@sky.com") in addition to the local return gateway access phone number ("73132421581").

F9 Label~330: On selecting neither option presented, in one embodiment caller A may disconnect the call (as depicted by "X") on reaching the Messaging Platform to deposit a missed call indicator on device B.

F9 Label~331: One such missed call notification is delivered by C automatically connecting and disconnecting an outbound call to B, with caller line identity set to the local return gateway access phone number as shown. In such a notification delivery, C immediately disconnects the call "on ring back tone presentation", on receiving notification that the B party device is ringing, in order to prevent the call being answered.

On phone user B selecting the gateway access phone number and returning the call, the connection is routed back to now associated VOIP user A. If any voicemail messages are awaiting B retrieval, these messages may be accessed from the Internet Messaging Mailbox identified by the B calling line identity and played back to B, prior to optionally connecting the call to user A.

FIG. 11

While the "AB" user associations described in the above embodiments are recorded at the formative stage, during a contact capture phase (F1 Step), they may similarly and logically be recorded later during a conventional call establishment cycle. In particular associations may be recorded directly at the Gateway servicing a conventionally switched VOIP A originated call to phone B that is terminated over the PSTN.

Figure 11:
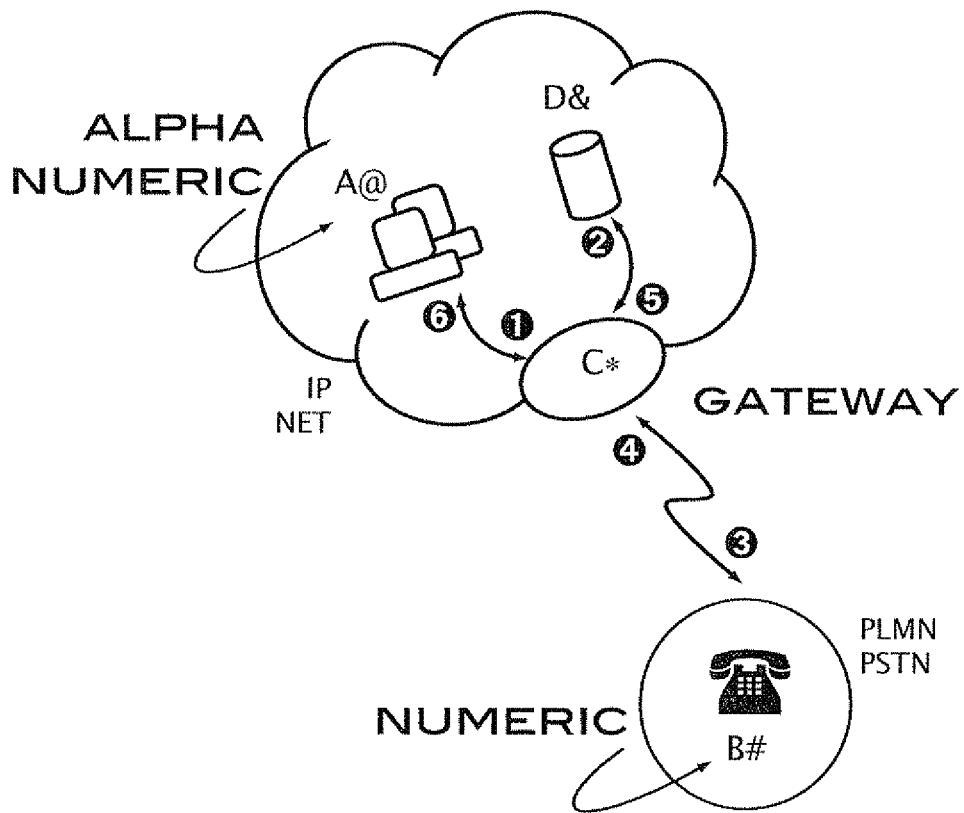
FIG. 11: Abstracted core service elements in a dial stream embodiment.

In one such a "late binding" embodiment and with reference now to FIG. 11, which depicts abstracted core service elements in a dial stream embodiment, the method and system disclosed hooks "directly into the VOIP dial originating stream", by automatically recording the logical AB relationship in an edge cached service registry, as and when a conventional VOIP call to a telephone presents at an IP Gateway to the PSTN servicing the dialed destination region.

F11 Step. VOIP user A dials phone B and connection is routed to Gateway C on what is a conventionally VOIP originated and PSTN terminated call.

F11 Step2. C receives the Internet outbound call originated from A to telephone B, and records the BA user association in local registry D.

F11 Step3. C establishes the forward connection towards B, ringing and terminating the connection on device B over the PSTN.

In one Gateway embodiment as described in the figures above, the connection between a VOIP user and a telephone user is formed by bridging a first and second call leg, AC and CB respectively, where typically B rings showing the C access number as calling party identity.

F11 Step4. Given the advanced automatic association between A and B during the forward call establishment, B may now at any time return call C and connect back to A.

This B return call may follow various A connection request scenarios, including:

(i) returning a missed call (call from A going unanswered and phone B displaying a "missed call from C")

(ii) replying to a voicemail message from A (the call having gone unanswered and caller A deposits a message)

(iii) returning a call after a conventionally established conversation has completed (A and B successfully connected).

F11 Step5. On B returning the call to access number C, the Gateway queries registry D to determine any VOIP users A associated with the calling identity B.

F11 Step6. On B selecting the desired associated contact A, as described above, B is connected through to A on a reverse (VOIP terminated) call path.

This automatic "just in time association between net user A and phone user B", recorded directly in the call signaling path and circuitry at the edge Gateway, permits any call originating from any internet user A to present "generic" gateway calling identity to telephone user B, and yet still permit B to return the call back to the originating party A, using the reverse caller identity and contact selection methods as described.

FIG. 12

Figure 12:
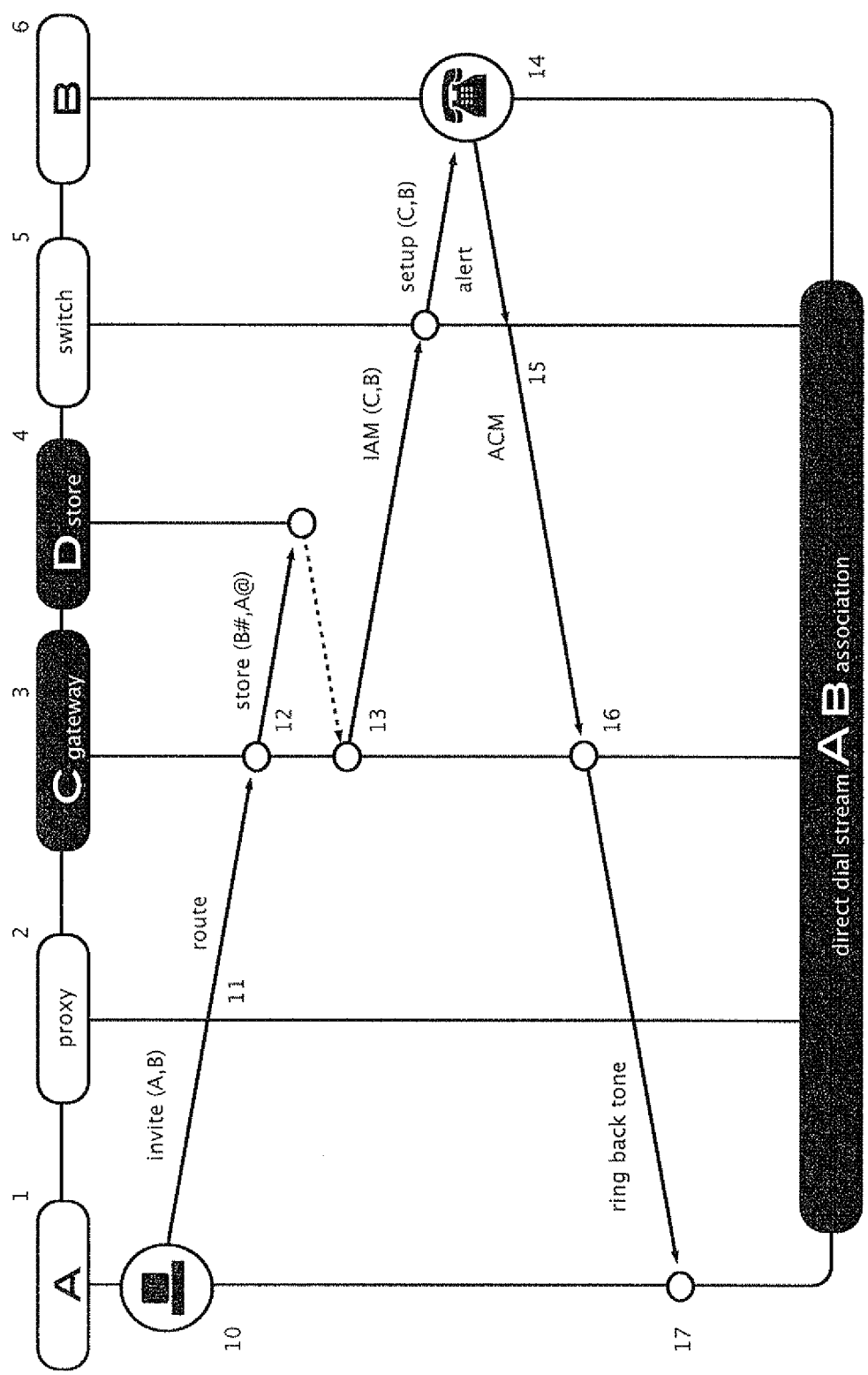
FIG. 12: Basic VOIP originated dial stream stepladder.

Continuing with one such "dial stream association" embodiment, FIG. 12 shows a basic VOIP originated dial stream stepladder that will be evident to the skilled switching artisan.

F12 Step10. VOIP user A(1) dials phone B(6).

F12 Step11. Connection is routed via optional outbound service Proxy(2) to PSTN gateway C(3) on what is a conventionally VOIP originated and PSTN terminated call.

F12 Step12. C receives the Internet outbound call originated from A to telephone B, and records the "BA user association" in registry D(4). This BA dataset includes the "B #" (the called party phone number) and the "A @" (the Internet caller identity).

The D record is thus indexed on B # as the primary access key in order to logically group all VOIP callers A contacting the same B, and to facilitate later retrieval, when B returns via C. D may be logically and physically the same node as C. Alternately D may be distinct from C (connected as shown).

F12 Step13. C establishes the forward connection towards B by typically sending an IAM (Initial Address Message) directed to destination Switch(5) servicing the telephone subscriber. The IAM message header records the phone number describing gateway C as the calling line identity.

F12 Step14. On receiving the IAM the switch forwards a call setup message to the B device, which in turn responds with an "alerting" message back to the switch.

F12 Step15. On receiving the "alerting" message, the switch returns an ACM (Address Complete Message) back to gateway C advising that the B device is ringing. B now rings displaying gateway C as calling line identity.

F12 Step16. On receiving the ACM, gateway C presents the ring back tone to caller A.

F12 Step17. Caller A hears phone B ringing.

Thus with the single additional "Step12", conventional call establishment between VOIP and PSTN domains now capture and establish a "reverse call path", accessible when calling from PSTN to VOIP, on the automatic BA association recorded along the forward path as disclosed.

Over time, this automatic reverse address association may result in a plurality of Internet Users A(n) being associated with a singular phone user B. This "BA(n)" recorded data set, representing the "N" distinct VOIP users who have called phone user B, thus forms the "B net extensions" presented when B calls C.

This VOIP A contact list may be presented to phone user B in a variety of ways, as disclosed, including presentation as a time sorted LIFO (Last In First Out) list, which presents "the last A contact first", permitting B to "hold the line" in order to connect to the most recent caller without explicit selection.

In a LIFO presentation, B may activate a key to select from the remaining list of earlier contacts. In another presentation, the contact list may be partitioned into VOIP users who are online and available, and users who are offline and consequently unavailable to accept a return call at the time B calls C.

FIG. 13

Figure 13:
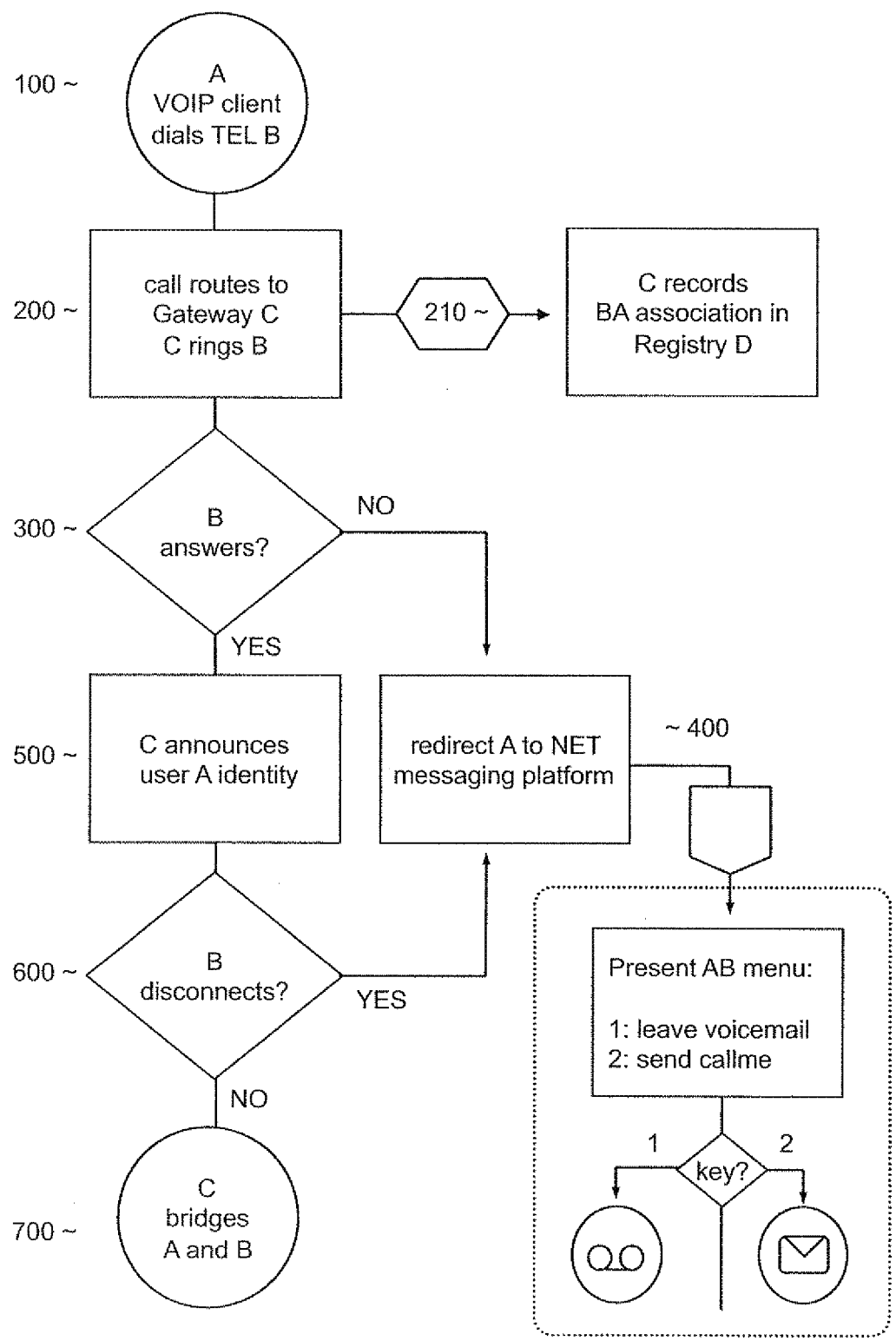
FIG. 13: Basic VOIP redirected call flow chart.

Describing a late binding call completion embodiment in greater detail with reference to FIG. 13, which shows a basic VOIP redirection call flow chart, A is redirected to an intermediary Internet Messaging Platform when B is OFF net, unavailable or when the call goes unanswered or is declined.

In one embodiment, on ringing B with generic gateway C as the primary caller identity, the connection between A and B may be asymmetrically established to deliver a secondary caller line identity feature towards party B, whereupon B answering the call, C may announce the A net identity prior to completely connecting the A party through.

F13 Label~100: A dials B.

F13 Label~200: The call is conventionally switched and routed over the Internet to PSTN gateway C, which rings telephone B.

To the skilled artisan it will be evident that the call between A and B may be logically and physically established by bridging a first and second leg, being the originating leg from A to gateway C and the terminating leg from gateway C to B ("AC and CB" respectively), with C performing the requisite protocol, and where necessary, codec conversions between the Internet and the Legacy network.

As such, call connection progression and control between A and B may be asynchronously established and separately controlled by the interconnecting gateway and attendant call processes.

F13 Label~210: In a preparatory step, C records the BA addressing information in Registry D (not shown) for future reference (when B goes "ON net" by connecting back to C).

F13 Label~300: [No]. IF B is unavailable or does not answer, logic flows to ~400.

F13 Label~300: [Yes]. IF B answers the call, logic flows to ~500

F13 Label~400: On B failing to answer, the call is automatically redirected to an Internet hosted messaging platform, permitting A to deposit a message for B without paying. That is, caller A is switched back onto the Internet to avoid the conventional terminating penalty incurred on switching unanswered calls to legacy messaging platforms.

The messaging platform may present an interactive session to A, where in one embodiment a plurality of messaging options is provided, resulting in the automatic creation of a B party messaging inbox on the Internet. Sample messaging logic is depicted in the dotted and minimized call flow panel that references the expanded FIG. 10 above.

In one such interactive session A may select between leaving a voicemail message (for example, by pressing "1" or holding the line) and sending a "callme" text notification (for example, pressing "2").

F13 Label~500: IF B answers the call, C announces the A Internet user identity, delivering what may be termed a "secondary caller line identification", in that the primary calling line identity that rings telephone device B may be set to the generic Gateway C access phone number.

In one embodiment, while C announces the VOIP user identity to B (for example using "text to speech" rendering of the A user "screen name") the A party continues to hear the ring back tone.

That is, A hears telephone B ringing, while B is being informed of the net caller identity "in band, in the CB call path". B may thus selectively decline the incoming call, for example by disconnecting, without undue exposure to A.

F13 Label~600: IF B disconnects or declines A, the AC call leg is redirected to the Internet messaging platform and call processing proceeds as per ~300 above. This call redirection may be programmatically delayed, to veil the fact that B explicitly declined to accept the call, so as to appear to A that the call went unanswered.

F13 Label~700: IF B does not disconnect after the net user identity announcement, C connects A and bridges the call to B to deliver full duplex speech paths between A and B resulting in conventional telephone conversation.

FIG. 14

The automatic net and phone user "address association" permits conventional telephony users to return calls to Internet users. Describing now one such return call originated from phone B, via Gateway C, to an automatically associated VOIP user A as described above, FIG. 14 depicts a basic VOIP terminated switching stepladder.

F14 Step10. Phone B(1) dials and connects to gateway C(3) routed via an originating Switch (2).

F14 Step11. C queries service registry (4) on B calling line identity returning, the identity of previously associated VOIP user A.

F14 Step12. C announces the associated VOIP A user identity to caller B on establishing a first voice circuit ("leg1") between B and C. If multiple A were previously associated with B, selection methods are presented as disclosed (not shown).

F14 Step13. On selecting an associated user A, where in this illustrated example caller B "holds the line" and thereby selects the default announced user A, C invites a connection between "B and A", setting the "From" contact header data as originating from phone number B.

F14 Step14. During connection invitation, service proxy (5) resolves the current location of VOIP user A, assigns a media channel back to gateway C and rings destination user A.

F14 Step15. On ringing A, system progress messages ("183 ringing") flow back to gateway C, informing the gateway that the destination is ringing. C presents the ring back tone to B.

F14 Step16. B hears A ringing.

F14 Step17. When A answers the call, a second media circuit ("leg2") is established between A and C. At this stage, C may apply one of various connection and bridging architectures, to create voice paths between A and B.

To the skilled artisan it will thus be evident that the call path between phone user B and VOIP user A may be logically and physically established by bridging a first and second leg, an originating leg from B to C and a terminating leg from C to A ("BC and CA" respectively), with C performing the requisite protocol, and where necessary, codec conversions between the Legacy and IP network.

As such, call connection progression and control between the B and A endpoints may be asynchronously established and separately administered. In one such bridging architecture, C may bridge the first and second call legs (BC and CA), transporting media flow between the two. In another architecture, C may extricate itself from the media path, bridging and passing media directly between A and B, peer to peer, whilst maintaining call signaling and process control.

FIG. 15

By introducing a "time dimension" to return call user selection, frictionless callback may be delivered from legacy to VOIP networks, permitting the phone user to "hold the line" for the most recent net contact. FIG. 15 illustrates this timed VOIP terminated switching.

F15 Step1. VOIP user A(30) dials phone user B(10).

F15 Step2. Gateway C(20) automatically records user A in a B client referenced contact database. In addition to recording the contact identity, C stamps the A record with the connection request date and time (T).

F15 Step3. This automatic contact management system creates and updates the B phone user record, listing net A user together with connection date and time (A1 and T1).

F15 Step4. Per the Tele IP Presence Protocol disclosed, in the illustrated embodiment C determines that B is "OFF net" and automatically disconnects caller A.

F15 Step5. C notifies B that a connection was requested, in the illustrated embodiment by ringing and automatically disconnecting B with caller identity set to C. This to deposits a "missed call" on B with origin set to C (as depicted by the "C" labeled semi circle arrow).

Steps 4 and 5 above describe an alternate "OFF net" switching embodiment that applies a "default notification". In this embodiment C automatically "disconnects caller A and pings destination B", rather than redirecting A to an Internet hosted messaging platform for interaction as described earlier.

F15 Step1x. Over time additional VOIP users A(2 . . . n) may dial phone B.

F15 Step2x. For each user A that dials B, C automatically records and time stamps the connection request in the B indexed contact database.

F15 Step3x. On receiving multiple connection requests from multiple VOIP users, the B contact database records a LIFO (Last In First Out) list of users A(n . . . 2, 1) reverse sorted on times T(n . . . 2, 1).

F15 Step6. B dials C, returning the missed call(s) to establish a first communication path "BC".

F15 Step7. C queries the contact database using the B calling line identity as access key and returns with the LIFO A(n . . . 2, 1) user list. In this list "A(n)" represents the most recent VOIP user that requested contact with B.

F15 Step8. C announces the "default selected net contact" user A(n) identity to B. In one embodiment this announcement is made using a "text to speech" rendition of the VOIP A username. This announcement delivers a "secondary caller line identity" feature towards B.

C may announce additional selection options (not shown) that may permit B to select inter alia, earlier contacts A(n-1 . . . 2, 1) and contacts that are "online and available". B may disconnect after hearing the default selected (most recent) contact announcement without undue exposure to the announced user.

F15 Step9. B "holds the line" in order to connect to the announced user A(n). This implicit contact selection causes C to ring user A(n) with calling line identity set to B, establishing a second communication path "CA".

F15 Step10. IF A answers the call, C bridges the first and second communication paths (BC and CA) to create voice circuitry between A and B.

FIG. 16

Figure 16:
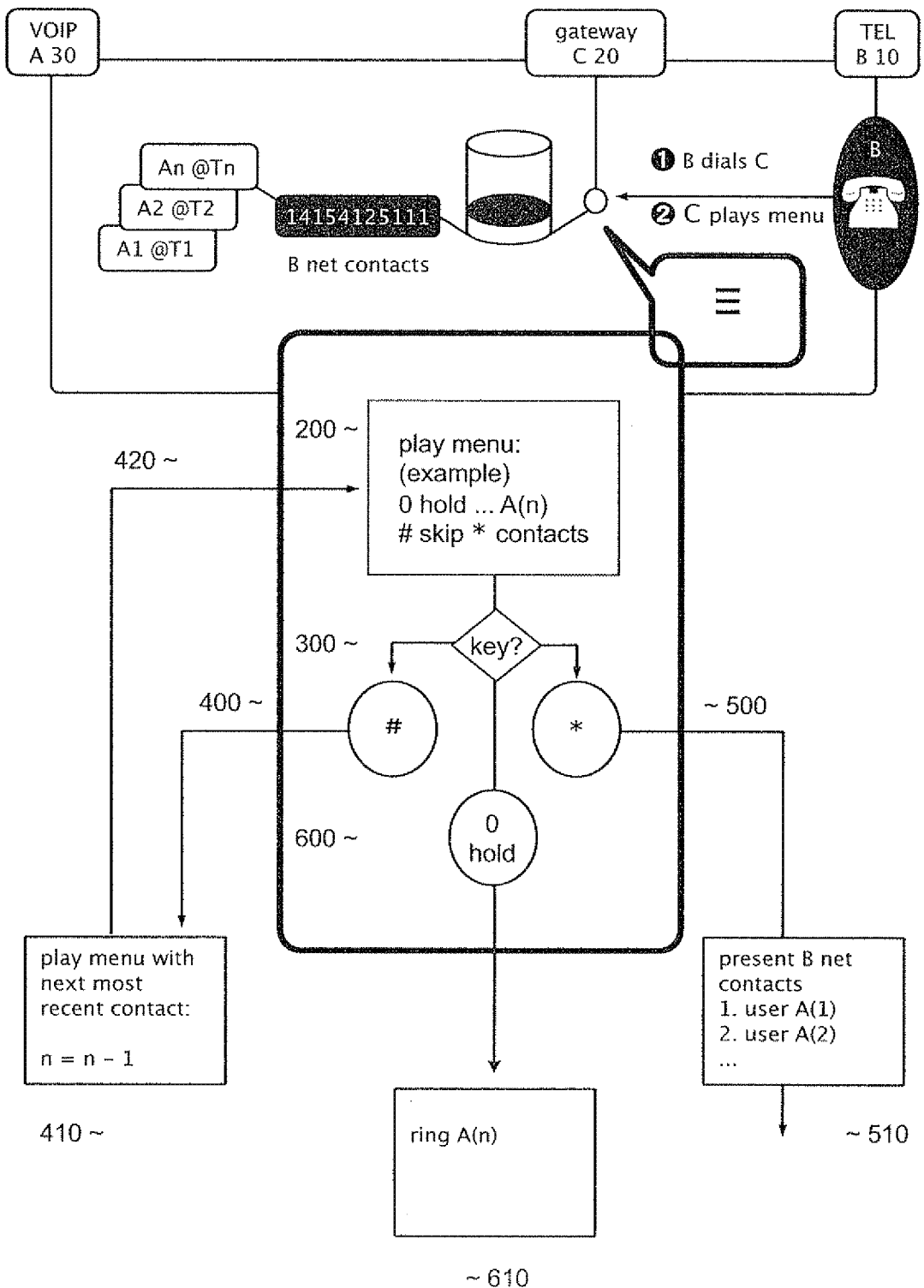
FIG. 16: Sample Menu Play list flow chart.

Continuing with the LIFO contact management system described above, FIG. 16 illustrates a sample Menu Play list flow chart.

F16 Step1. Phone user B(10) dials Gateway C(20).

C queries the contact database using the B calling line identity as access key and returns with the LIFO A(n . . . 2, 1) user list as described in FIG. 15 above. In this list "A(n)" represents the most recent VOIP user that requested contact with B.

F16 Step2. C plays a contact selection menu to B as depicted by the bold rectangular speech bubble ("="). One such menu, detailed in the expanded flow chart intersecting with the bubble, presents as follows:

F16 Label~200: C announces the most recent VOIP user contact A(n) in a menu that presents three basic contact navigation options, instructing B to:

(i) press "0" or "hold the line" to ring the announced user A(n)

(ii) press "#" to skip the current and present the next most recent A(n-1)

(iii) press "*" to present an enumerated (alphabetical) user list A(12n)

F16 Label~300: C awaits selection from B. Selection may be indicated using standard DTMF signals corresponding to keys pressed on the telephone device. Alternatively selection may be indicated by spoken voice commands. After a predetermined delay, if no selection is indicated (B "holds the line") C rings the announced user A(n).

F16 Label~400: IF B presses the pound (#) key logic flows to ~410

F16 Label~500: IF B presses the star (*) key logic flows to ~510

F16 Label~600: IF B presses the zero (0) key logic flows to 610

F16 Label~410: On receiving the # signal, C skips the current user A(n) and presents the next most recent user A(n-1) on menu logic that flows back up to ~200 along path ~420.

F16 Label~510: On receiving the * signal, C presents an enumerated user list A(12n) and awaits selection (not shown). One such list may support a plurality of selection methods, including numeric selection (matching the enumerated contact presented), "abc/2" encoded spelling (pressing keys corresponding to letters that match the user name or part of the user name), voice matching (speaking the user name) and so on.

F16 Label~610: On receiving the 0 signal, alternatively after a predetermined interval where no signal is received, C rings the announced user A(n).

In a further LIFO presentation embodiment, VOIP clients may be permitted to "touch B", that is to select the B contact without actually requesting a connection, and thereby "prime the service registry and gateway" by transmitting a system generated timestamp to reorder the contact list. Priming the gateway thus, programmatically "bubbles the selected contact up to the front of the list", establishing it as the most recently "touched" contact, and thereby instructing the gateway to present the primed contact as the default selected contact.

In another presentation embodiment, the associated A client list may be presented via well known protocols, including text to speech. In such a rendition, the VOIP username is read back to the caller using either synthesized or natural language composition. Further, service shortcuts may permit the B caller to key the digits corresponding to the letters that comprise a username, to "jump to and select" a known previous contact.

Client selection may also be made using voice recognition and pattern matching algorithms, whereby B "speaks the name of the desired A contact" and if the spoken name is matched to a contact, the contact is then selected. Voice recognition in this instance can provide results given the limited dataset, the relatively small number of A clients who have associated themselves with the B caller.

FIG. 17

Figure 17:
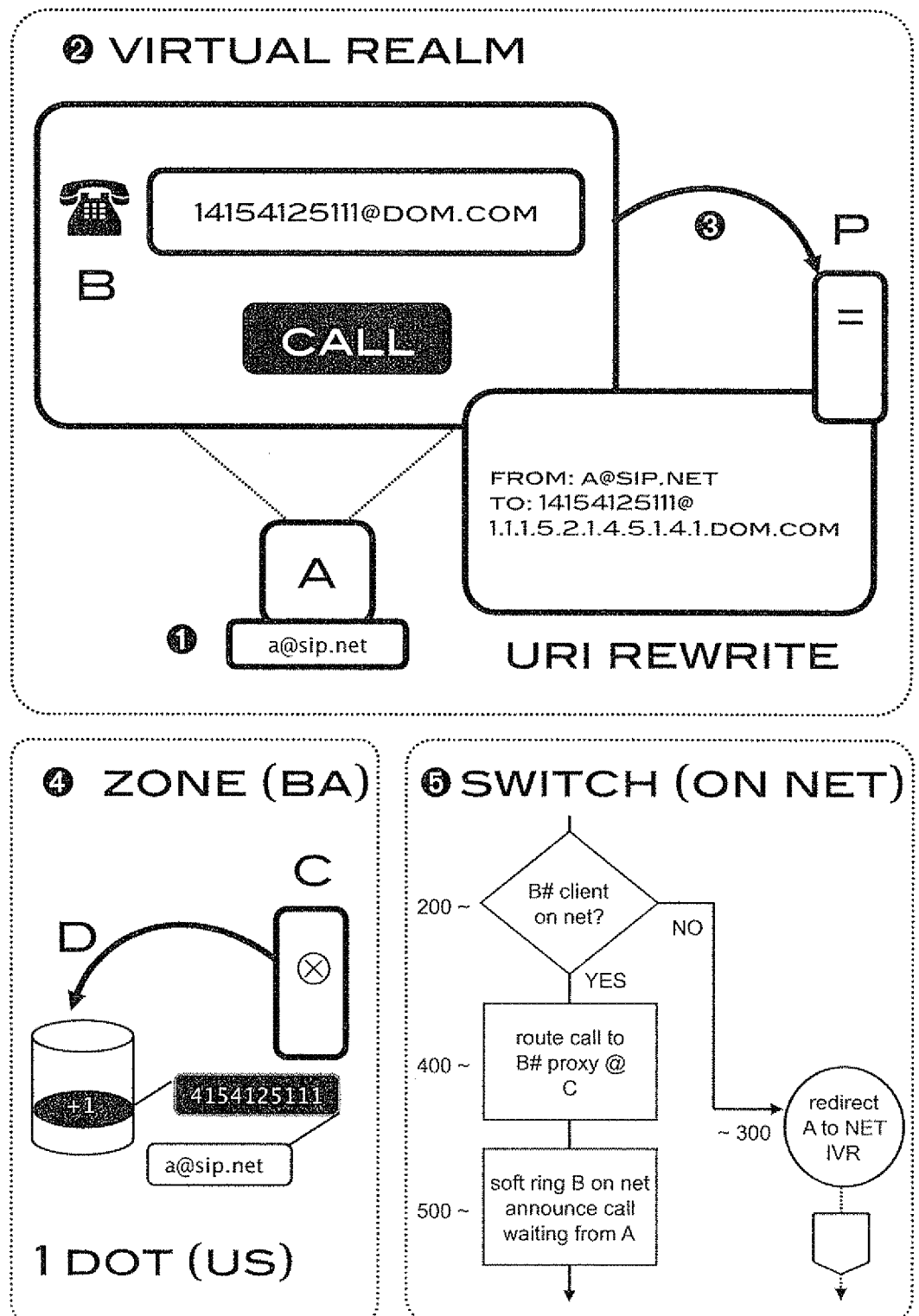
FIG. 17: Virtual Realm service abstraction.

In one embodiment, delivering the automatic contact association between VOIP users A and phone B, and the resultant reverse switching on call back, may be enabled on a new "virtual service realm." One such embodiment permits users to address conventional telephone connections on a new outbound "SIP domain" as per FIG. 17, which illustrates the Virtual Realm service abstraction.

By abstracting conventional telephones on a "well known address" ("dom.com" in the illustrated example), any existing VOIP client may be permitted to address any conventional telephone as an "IP telephone" and to be serviced according to the newly disclosed methods.

The Virtual Realm disclosed uniquely combines and leverages two Internet Registry Protocols, namely Domain Name Systems (DNS) and ENUM (IETF RFC 3761) to deliver a highly distributed data switching architecture, geographically mapped over the E164 dial plan. The resultant DDNS (Dynamic DNS) is outlined here, expanded in FIG. 18, and described in yet greater detail later, with reference to figures in appendix B.

The DNS "query response system", well understood by skilled artisans, is typically used to resolve service names into IP addresses. As the Man Machine Interface (MMI) to the Internet, DNS permits services to be abstracted and accessed using "names" (for example "www.dom.com") rather than locating them directly on the underlying Internet Protocol "machine addresses" (for example, an IPV4 address "196.010.030.060").

DNS records mapping to Internet services are overwhelming "static" in that the association between host name and underlying IP address changes infrequently. This static association permits DNS records to be cached and distributed out to nodes closer to the querying peripheral. DNS uses well known Authoritative Root Servers and Zone Delegation, together with register attributes such as TTL (Time To Live), to ensure that address remain current and changes are propagated and cached as and when required.

DNS is a highly scalable and proven IP switching service that delivers a near real time "query response" when resolving names into their underlying IP addresses. Since most DNS resolutions change infrequently (for example, web and email host addresses), the worldwide propagation and caching mechanism permits local routers to cache the resultant IP address in order to deliver a more distributed and responsive resolution.

Dynamic DNS (DDNS) is an advance that permits "late bindings" between names and their associated IP address, popularized by home based networks and servers. These servers typically operate on limited private IP address ranges that are dynamically mapped to shared public addresses, a method that extends and, to some extent, overcomes the scarcity of available addresses in the IPV4 (32 bit) address space.

DDNS works on the principle that L3 domain IP addresses (for example, the "new" in "new.dom.com") are constantly changing. Since the delegated L2 domain (the "dom" in "dom.com") is typically fully propagated and thus "known", programmatically modifying L3, to which L2 is the answering authority, permits instant resolution and close to zero propagation time for registering new services.

In one embodiment, DDNS is thus an advance that permits instant L3 domain registration and resolution that extends the domain space to the left of the principal ("dom.com" for example) without incurring additional registration fees, as payment only applies when acquiring the L2 domain. L3 is a virtual, private and unrestricted name space, known as the "wildcard" (star) domain.

In addition to supporting dynamically assigned IP address resolution applied to Gateways and Media Servers located in the wildcard domain, the methods and systems following extend DDNS application to incorporate ENUM, as applied to telephone numbers, thereby permitting an unlimited number of L3 and greater domains to be dynamically added to the DNS tree.

Since these star domains are "authoritative" (TTL near zero) they have close to zero propagation time. Further, since ENUM permits zone delegation at every point (digit) along the dotted path, a dynamic and massively distributed data switching network is delivered, geographically mapped on the E164 numbering plan and switched over the conventional DNS protocol.

E164 Zones form the following international country code dialing matrix:
Zone 1: North American Numbering Plan
Zone 2: Africa (mostly)
Zone 3: Europe
Zone 4: Europe
Zone 5: Latin America (mostly)
Zone 6: South East Asia and Oceania
Zone 7: Seventh World Numbering Plan (former Soviet Union)
Zone 8: East Asia and Specialized Services
Zone 9: Central South and Western Asia
Zone 0: Unassigned
Describing now the Virtual Realm fundamentals:
F17 Step1. VOIP user A, by example, registers with username "a@sip.net". This registration is facilitated by a Registrar Server and recorded in a Location Server (both not shown). The data recorded in the Location Server maps the public address of the user (the "Address Of Record") to the current IP address of the SIP phone.

F17 Step2. User A, who wishes to establish communication with telephone user B, enters the phone number ("14154125111") followed by the "Virtual Realm" (the new service domain) that together describes a conventional SIP URI ("14154125111@dom.com").

F17 Step3. In one embodiment the client software invites the connection request via the Inbound Proxy Server P, described by the virtual domain ("dom.com"). The address of this proxy server may be determined using conventional DNS SRV resolution. Alternatively the Inbound Proxy may be located by querying appropriately configured DNS SRV records.

On receiving the connection request, the Inbound Proxy rewrites the initial destination URI "14154125111@dom.com" to now support the disclosed DDNS ENUM distributed architecture, resulting in a new destination URI "14154125111@1.1.1.5.2.1.4.5.1.4.dom.com", thus relaying the connection to a "1 dot" US zoned and delegated Gateway C with associated Registry D. ENUM reverse dots the telephony domain since DNS is parsed "right to left".

It will be evident to the skilled artisan, that this ENUM URI permits the virtual service realm to be zoned and delegated anywhere along the dotted path to the left of the primary domain ("dom.com"). This permits "edge caching", to record, the VOIP user A and telephone user B association and to deploy the new switching logic directly at the "edge gateway" to the legacy PSTN.

In the illustrated example, ENUM DNS is at minimum delegated on "Level 3" ("1.dom.com") pointing to a gateway servicing the USA region, as defined by the leading "1" Country Code per the ITU E164 geographic numbering plan.

F17 Step4. On relaying the connection to the zoned and delegated URI as described, gateway C receives the connection request, where data in the connection request headers include the "From" (A=a@sip.net) and "To" (B=14154125111) fields. C extracts the A and B user identities and records the association in registry D.

Figure 14:
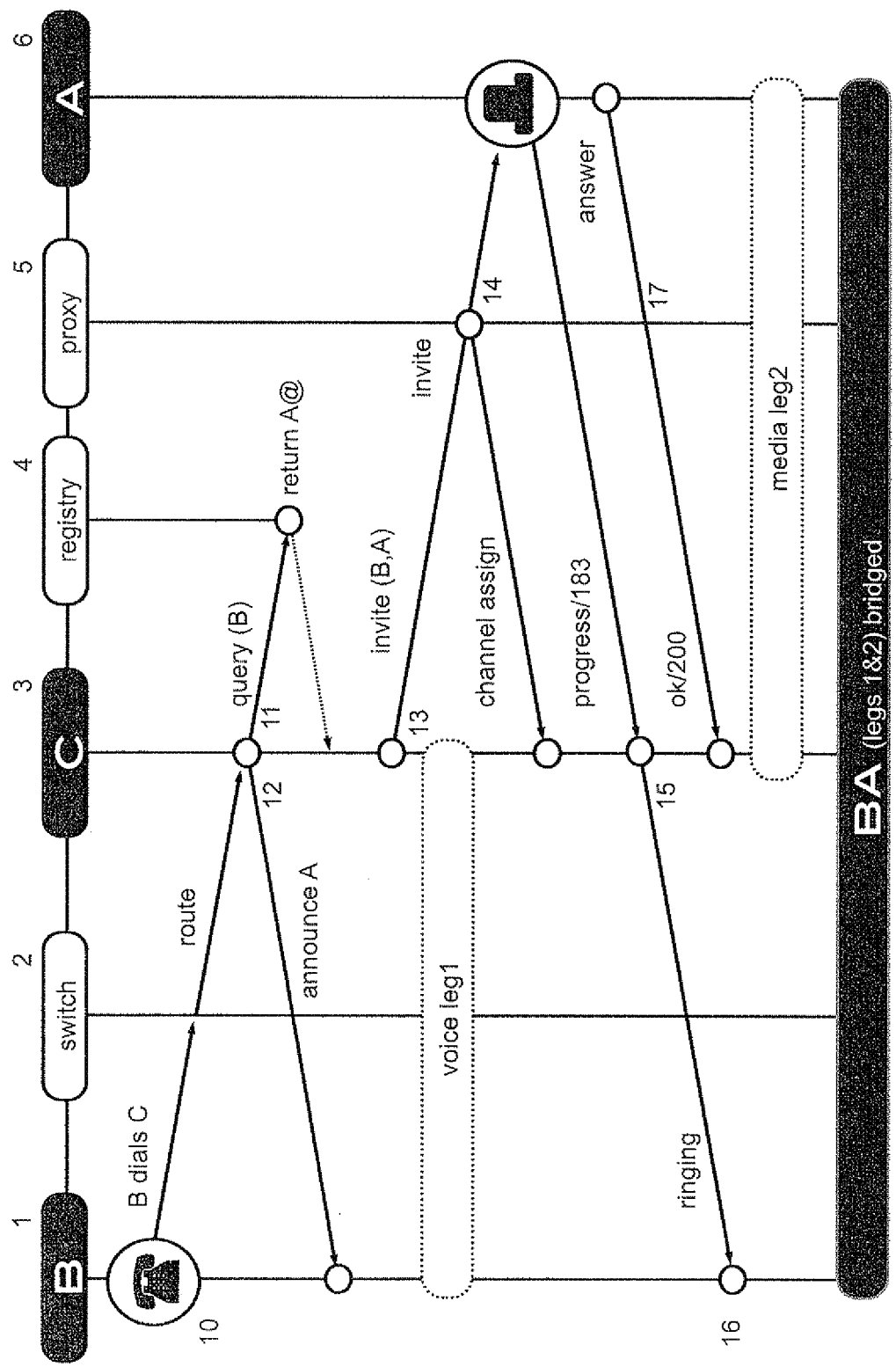
FIG. 14: Basic VOIP terminated switching stepladder.

F17 Step5. On recording the B and A user association, C determines whether phone B is "ON/OFF net", relaying the connection accordingly. This VOIP originated and redirected switching logic is depicted in the minimized flow chart that references FIG. 9 above. Similarly, the VOIP terminating logic described in FIGS. 14 and 15 are applied on B connecting to C and selecting associated user A.

In summary, by defining a "global proxy that virtualizes the legacy telephone network", by hosting a new SIP domain, the Virtual Realm hooks the disclosed methods and systems into any existing VOIP provider without change, where VOIP user A enters the telephone number B as a "Virtual VOIP user" and presses "call" to engage the new service.

However, whereas entering B as a conventional telephone contact ("14154125111") in an unmodified service realm would result in a PSTN trunked connection, one that terminates on the legacy network and incurs billing, addressing B on the Virtual Realm ("14154125111@dom.com") as disclosed, now hooks the new association and switching logic that always terminates the call on the Internet, without change to the existing provider and without charge to the caller.

Alternatively, a minimally modified service provider may automatically append the Virtual Realm to a conventionally addressed phone call request and engage the system and method disclosed. In one such embodiment an Outgoing Proxy Server (not shown) servicing the connection request from VOIP user A to phone number B ("14154125111") modifies the requested destination URI by automatically appending the Distributed Virtual Realm ("@1.1.1.5.2.1.4.5.1.4.1.dom.com") to relay the connection via the delegated Inbound Proxy that delivers the disclosed methods and systems as above.

FIG. 18

Continuing with the Virtual Service Realm described above, and in particular expanding on the distributed DNS switching logic, FIG. 18 further illustrates the Universal Edge caching data model.

F18 Panel 1: On receiving the connection request from VOIP user A to phone number B addressed on the Virtual Realm ("14154125111@dom.com") the Inbound Proxy hosting the virtual domain rewrites the URI to incorporate the ENUM addressing model ("14154125111@1.1.1.5.2.1.4.5.1.4.1.dom.com").

To the skilled artisan, it will be evident that the ENUM addressing model describes a highly distributed VPN (Virtual Private Network) architecture that switches telephone connections over a geographically mapped E164 numbering plan, where switching nodes, in this instance Gateways and associated Registry Databases to the legacy PSTN, may be delegated at any point along the reverse dotted path.

F18 Panel 2: In one such node delegation, all US telephone numbers addressed on the Virtual Realm relays the connection to a "1 DOT" (US) zoned and delegated Inbound Proxy (Gateway C1 with associated Registry D). This distributed switching is achieved on configuring the wildcard DNS A record "0.1.dom.com" to map any phone number with the "1" country code prefix to the IP address of Gateway C1 servicing the continental USA.

Continuing with zone delegation in the continental USA, service granularity and distribution may be increased down to "state and city" following the NANP (North American Numbering Plan). By delegating zones up to L6 (Level 6) in the dotted path, the following DNS routes connections to a Gateway servicing San Francisco, Calif.:

L1 is TLD (Top Level Domain)="corn"
L2 is VPN (Virtual Private Network)="dom."
L3 is USA="1." and L456 is SFO CA="*.5.1.4."

Thus all phones numbers beginning with International Country Code "1" (USA) followed by area code "415" (SFO) are serviced on the DNS A record for domain "*.5.1.4.1.dom.com" pointing to the IP address of Gateway C5141 located in San Francisco, Calif. This zoning is graphically depicted in FIG. 33.

As described in FIG. 17 above, on receiving the inbound connection request, C1 extracts the A and B user data in the connection request headers, recording the user association in the B client record. D1 thus automatically records and assembles "Net contacts A" associated with telephone number B, as shown.

F18 Panel 3: Similarly, all ZA telephone numbers addressed on the Virtual Realm relays the connection to a "72 DOT" (ZA) zoned and delegated Inbound Proxy (Gateway C72 with associated Registry D27). In this instance distributed switching is achieved, by way of example, on inviting phone B "27824455566" on the virtual realm "6.6.5.5.5.4.4.2.8.7.2.dom.com" where the wildcard DNS A record "*.7.2.dom.com" is set to map any phone number with the "27" country code prefix to the IP address of a Gateway C27 servicing South Africa.

FIG. 19

The above embodiments disclose various selection methods made available to telephone user B when connecting to automatically associated VOIP users A via a generic gateway access number C. Describing now an embodiment that delivers tighter coupling between B and A, C dynamically assigns a unique regional and primary calling line identity to every A, indexed on the associated BA pair.

PICO

PICO (Peer Index Coupling) is a switching protocol that makes a routing determination based on both the dialed source and destination, which in the context of this embodiment is calling phone number B and dialed gateway "Cn", respectively. Comparatively, per the above disclosures, phone B to VOIP A connections made on dialing a generic gateway access number C, switches by indexing contacts on the B number "source", whereas conventional switching algorithms route on the dialed "destination".

PICO is a dynamic pairing algorithm that anuses an extremely limited shared number pool to uniquely slot assign a calling line identity to each user A, when delivering "OFF net" notifications to phone B. FIG. 19 highlights one such Paired OFF net ring back matrix.

FIG. 19 Panel 1: In this embodiment, on recording the association between VOIP user A and phone B, gateway C records an additional data field in the BA record, assigning a persistent telephone number alias C(n).

As depicted, the first VOIP user A associated with B, has gateway access number C1 assigned. The second user A2 has number C2 assigned, and so on. Each VOIP user A associated with phone B thus has a distinct number assigned, persistently recording and mapping the Internet user address A(n) with a gateway telephone alias C(n) in the B registry.

VOIP user A(1) presents telephone address C(1)
VOIP user A(2) presents address C(2) . . .
VOIP user A(n) presents C(n)

Figure 10:
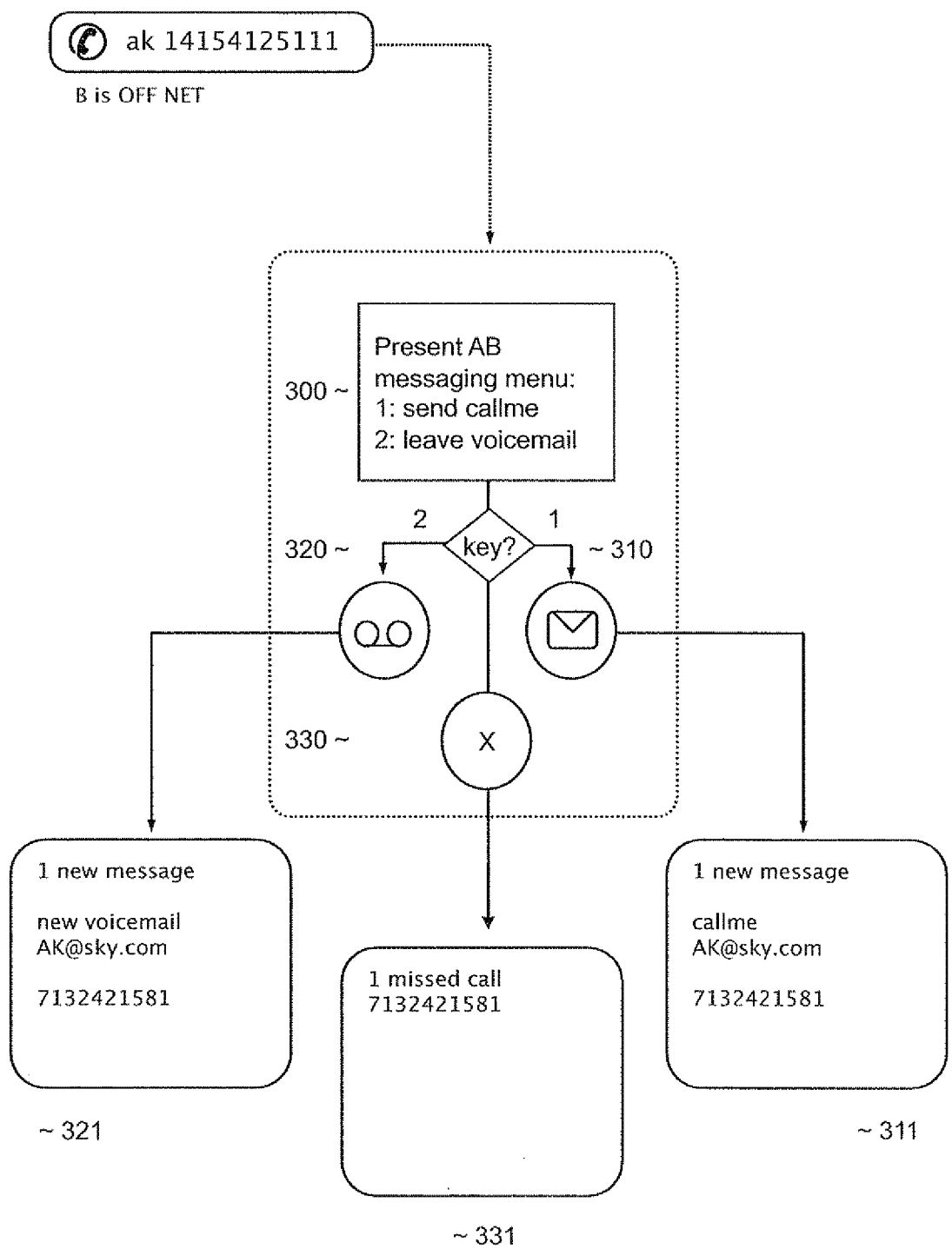
FIG. 10: Delivering OFF net call notifications.

On determining "OFF net" status of phone user B as disclosed, gateway C then applies the assigned gateway number alias "Cn", rather than a generic access number "C", to all notifications delivered as per FIG. 10 above. When Telephone user B dials the C(n) alias, the gateway queries the B contact registry on the "B C(n)" dual index to uniquely resolve the connection path back to Internet User A(n) without any additional selection required by caller B.

FIG. 19 Panel 2: The PICO protocol results in a "sparse switching matrix" as depicted, where each VOIP user A associated with phone B, fills the next available slot ("sparse", since many phone users B may have just a "handful" of contacts A).

PICO is predicated on the fact that a single telephone number "X" can represent "N distinct associations amongst N distinct AB pairs". That is, A1 can uniquely present telephone number alias X to B1, while A2 can present the same telephone number X to B2, without identity conflict. Similarly A1 can present telephone number Y to B2 and still preserve the unique paired association.

Figure 38:
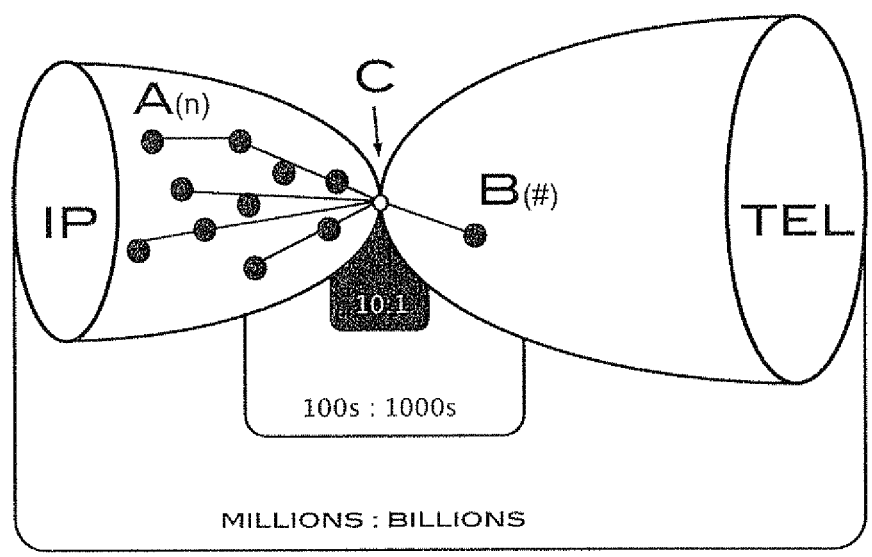
FIG. 38: Graph plotting social parabolic geometry.

The PICO protocol thus permits "a 1st or 2nd order" ($10^1$ or $10^2$ number space, comprising just ten or one hundred numbers, to uniquely address a user base "multiple orders of magnitude greater" ($10^9$). This is premised on Parabolic Social Geometry identified and depicted early on in this disclosure (see FIG. 38) that describes a "90:10" rule governing telecommunications:

"While Internet users number in the hundreds of millions and telephones in the multiple billions, socially and typically 90 percent of users have less than 10 distinct contacts on a regular basis".

Consequently "10 base pairs", 10 distinct shared regional telephone numbers, can uniquely and locally pair a global Internet telephony community, comprising hundreds of millions of users, with tens of millions of telephones in a "peer slotted indexed" fashion. Mapping VOIP users A with associated telephones B, thus typically requires just 10 numbers, mated in "BA pairs".

FIG. 20

Figure 20:
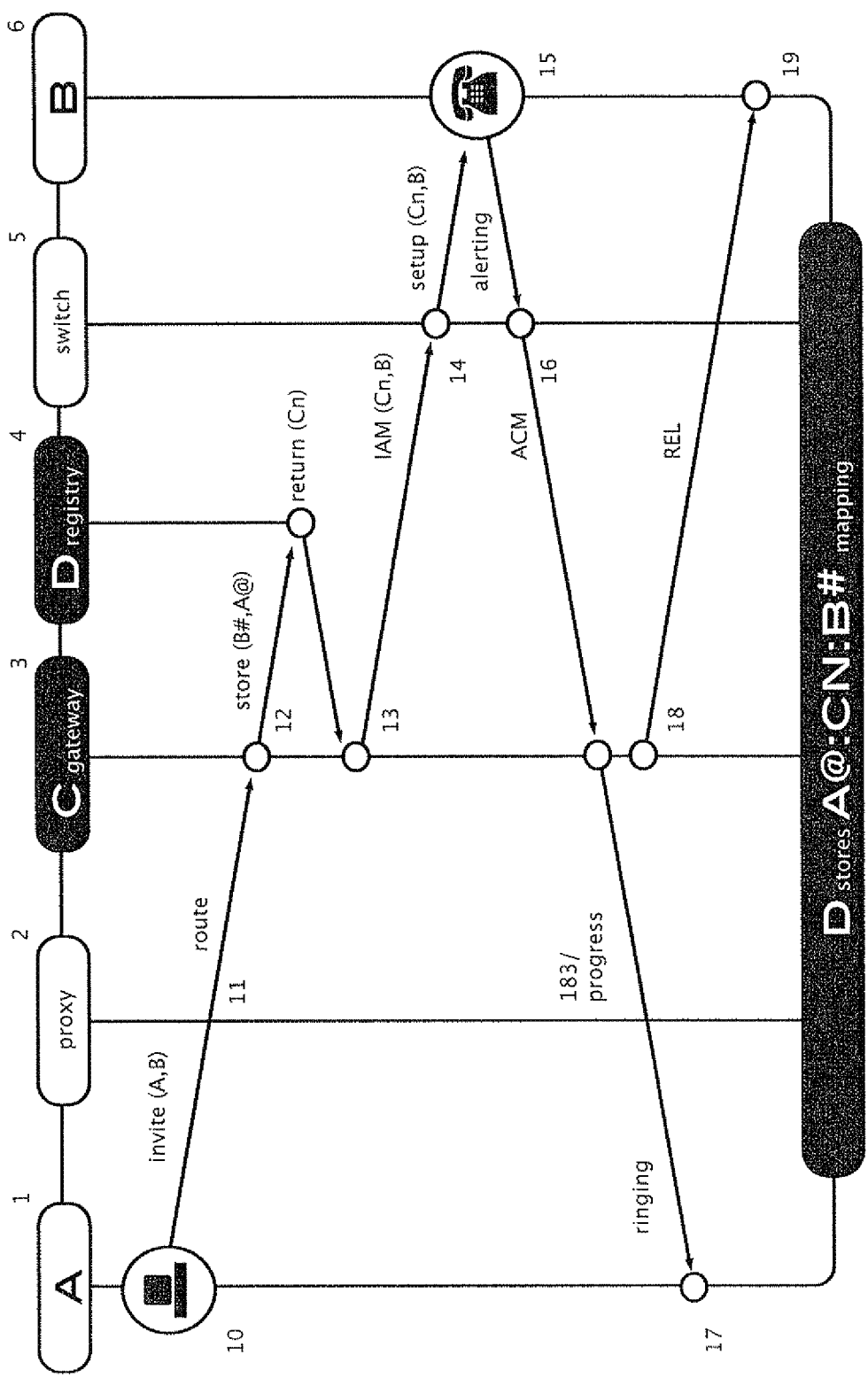
FIG. 20: Paired OFF net ring back stepladder.

Continuing with the PICO protocol applied now to the ":1" switching logic between Phone B and associated VOIP user A, FIG. 20 depicts the Paired OFF net ring back stepladder.

F20 Step10. VOIP user A(1) dials phone B(6).

F20 Step11. Connection is routed via optional outbound service Proxy(2) to PSTN gateway C(3) on what is a conventionally VOIP originated and PSTN terminated call.

F20 Step12. C receives the Internet outbound call originated from A to telephone B, and records the "BA user association" in registry D(4). This BA dataset includes the "B #" (the called party phone number) and the "A @" (the Internet caller identity).

In addition to recording the B # A @ user association, registry D now applies the PICO protocol by programmatically assigning the next available slot to user A in the "B(A)C" switching matrix as depicted in FIG. 19 above. Registry D thus assigns and returns the next phone number alias "C(n)" available in the BA(n) array. If VOIP user A already exists in the BA record, D returns the number associated with the assigned slot.

F20 Step13. C establishes the forward connection towards B, sending an IAM (Initial Address Message) directed to destination Switch (5) servicing telephone B. The LAM header records PICO mapped number alias C(n) as calling line ID.

F20 Step14. On receiving the IAM the switch forwards a call setup message to the B device, which in turn responds with an "alerting" message back to the switch.

F20 Step15. On receiving the "alerting" message, the switch returns an ACM (Address Complete Message) back to gateway C, advising that the B device is ringing. B now rings displaying calling line identity C(n).

F20 Step16. On receiving the ACM, C presents the ring back tone to caller A.

F20 Step17. Caller A hears phone B ringing.

F20 Step18. In one embodiment where B is determined to be "OFF net", C automatically releases the connection to deliver a missed call notification. In another embodiment on B failing to answer, C releases the CB leg and redirects the A to the Internet hosted messaging platform as per FIG. 13 above (not shown).

F20 Step19. On releasing the CB leg, B displays "1 missed call from C(n)"

When B returns the missed call to C(n), the D record is then indexed on B # as the primary, and C(n) as the secondary, registry access key to uniquely identify and retrieve user A(n). In one embodiment, B thus automatically connects to A(n). In another embodiment, C first announces the Internet identity A(n) before connecting through, as per the "secondary caller line identification" feature disclosed above.

FIG. 21

The above embodiments describe dynamic VOIP user A and phone user B association on the advanced identification of the latter by the former and, in selected embodiments, reverse switching connections on the recorded associations when B connects to the cloud via Gateway C. Since any telephone may dial C, access to the disclosed methods and systems require no legacy integration whatsoever.

While it is useful in delivering new service capability to legacy systems without change, the "personal mobile telephone number", the definitive global digital user identity, lends itself to service extension only on direct legacy operator participation. Describing now an alternate embodiment, VOIP users A register their existing (mobile) phone number as "net alias", to deliver one such core legacy service extension.

One key omission in the IP Telephony architectural blueprint, was the lack of a globally defined dial plan that would permit legacy telephone networks and devices to dial and terminate connections "up into the cloud", permitting IP telephony users to freely receive connections originated off net. By analogy, an IP dial plan would deliver "a static numerical equivalent to the IP domain name", and it is this core oversight that informs the technology described this disclosure.

Introducing a second global dial plan, would however result in "dual telephony identity", one for legacy and one for IP telephony devices, in and of itself introducing an undesirable "discontinuity". Users would have to be allocated a new phone number and distribute it amongst their social network. Such a service would require administration by a numbering authority, which in all likelihood would attract unwelcome service fees. Nevertheless, an IP dial plan could be helpful in permitting legacy devices to dial IP phones to call locally and connect globally.

ALTO

ALTO (Authenticated Link To Owner) overcomes address duplicity and administrative drag in allocating a new dial plan, by differentiating and switching the existing known and ubiquitous directory "at source", on a defining carrier service that directly integrates the methods and services disclosed with legacy switching on a symbolic and universal "net prefix". This new carrier enabled service galvanizes voice by locking in terminating revenues "directly on the home operator network", delivering a more fluid convergence business model, since interconnect is then via the PLMN rather than PSTN.

Figure 21:
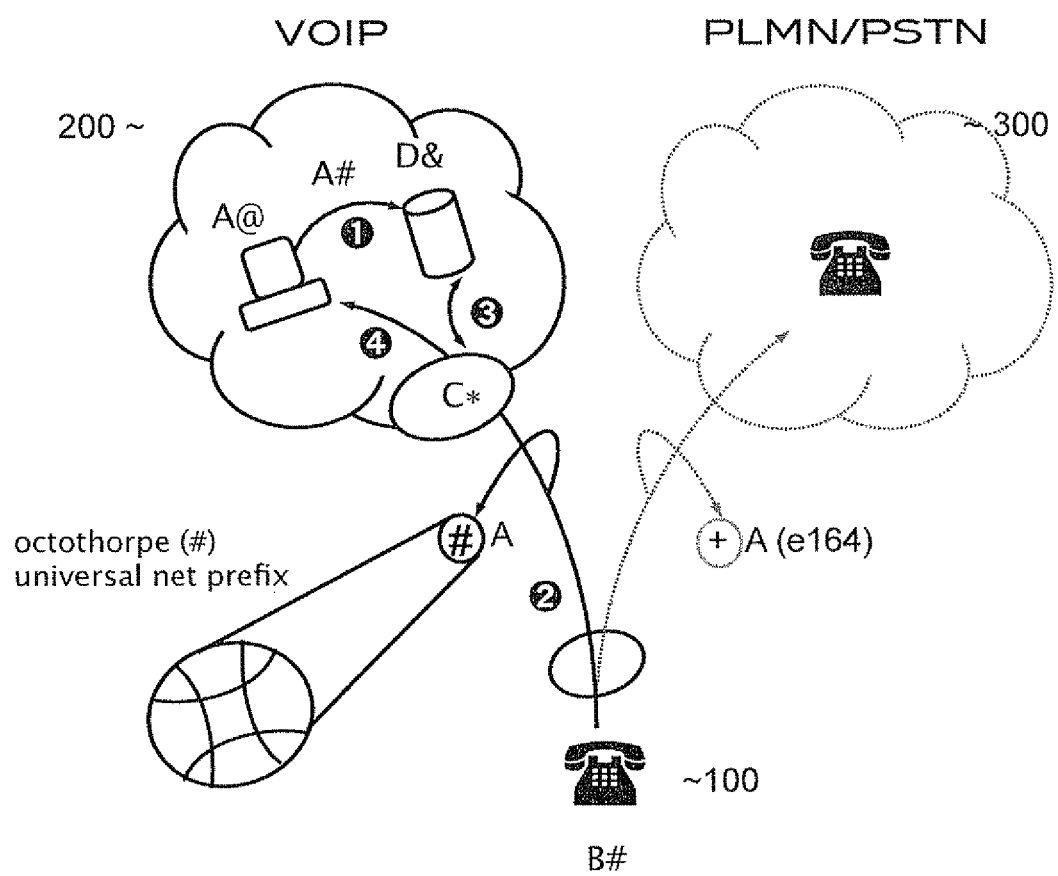
FIG. 21: Abstracted core service elements in a symbolic prefix embodiment.

FIG. 21 depicts the abstracted core service elements in a symbolic prefix embodiment. Phone B (~100) is any legacy telephone user. Symbolic prefix (#) routes conventional connections to the IP cloud (~200) rather than to the legacy PLMN/PSTN cloud (~300) which is the conventional plus (+) prefix route. A # is the phone number of VOIP user A, and while this may be any legacy phone number, it is a mobile telephone in the described embodiment.

F21 Step1. VOIP user A registers an existing personal phone number A # which is stored in Registry D, together with the Internet user identity A @.

Registry D thus records and associates phone number A with Internet user identity A @. System and methods supporting phone number registration and authentication are detailed in FIG. 26 through FIG. 29 below.

F21 Step2. Telephone user B dials phone number A prefixed in one embodiment with the special "#" dial symbol. That is B dials "#A".

In the illustrated embodiment, the gateway address prefix is thus a single non numeric key, the pound (#) key, that then routes the call via the Internet rather than the legacy network. In another embodiment the gateway address may be the "star" (*) key. In yet a further embodiment the gateway address may be a double pound "##" or double star "**" prefix.

The network servicing user B has switching logic to route all such symbolically addressed connections to Gateway C. Such requisite switching logic, which may include setting "office wide triggers" in the Originating Basic Call State Model (OBCSM) will be evident to the skilled artisan.

So for example,

+14154125111 a telephone number dialed in fully qualified e164 international format, would route to the legacy telephony network and device, following the dotted gray path to the right Whereas,

14154125111 now routes to a VOIP associated counterpart while maintaining principle user telephony identity (the digits comprising the phone number), following the solid black path to the left.

That is once IP telephony users register their existing conventional telephone number with the service, they are locally contactable on the same known phone number, prefixed as disclosed.

F21 Step3. Gateway C receives the IP routed connection and queries Registry D on called line identity A to determine the associated VOIP contact A @.

F21 Step4. Gateway C resolves the user address A @ associated with the dialed destination #A, to the current IP endpoint where the VOIP client is registered, ringing the destination with caller line identity set as B.

B thus dials #A to ring VOIP user A @.

Symbolically prefixing the VOIP client owner telephone number thus "virtualizes" (escapes) the global known E164 dial plan permitting programmatic and dynamic "1:1" (phone: VOIP client) switching, without assigning and dedicating a single new telephone number as Internet alias.

While the caller invokes the system and method described above by manually prefixing a phone number, it is will be evident that the legacy mobile network operator may, for example, on failing to locate a mobile device, automatically apply the address prefix as disclosed to switch and route a connection along the new IP path. Similarly, suitably modified phone software may provide the user with the option to select the call routing, programmatically applying the universal address prefix when required.

In the automatic network rerouting case, either the mobile user or the mobile network could selectively and conditionally forward calls to the newly prefixed IP routed number, for example when the device is "roaming, unreachable, unavailable or busy etc." where, in these and similar conditions, rather than redirecting callers to legacy voicemail, the connection would be transparently rerouted over IP, ringing the associated VOIP client.

FIG. 22

Continuing with the ALTO switching protocol described above, with reference now to FIG. 22, which shows detailed logical interaction between prefixed core elements.

F22 Step1. VOIP user A(30) registers their existing phone number A #

F22 Step2. Registry D(40) creates an owner A # record, associating the Internet user identity with the registered phone number.

F22 Step3. Internet user A @ and A # are now aliased in registry D.

F22 Step4. Telephone user B dials #A and the connection is routed on the "#" prefix to internet Gateway C(20), establishing a first call leg BC.

On receiving the inbound connection from B, Gateway C may instantiate a virtual NANO client (B #) that serves as the VOIP client proxy to caller B.

F22 Step5. Gateway C queries Registry D on the dialed destination A.

F22 Step6. Registry D returns the previously associated VOP user identity A @ in the registered A # record.

F22 Step7. C invites and rings user A @ presenting B as the calling line identity, establishing a second call leg CA.

F22 Step8. C plays the ring back tone to caller B.

F22 Step9. A answers the call and C bridges the first and second legs, BC and CA, connecting phone B and VOIP user A in full duplex speech.

FIG. 23

Figure 23:
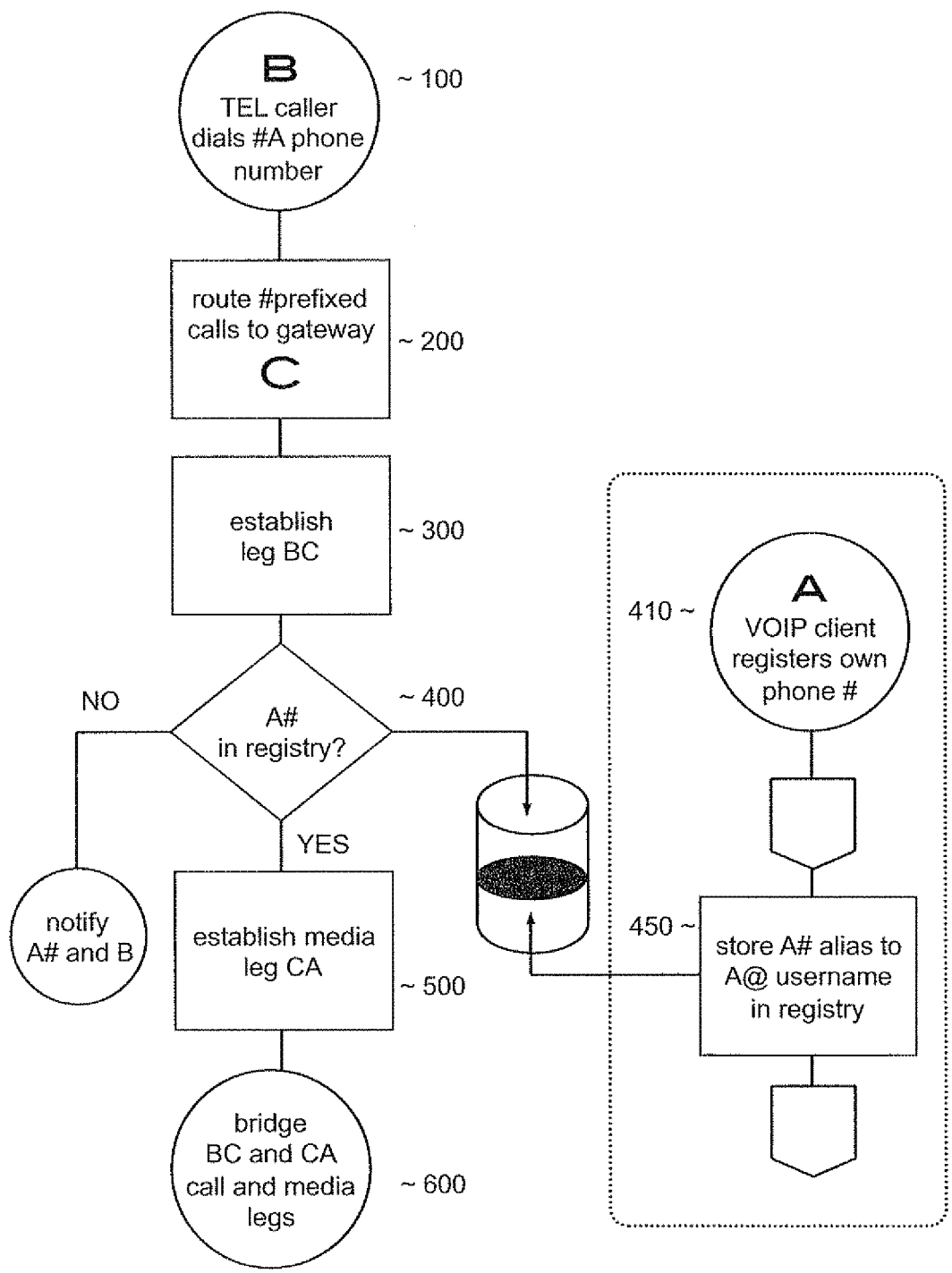
FIG. 23: Prefixed VOIP terminated call flow chart.

Continuing with the ALTO system and method with reference to FIG. 23, which shows a Prefixed VOIP terminated call flow chart.

F23 Label~100: B dials #A.

F23 Label~200: The call is "#" switched and routed to PLMN gateway C.

F23 Label~300: First call leg "BC" is established.

F23 Label~400: C queries a service registry to determine if an A # record exists.

Figure 26:
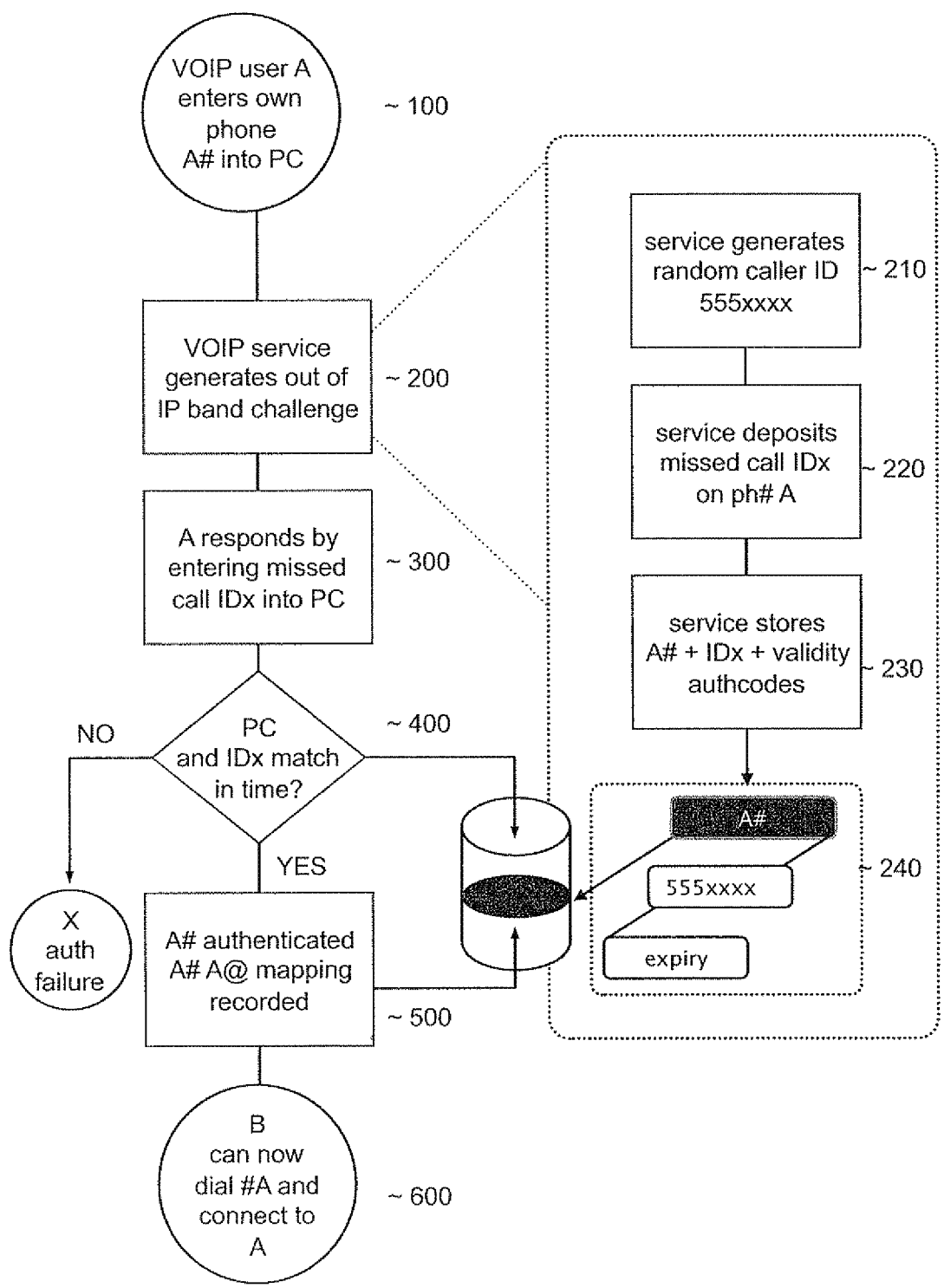
FIG. 26: Randomized Telephone number authentication flow chart.

Detailed phone registration is flow charted in FIG. 26 below. The dotted minimized flow chart at right highlights the registration basics:

F23 Label~410: As per the prefix related embodiment disclosed above, VOIP users A advance register their own phone number A # with the service.

F23 Label~450: This phone number registration creates an A # record in a service registry as shown.

F23 Label~400: [Yes]. IF A # record exists in registry, logic flows to ~500.

F23 Label~400: [No]. IF A # record does not exist, C notifies phone user A # of the service availability and notifies phone B that A is presently unavailable (process not shown).

In one such notification embodiment, C presents an engaged signal to B and sends mobile user A an SMS text message requesting their VOIP address by return, thereby wirelessly "forward propagating service registration". On receiving the text reply from A with their IP telephony username, C stores the association in D for future reference.

F23 Label~500: C rings A @ with calling line identity set to B establishing second call leg CA.

F23 Label~600: C bridges the first and second call legs, BC and CA, connecting phone user B and VOIP user A.

FIG. 24

The ALTO "address aliasing" described above, permits conventional telephony users to dial IP telephony users on prefixing known phone number contacts.

Figure 24:
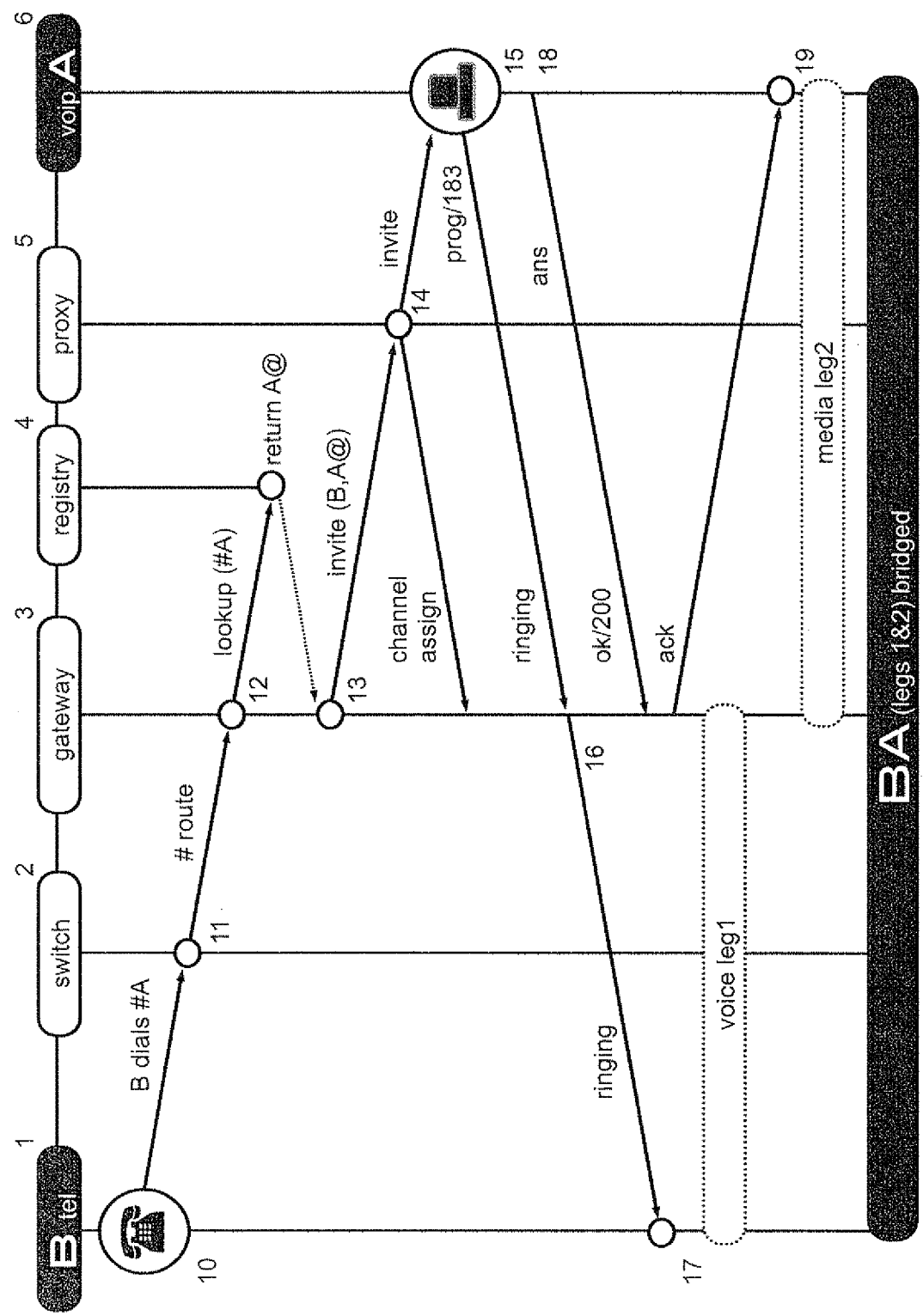
FIG. 24: Prefixed VOIP terminated switching stepladder.

FIG. 24 shows a Prefixed VOIP terminated switching stepladder.

F24 Step10. Phone B(l) dials #A

F24 Step11. Connection is routed on the # prefix to gateway C(3) via an originating Switch (2).

F24 Step12. C queries service registry (4) on the dialed destination A. Registry returns the VOIP user A @ associated with the previously registered phone number A.

F24 Step13. C invites the associated VOIP user A, setting calling identity to B. Connection is relayed to Inbound Proxy (5) which locates the IP address of user A. In one embodiment, Inbound Proxy determination is based on DNS SRV records referenced on resolving the URI (the destination VOIP user realm).

F24 Step14. During connection invitation, proxy (5) locates VOIP user A, assigns a media channel back to gateway C and rings destination client A.

F24 Step15. On ringing A, system progress messages ("183 ringing") flow back to gateway C, informing the gateway that the destination is ringing.

F24 Step16. C presents ring back tone to B.

F24 Step17. B hears A ringing. Voice leg1 (BC) is established.

F24 Step18. When A answers, C receives cal acceptance message (ok/200) and acknowledges.

F24 Step19. Second media circuit (leg2) is established between A and C.

At this stage, C may apply one of various bridging architectures, to connect end users A and B, as described in FIG. 4 above.

FIG. 25

Figure 25:
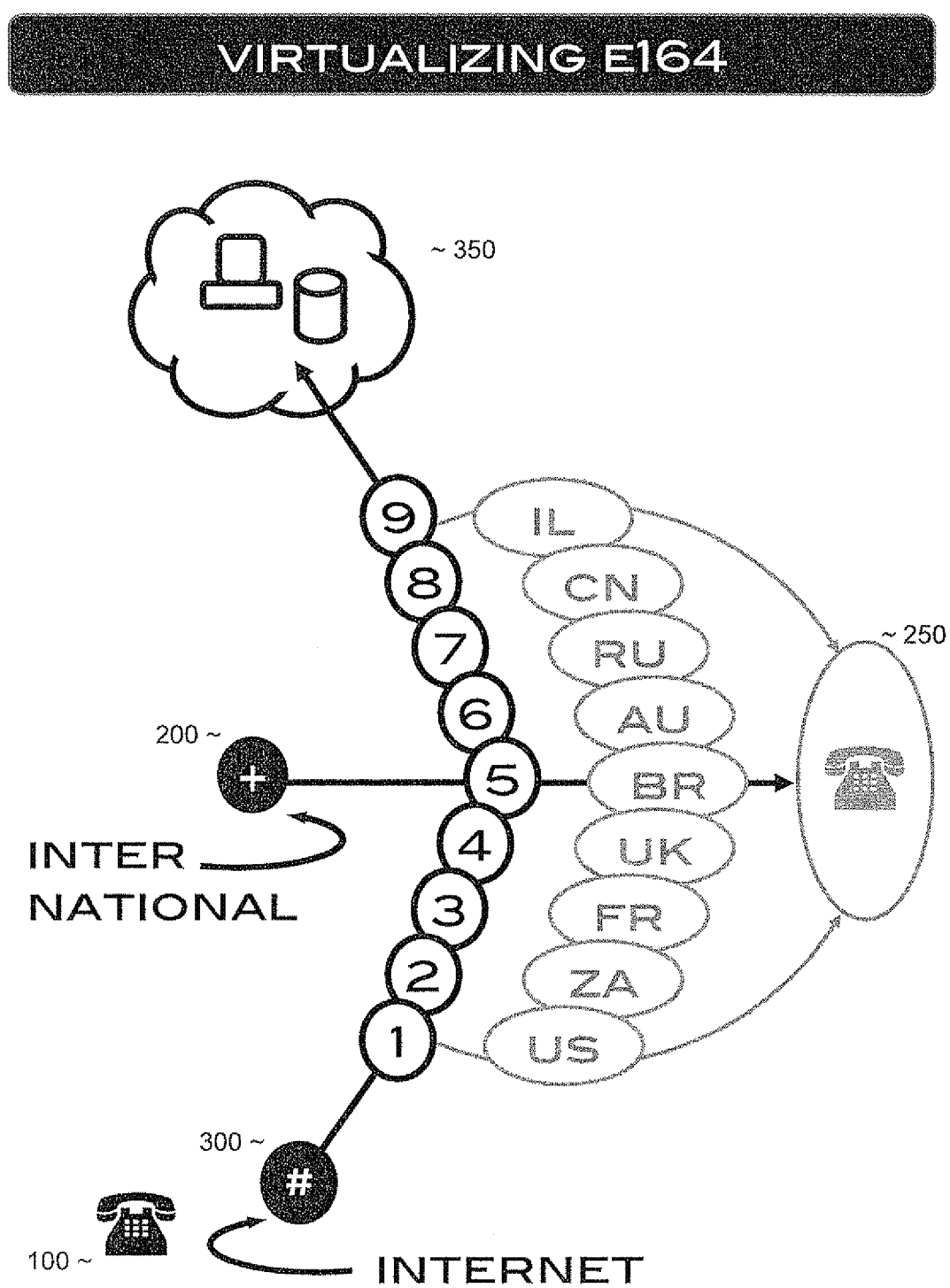
FIG. 25: E164 dial plan virtualization schema.

As described above, the symbolic telephone number prefixing system and method pivots the known dial plan on a new net "root prefix" that routes connections to the authenticated IP owner. FIG. 25 illustrates the disclosed E164 dial plan virtualization schema.

Legacy telephone (~100) dialing E164 plus (+) prefixed phone numbers (~200) route along the horizontal axis to the legacy and geographically mapped telephony networks (~250). The disclosed method and system shows legacy telephone dialing the IP root (#) prefix (~300) that routes connections along the vertical axis into the IP cloud (~350) via media gateway (not shown) and registry database mapping the dialed numbers into associated IP addresses.

Legacy E164 geographically maps the global dial plan according to the ITU specified numbering system, where leading dialed digits map to continents and countries. By example, and as illustrated, common country leading (and secondary) digits include 1=US, 2(7)=ZA, 3(3)=FR, 4(4)=UK, 5(5)=BR and so on.

The Plus (+) prefix represents the international outbound dialing code placeholder, utilized by GSM and other mobile telephony systems, permitting users to store phone numbers in a universal format while roaming between countries. The visited network then substitutes the international outbound dialing code for the host country.

For example, Plus (+) in the US would be replaced with the international "011" dialing code, whereas in ZA "09" would be substituted. Plus (+) thus symbolically unifies the international outbound dialing codes amongst different regions, without which mobile users would have to dial different prefixes in each country visited.

Virtual E164 permits users to symbolically address an Internet Media Subsystem and Gateway by prefixing the conventional telephone number, in one embodiment, with a Pound (#) rather than a Plus (+) sign, and thereby switch connections up to the IP cloud rather than over the legacy network which incurs international tolls.

While the system and method disclosed in this prefixing embodiment reference a privately hosted Registry that records the dialed A # and the authenticated A@address mapping, it will be evident that the legacy network operator may utilize existing public or private registry services, in particular resolvers based on ENUM (IETF RFC 3761), which map specially formatted phone number domains into associated Internet communication services.

In one such embodiment, the IP media gateway receiving the "#" switched connection may perform a DNS query on the ENUM assembled domain, which returns NAPTR resource (URI) records. If multiple NAPTR records am returned, the gateway uses record field values, including "Order, Preference and Services", to select the most appropriate destination URI.

For example:

(i) Legacy Phone B dials #14154125111 which routes to IP Gateway C (ii) C assembles the ENUM domain "1.1.1.5.2.1.4.5.1.4.1.e164.arpa"

(iii) C queries a DNS server on the ENUM domain (iv) DNS returns NAPTR records describing client supported services (v) C selects the appropriate URI and routes the connection accordingly It will be evident to the skilled artisan that such an ENUM resolved connection supports switching multiple services, bearers and protocols. For example, by similarly addressing text and multimedia messaging services (on the # prefixed phone number), users and carriers can switch and route a multitude of services to the associated IP client rather than the legacy device.

Further, in the absence of the appropriate NAPTR record and URI to service the requested connection, switching may revert to the legacy route as the fallback path. In "virtualizing" the dial plan thus, the disclosed symbolic addressing permits legacy telephone users to communicate globally over the IP Next Generation Network, all on a well known user identity at local cost.

FIG. 26

The ALTO method and system disclosed is predicated on an IP user registering their existing telephone number, referred to in the current embodiment as "A #" as "net alias". As such, the system requires a secure authorization mechanism to ensure that the registering party owns the nominated telephone number A #. The authorizing methods and systems following utilize an "out of band" challenge response mechanism. One such system is illustrated in FIG. 26 (F26), which shows a Randomized Telephone number authentication flow chart.

F26 Label~100: VOIP user client A @ begins a process to authenticate and bind telephone number A # as alias. User A enters telephone number A # either directly via the registered VOIP client software or via an associated website.

F26 Label~200: On receiving the nominated phone number, the VOIP system generates an "out of IP band" challenge, transmitted to telephone device A # over the legacy telephony network. In the illustrated embodiment, this challenge is presented via a missed call.

F26 Label~210: The missed call is a challenge sent directly to the screen of the A # telephony device. The authenticating service generates a random caller identity, depicted by "555xxxx" (IDx), where either the entire number or the last "x digits" comprising the telephone number, are randomly generated.

F26 Label~220: The system deposits this randomly generated identity on the telephone device (A #) by setting Calling Line Identity as IDx, automatically ringing and then substantially simultaneously disconnecting a call addressed to telephone A #, in a flow charted method similar to that illustrated in FIG. 20.

F26 Label~230: The system records this randomly generated telephone number IDx, together with the nominated phone number A # and a validity timer in a registry database 240 in a registry 2600 for future reference.

F26 Label~240: The registry database 240 thus reflects an A # record, together with the random IDx phone number challenge and an expiry date. The expiry date is typically computed by "adding the timer interval to the current date and time", as at the completion of the challenge process.

F26 Label~300: On depositing the missed call challenge, the system requests user A to respond by entering the IDx calling identity, transmitted over the legacy telephony network and displayed on the telephone device, back into the PC.

Since the challenge is carried over a network and channel that is distinct from the PC requesting the response, the mechanism is safeguarded from interception by an eavesdropping third party.

Further, given that the challenge is typically presented on a device that is independent of the VOIP system, the user is required to have physical access to the telephony device, B, in order to retrieve the challenge, and successfully respond via the PC screen requesting the IDx code.

In a timer based authentication method, the "validity timer" associated with the challenge response requires the user to respond to the IDx code challenge within a predetermined interval.

Typically, the validity timer is set to expire in a short interval, for example, less than 60 seconds after the user enters the nominated phone number, since the challenge generally presents on the phone display mere seconds thereafter.

Establishing ownership is thus predicated on the alleged telephone owner (User A) having the nominated phone (B) "in hand", since "near real time" response is required in order to respond to the challenge.

F26 Label~310: The authenticating service checks the registry database 240 to determine whether the response entered matches the challenge sent, in the time allotted. The timer validity may be determined by ensuring that the current time is earlier than the expiry time, as computed in ~240.

F26 Label~400: [No]. IF the response does not match the challenge or the timer has expired, the authorization fails as depicted by circle "X" 410.

F26 Label~400: [Yes]. IF the response entered matches the challenge sent in the allotted time, the authorization succeeds and logic flows to ~500.

F26 Label~500: Since the response and challenge match, it may be determined with a high degree of certainty, that IP User A "owns", or at minimum, has direct access to telephone A #.

On thus successfully authenticating the nominated phone number, the system records the association between telephone number A # and IP user identity A @ in a service registry 2600. This results in an A # phone record with associated A @ IP user identity. Note that in the current non-limiting example, the phone number of User A (A #) is the same as the phone number (B #) of User A's phone (B).

F26 Label~600: VOIP User A now has telephone number A # set as alias. This authenticated phone number is used to switch and route connections originated on legacy telephones (B's), to the associated VOIP client (A @'s), by symbolically prefixing the directory telephone number as disclosed in the above described ALTO method and system.

FIG. 27

Figure 27:
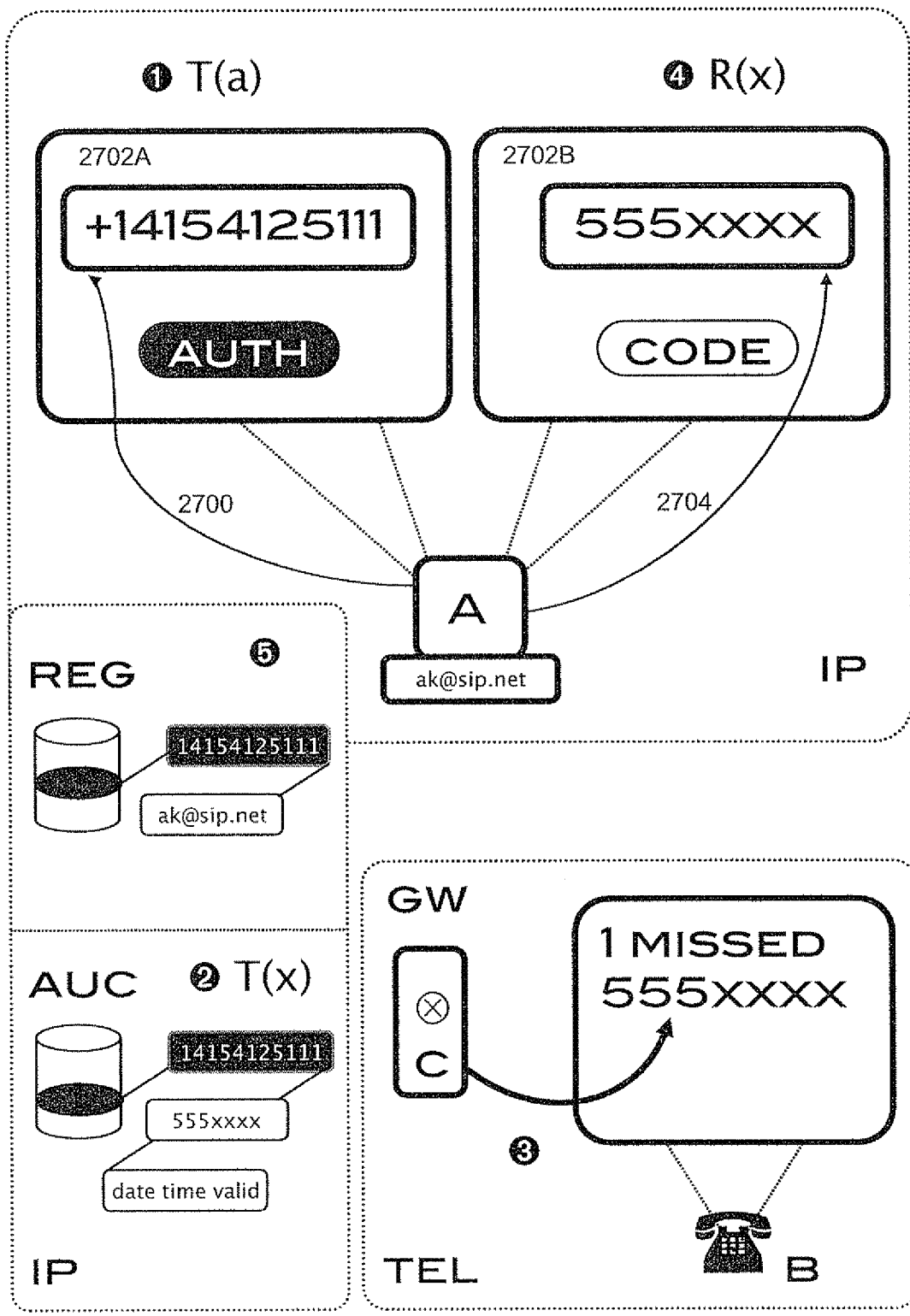
FIG. 27: Randomized Telephone number entity relationships.

FIG. 27 (F27) depicts Randomized Telephone number entity relationships, presenting the above authentication process from the perspective of the VOIP user registering the phone number.

F27 Panel 1: VOIP user client A, either directly via the VOIP client software or via an associated website, is requested to enter 2700 phone number B # to authorize. By example, VOIP user "AK@sip.net" enters telephone number "14154125111", via the Internet connected PC screen 2702A as shown (expanded).

F27 Panel 2: On receiving B #, the system generates a random telephone number challenge B(x), as depicted by "555xxxx" and described in FIG. 26 above in regards to IDx. This user entered telephone number B # together with system generated challenge B(x) is stored as a "B authentication record" in an authentication (AUC) center (2600 of FIG. 26) for subsequent retrieval and reference.

The AUC may be a physically separate storage unit coupled to the authenticating node. Alternatively the AUC may be a local store or a memory based store on the servicing Internet authentication node itself. Optionally, the system allocates a "validity" timer, the time until which this challenge remains valid.

F27 Panel 3: The system deposits a "B(x) missed call" on telephone device B. That is via an associated legacy Gateway C, the systems programmatically rings telephone b with caller line identity set to b(x), and disconnects the call momentarily thereafter, preventing B from answering. Phone B displays "1 missed call from 555xxxx" (where "555xxxx is an example of IDx B(x), as shown.

This missed call thus presents a random "out of band" challenge directly to the display screen of telephone B. The telephone thus requires no special software, other than the standard capability to present caller identity, in order to successfully challenge the owner.

F27 Panel 4: On challenging the user, the Internet authenticating service presents a follow on PC screen requesting User A to enter the missed call digits as response 2704. As illustrated, User A enters the same "555xxxx" code received on phone B back into the PC screen 2702B.

F27 Panel 5: On the receiving the 2704 code via the PC, the VOIP system compares it with the B(x) code stored in the "B authentication record" as shown in Panel 2. If the B(x) code sent via the missed call event matches the 2704 code entered at the PC within the time allotted, authorization successfully completes (see F26, step 500).

On successfully matching the challenge and the response as above, the system records the now authorized telephone number and the associated VOIP user identity in a service registry, as described above with reference to F26 step 600. As illustrated, phone number "14154125111" is now the numeric dialed alias to VOIP user "AK@sip.net".

FIG. 28

Figure 28:
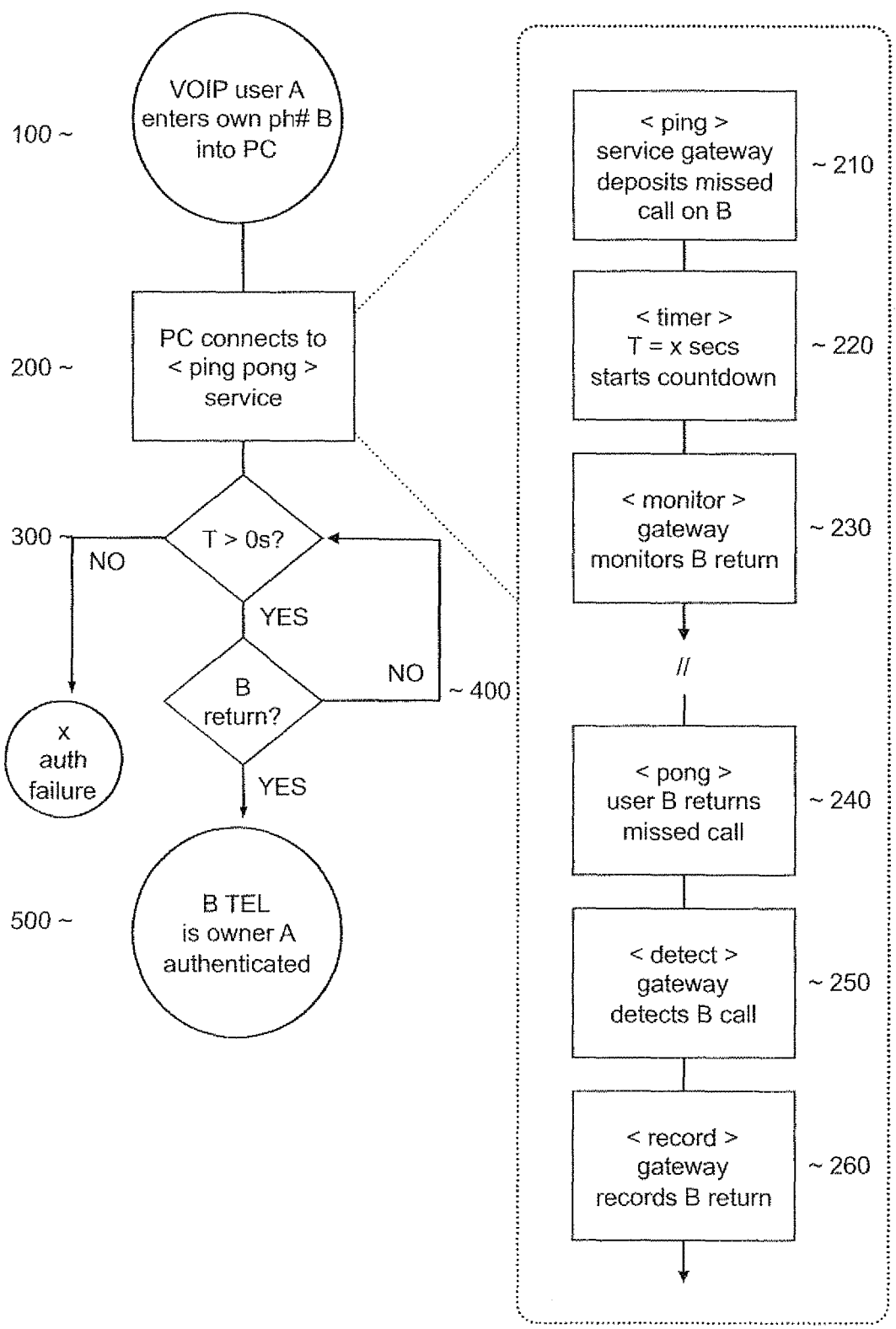
FIG. 28: Returned Telephone number authentication flow chart.
Figure 34:
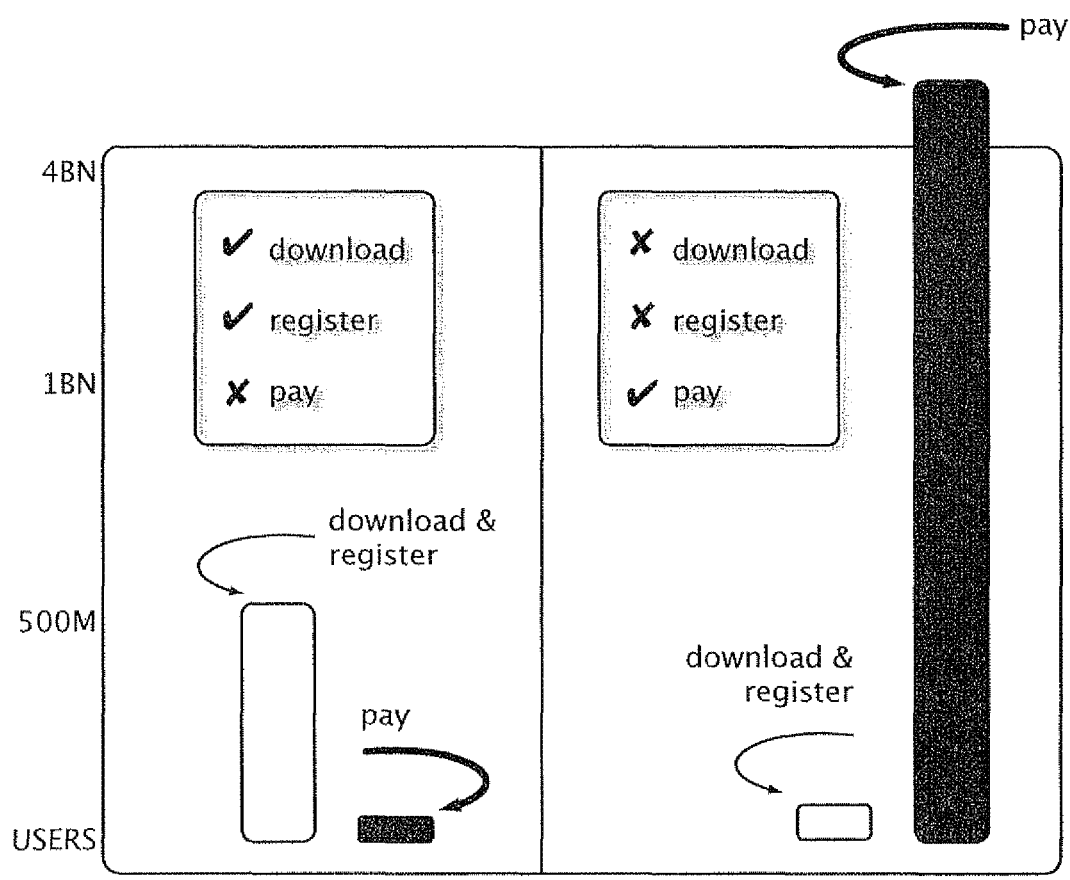
FIG. 34: Diagram highlighting core net versus cellular culture.
Figure 36:
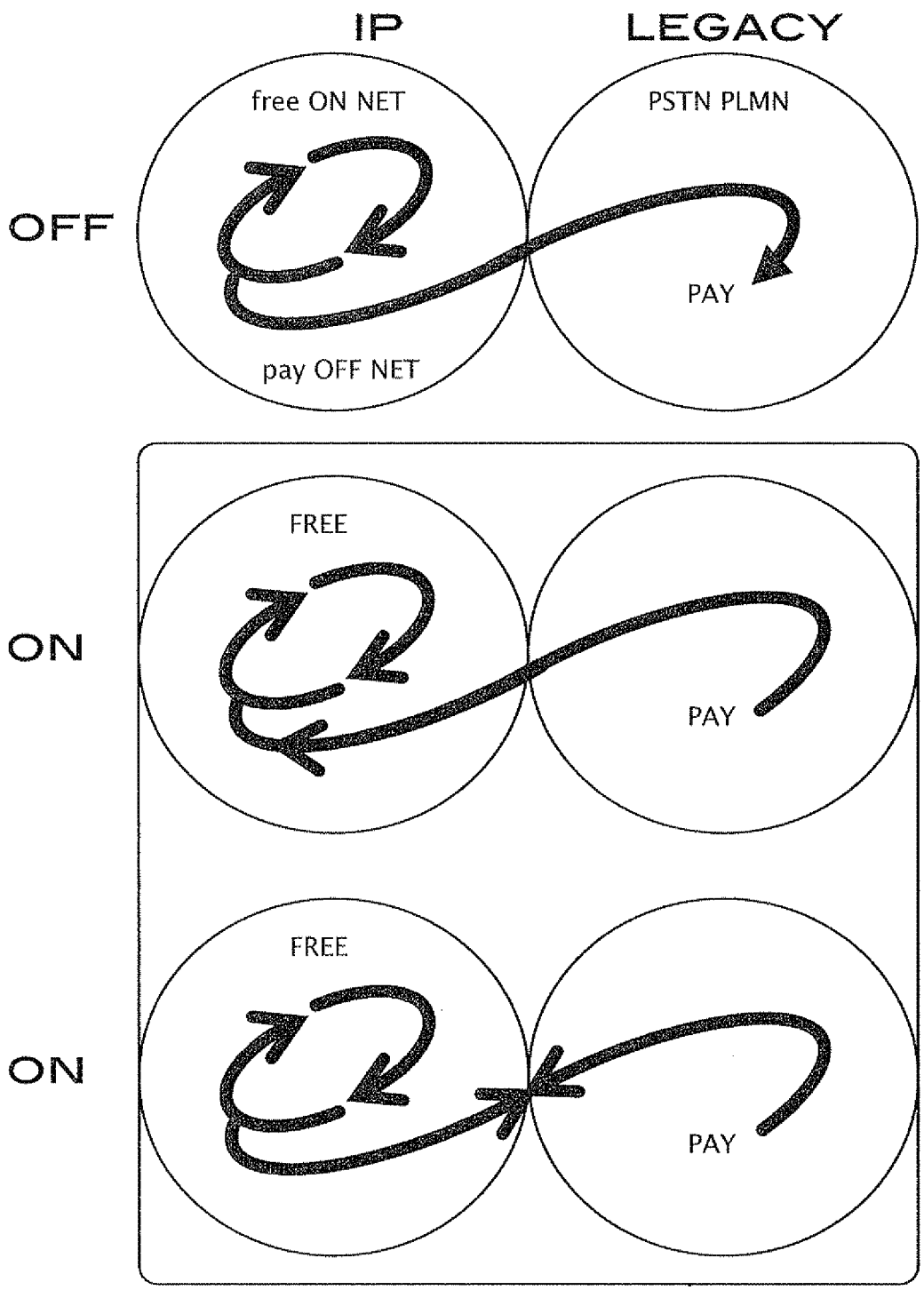
FIG. 36: Newly disclosed "on and off net" connection flows.

In an alternate authentication embodiment, the missed call challenge (the "ping") presented to the registering telephone, may be returned (the "pong") via the legacy network back to the authenticating service without requiring manual code reentry at the PC. One such "ping pong" system is depicted in FIG. 28 (F28), which shows a Returned Telephone number authentication flow chart.

F28 Label~100: Registered VOIP user client A @ enters telephone number B # into an authentication service, via an Internet connected PC.

F28 Label 200: On receiving phone number B #, the PC programmatically connects to the "ping pong" service.

The following "210~260" logic, in the dotted frame, executes in parallel with the main authorization loop "300~400".

F28 Label~210: <ping>. The service deposits a missed call challenge onto device B as described with respect to F26. User A is then requested to return the missed call received on telephone B.

In one embodiment, the missed call identity is randomly generated on a gateway prefix, to deliver "direct in dial extensions", where the last "x digits" of the gateway address are randomly generated. In another embodiment the missed called identity is static, representing a complete generic gateway address.

F28 Label~220: <timer>. The system initializes a countdown timer T in seconds. This timer automatically counts down to zero, clocking the return call from the registering phone number B #.

F28 Label~230: <monitor>. The system monitors the gateway identified by the challenge, awaiting the return call from B.

F28 Label~320: [No]: IF the timer has counted down to zero (expired) then authorization fails, as depicted by circle "x" 330.

F28 Label~320: [Yes]: IF the timer is still positive (ticking) authorization continues at ~400.

F28 Label~300: The authentication service enters a programmatic loop that polls 400 the gateway for the return call within the specified time.

F28 Label~240: <pong>. Telephone B returns the missed call which routs to the servicing gateway C.

F28 Label 250: <detect>. The monitoring gateway C detects the incoming call from phone B.

F28 Label~260: <record>. The monitoring gateway C records the return call from phone B in a service registry (not shown).

F28 Label~400: The authenticating service checks the authentication registry (not shown) to determine whether the servicing gateway has detected and recorded a return call from B.

F28 Label~400: [No]. IF no such return call was detected and recorded, logic loops back to ~320

F28 Label~400: [Yes]. IF phone B did return the missed call logic flows to ~500.

F28 Label~500: Since B returned the missed call challenge within the allotted time, it may be determined with a sufficiently high degree of certainty, that phone B belongs to user A.

On successful authentication, the system registers the association between telephone number B # and IP user identity A @(registry not shown). The "ping pong" system and method, delivers frictionless "2 clicks" authentication, without any manual code entry required, on returning a call.

FIG. 29

Highlighting the "ping pong" authentication method and system in a more graphic presentation, FIG. 29 (F29) illustrates the returned telephone number entity relationships.

F29 Step1. VOIP user client A @, either directly via the VOIP client software or via an associated website, is requested to enter 2900 the phone number B # being authorized. By example, VOIP user "AK@sip.net" enters telephone number "1415412511 1", via the Internet connected PC screen 2902A at top left, as shown (expanded).

F29 Step2. The system deposits a "missed call" on telephone device b via an associated legacy Gateway (c) as described with respect to F28 above. In the illustrated embodiment, the missed call line identity is set to a static gateway telephone number "7132421581", as displayed on the legacy B device screen (expanded).

On depositing the missed call, the system records the expected return call telephone number B # in a registry (such as described in reference to F28, registry database 240 in a registry 2600, not shown). Typically, this register is memory resident at the gateway C. The gateway C monitors incoming calls to determine if one originates from telephone B.

F29 Step3. The system starts a countdown timer T(−) by example, a "30 second" timer as depicted in the anticlockwise semi circle in PC screen 2902B top right. This timer automatically counts down to zero at which point the authentication process expires. The countdown timer expires when the countdown timer has counted down all of the given time with which the countdown timer was initialized. While the timer is active, the system polls the gateway for a returned call from B.

F29 Step4. User A is requested to return the missed call on phone B. Missed calls are typically returned by pressing "Send" (Connect) on a mobile telephone. On touchscreen telephones, the user may touch the missed call displayed to return a missed call, whereas on fixed line telephones, the user may press a dedicated "return call" key. The return call is routed back to the gateway C identified by the return dialed digits.

F29 Step5. On the receiving the returned missed call, the gateway C matches the B calling line identity B # in the registry of expected return calls and checks that the timer is still valid (non zero). If the calling identity B # matches a registry entry and the timer is valid, authorization successfully completes and the registry entry is cleared. Telephone B is then authorized, depicted by the ticked (checked) phone number in the PC screen 2902B expanded at top right.

F29 Step6. On successfully matching the return call within the allotted time, the system records the now authorized telephone number and the associated VOIP user identity in a service registry, such as registry 2600, as illustrated. By example, phone number "14154125111" (A #) is registered as the numeric dialed alias to VOIP user "AK@sip.net" (A @).

FIG. 30

The ALTO methods and systems described are contingent on legacy carrier participation in allocating the symbolic prefix required to switch and route connections over IP. Alternatively, an Independent Service Provider may offer equivalent IP switching and routing functionality on an unassigned "country code prefix", as per the ITU E164 dial plan allocation.

Such a virtual and carrier independent IP switching prefix, permits users to freely bind their existing IP services to an authorized phone number without the legacy network operator having to dedicate, and thus "consume", a Top Level Digit in the cellular keypad matrix to perform this function (for example, the "#" key). FIG. 30 illustrates this Global IP phone number assignment in one embodiment.

UNNO

In the illustrated embodiment, a Universal Net Number (UNNO) is formulated by prefixing an existing authorized telephone number with a newly assigned ITU country code prefix, to deliver an IP switched abstraction to telecoms. In one such embodiment, this virtual operator is defined on an unassigned ITU "triple digit country prefix" (three identical digits) also known as an "easily recognizable number" (ERN). One such ERN is the presently unallocated "+777" country code, which in the disclosure would now define a Virtual and Global IP Operator.

In one embodiment, the ERN may be dialed as a fully qualified E164 address (including the International "+" prefix) that would route on Global Title Translation (GTT) to an assigned Internet Media Subsystem (IMS) gateway. It would be clear to the suitably skilled switching artisan, that on programming the relevant routing table entry into the switching subsystem, the originating operator would thus route all such (+777) prefixed connections to the requisite IP Gateway, rather than conventionally switching the connection internationally over legacy networks.

Alternatively, the ERN may be dialed as a "locally formatted number" (without the "+" prefix) that the operator would then normalize to the fully qualified E164 format. In either instance, any "777" prefixed telephone number would return a routing destination equivalent to an SS7 point code identifying the IMS node on the originating carrier network, switching the connection thus over IP to the associated VOP user, as described below.

The UNNO allocation and IP service association, continues and extends the ALTO authorization process described above. In the illustrated embodiment, the service is conducted by the UNNO numbering authority "www.dom.com", accessed via an Internet connected PC (as shown). Whereas the authorization processes described previously automatically linked the registering VOIP user, UNNO permits any user to associate any IP service to the authorized number.

F30 Step1. On successfully completing a telephone number authorization, the user is presented with the service association screen (upper panel). This screen permits the user to associate a plurality of VOIP user names and services with the UNNO allocated and authorized number. The illustration shows authorized phone number ("14154125111") being linked to two user supplied VOIP addresses ("AK@SIP.NET" and "AK@VOI.COM") via the "+777" Virtual IP Operator Prefix.

F30 Step2. On entering the services to be linked, the system assembles and records ENUM NAPTR resource records (abstracted as shown) on the authorized telephone number domain. In the illustrated embodiment, these records are hosted on a private domain ("dom.com") however they may similarly be hosted on the ENUM public domain ("e164.arpa"). This linkage, together with the associated DNS ENUM resolution would, in one embodiment, result in both VOIP "extensions" (AK@SIP.NET and AK@VOIP.COM) ringing on dialing "+777 14154125111" from any legacy telephone.

On switching such a "777" prefixed connection, the servicing Gateway would perform a DNS ENUM resolution on the subscriber digits received in the connection setup request (14154125111) to retrieve the NAPTR associated resource records, and connect to the appropriate IP service (as per the description pertaining to FIG. 25 above).

It will be appreciated that a simple software modification to mobile telephones can permit "button press" IP call switching, by automatically prefixing conventional telephone numbers with the common carrier and independent global prefix disclosed.

In one such software modification, on selecting a dedicated key or software feature, any standard telephone contact address may be automatically and transiently modified to incorporate the Global Operator IP prefix prior to issuing a call setup request (that is prior to signaling "Connect").

For example, selecting a conventionally stored contact "AK" (telephone number "+14154125111") and pressing and holding a suitably modified key (for example, the "#" key), would programmatically transform the contact phone number into the symbolic ALTO (#14154125111) or UNNO (+77714154125111) prefixed format and transmit the connection request in a single step.

FIG. 31

In an alternate IP switching prefix system and method that forgoes telephone registration and authorization, two legacy telephones may be automatically paired over the Internet through a discovery process that dynamically establishes NANO numbered clients and exchanges contact data. FIG. 31 depicts an Example Telephone pairing over IP.

In the illustrated embodiment, IP switching is on the symbolic "#" prefix to the dialed destination. In another embodiment the prefix is the virtual IP operator "777" ERN as disclosed earlier. In either instance, no advance telephone number registration and authorization is required.

F31 Step1. Telephone user A(10) dials "# B. Originating switch (not shown) routes the connection on the symbolic prefix to Gateway C(20), establishing a first communications leg AC.

F31 Step2. C instantiates a NANO client (A #) that serves as the VOIP client proxy to caller A. NANO client proxy instantiation and registration is described in detail above, with reference to FIG. 2.

F31 Step3. C registers proxy A with service Registry D(40), which records the NANO client IP address and Port (not shown). On registration C queries the registry on the AB connection setup data.

F31 Step4. D determines that A and B client records do not exist. D automatically creates A and B client records, exchanging contacts between them. That is on receiving a connection request from phone A to phone B, registry D creates numbered NANO account A with B as contact, and conversely, creates NANO account B with A as contact.

Since telephone B is currently "OFF net" as per the disclosed definition, that is B has not connected to a service gateway and consequently has no Proxy IP address and port registered, A is put on hold. Holding is typically indicated to A by playing music or playing a special tone.

In the illustrated embodiment A and B have rendezvoused the connection using collateral communication channels such as email, text and instant messaging. Alternatively, C may automatically notify B that A is "holding the line", prompting B to establish connection by calling "#A".

F31 Step5. Telephone user B(30) dials "#A", and is similarly routed to Gateway G(50), establishing a second communications leg BG.

F31 Step6. G instantiates a virtual NANO B client, that serves as VOIP client proxy to caller B.

F31 Step7. G registers proxy B with service Registry D(40), which records the NANO client IP address and Port (not shown). On registration, D determines that A and B client records exist and that A is registered and "ON net".

F31 Step8. G invites Proxy A. Since A explicitly dialed B, the connection is automatically established and announced. Caller B hears a short ring back tone played by G. Caller A hears a special connect tone, played by C. Connection establishment bridges the first and second communication legs, AC and BG.

F31 Step9. Telephone users A and B are paired and connected.

FIG. 32

The advanced association between VOIP users and legacy telephone contacts has focused on service delivery within the realm of a single service provider. In these examples, the registry recording the IP and Telephone association has thus far been presented within the context of the service provider network.

The discoverable nature of identifying Internet users, by reversing a calling line identity into their online address books to determine association, broadens the application of the disclosed methods and systems. Alternatively, the gateway servicing the telephone connection may query a plurality of registries (directories), associated with a plurality of Internet service providers.

These online registries may collectively be referred to as the "Web social directory" and the amalgamation of users associated with a particular telephone number across these multiple service domains, may be termed a "mash up". Querying the web social directory to discover and dynamically assemble a mash up of Internet users that have recorded a particular telephone number as a contact, is illustrated in FIG. 32, which depicts an Example web social telephony mash up.

F32 Step1. Telephone user B(10) dials Gateway C(20) to establish a first communications leg BC.

F32 Step2. C queries online directories D(40) from multiple service providers (SP), using the B calling line identity as access key to identify VOIP users A(30) that have the B phone number listed.

F32 Step3. In the illustrated example, D returns users A(xyz) who have phone number B listed as contact. Users A(xyz) may differ in the VOIP protocol adopted by their respective service provider.

F32 Step4. C plays a contact selection menu to B as depicted by the bold rectangular speech bubble. Various menu presentations and user selection methods are described throughout this disclosure.

F32 Step5. B selects user "A" from the A(xyz) list of users presented.

F32 Step6. C rings A with calling line identity set to phone number B, establishing a second communications leg CA. While the illustrated embodiment rings A using the open standard "SIP Invite" method, it will be evident that C would support the various protocols required in order to contact users associated on different technology platforms.

F32 Step7. A answers the call.

F32 Step8. C bridges the first and second communication legs, BC and CA.

F32 Step9. A and B are thus connected.

FIG. 33

Alternatively, association may be delivered between VOIP users and legacy telephone contacts may be utilized to establish an anonymous "instant callback channel" on the net, mapped directly to a selected telephone number.

In this alternate embodiment, VOIP user A is not required to sign into service with any particular provider and username. Rather, on entering a desired contact phone number, VOIP client software defines a logical "B net extension", a new window or tab, that "blind registers" (without user authentication) the current IP address of the anonymous client on a Virtual Realm.

The Virtual Realm is distributed over a B telephone ENUM domain, as described in FIG. 17 above, that transports, registers and caches the B net extension directly at an edge Gateway servicing the call back telephone user. FIG. 33 illustrates establishing one such Instant callback service channel.

SOLO

Conventionally, a VOIP Gateway with DID (direct in dialing) capability, routes an incoming call, from the legacy network to an IP Service Provider, on the dialed destination. Call routing in the conventional case is thus determined by mapping the DID dialed number to a registered URI. Typically, this URI resolves to a location server that then locates the VOIP user associated with the DID number.

The anonymous call back embodiment introduces a unique new switching algorithm that dynamically assembles the URI at the DID Gateway on "source" (B) rather than dialed destination (C), constructing the identical ENUM URI string that the anonymous client registered under. This dynamic URI construction routes and distributes the incoming call directly to the VOIP registry containing the location of the anonymous client.

"Switched On Line Origination" (SOLO) thus programmatically assembles the inbound call path and URI "referencing self", the B calling identity, dynamically routing and resolving service on the resultant ENUM realm without any additional switching logic required. By example, if telephone number B is "14154125111", the anonymous extension registration and callback route is established on URI:

14154125111@1.1.1.5.2.1.4.5.1.4.1.dom.com

F33 Step1. Anonymous VOIP user A(30) enters phone number B ("14154125111" as illustrated).

F33 Step2. VOIP A client software opens a B titled and thus linked window, the "B net extension", registered over the ENUM Realm "14154125111@1.1.1.5.2.1.4.5.1.4.1@dom.com".

In one embodiment, on registering the extension the client software sets an "automatic answer timer" (T) for the selected extension. If a return call from B is received within the timer period, the call is automatically answered. This automatic return call pick up within the specified time, ensures that the most recently established extension is primary.

For example, user A and B negotiate a connection utilizing a collateral communication channel, such as SMS. At the scheduled time, A opens the anonymous extension and the automatic answer timer is set to 90 seconds. This extension thus establishes itself as "priority answer" over any earlier extensions, whose timers would typically have already expired, since B has rendezvoused most recently with A.

If B is on an active call with an earlier established extension, B may call the newly established extension and selectively conference the two extensions using "multi call" control features supported on the legacy network. If no active automatic answer is active, the extension that manually answers establishes connection. In selected embodiments supportive client software may permit A to reactivate the automatic timer in order to "prime" the extension for pick up.

F33 Step2x. As illustrated and by example in expanded view (dotted ellipse), the ENUM Realm automatically resolves to an edge Gateway servicing San Francisco (SFO), California USA. This Gateway is zoned and delegated to Level 6 (L6) in the reverse B dotted path, which describes the home base for all "1415" prefixed telephone numbers. Granular zoning on the NANP is detailed in the description related to FIG. 18.

F33 Step3. The ENUM registration resolves via DNS to the delegated Registry D(40) that records the IP address location (@ IP) for each anonymous VOIP user in a B number record (the "B net extensions"). Optionally, each extension registration is time stamped T(n).

Edge Registry D(40) and Gateway C(20) are typically one and the same network node and are herein referenced interchangeably.

F33 Step4. Telephone user B(10) dials Gateway C(20), establishing a first communication BC.

F33 Step5. C assembles the B ENUM URI as above and rings the resultant net extension to establish a second communication CA. In one embodiment C group rings all B registered extensions in parallel ("group" as shown). In another embodiment C rings the last extension to register, time stamped T(n).

On C ringing the extension(s), the associated A client window presents the incoming call.

F33 Step6. The A(n) extension answers, as illustrated. This call is answered either automatically, if the automatic answer timer is still active, or manually on the user accepting the call.

F33 Step7. C automatically disconnects any additional extensions ringing.

F33 Step8. C bridges the first and second communication, BC and CA.

F33 Step9. A and B are thus connected.

FRISB

One service that serves to highlight the industrial applicability of the disclosed systems and methods is "FRISB™ dot com," which is a VOIP technology implementation and service that uniquely applies game theory to telecoms.

Modeled on the popular analog game "Frisbee", digital FRISB players "spin virtual discs around the world, from net to phone, catching returns to speak free". In reversing connections thus back into the cloud, FRISB practically reinvents the Internet Phone. FRISB in particular overcomes the 3 main inhibitors to mass service adoption:

1. Downloading
2. Registering
3. And Paying

This direct to consumer service, hosted in the cloud and accessed through a standard web browser, applies the core methods and systems disclosed. By embedding a SIP client directly into a web page to voice enable a browser, FRISB allows users to direct their browser to "www.frisb.com" and instantly gain remote access to global communication without downloading, without registering, and most significantly, without paying.

The embedded web phone applet may be developed using software platforms and environments including amongst others, Sun Microsystems Java™, Adobe Flash and Air™, Microsoft ActiveX and Silverlight™ and the emerging "HTML5". Developments may further utilize HTTP "tunneling", technology that encapsulates VOIP telephony commands and media streams through the standard web browser "port 80" and related communication protocols.

Dubbed "Voice on the fly", FRISB delivers "the highest abstraction of telephony on the net". Whereas search engines permit users to freely locate almost any information stored on the web, by typing a few words (the search) into a browser, FRISB permits any user to freely connect to any legacy telephone in the world, by typing a few digits (the phone number) into their browser.

Fundamentally, while the service is provided free to net players, it uniquely generates revenue on the "interconnect" generated by the fixed and mobile phone return calling via a local legacy service gateway that interconnects VOP. The unique FRISB business model is thus "free forward, pay back", as in "free contact on the spinning the disc forward," and "payment on the phone user calling back".

Modeled on seamless callback functionality where the phone user pays for a local call and is instantly connected to a global community who talks free, FRISB enables the VOIP industry to "leap over the penny gap", the gap in service that demands payment for calling a legacy telephone and establishing an "off net" conversation.

FRISB and the underlying methods and systems disclosed, thus uniquely converges "net social" (free) with "cell capital" (paying) to deliver a definitive "fixed mobile convergence" service that reverse connects conventional telephones to voice enabled browsers, without changing the mass user behavior and core service propositions in either realm.

FIG. 39

Figure 39:
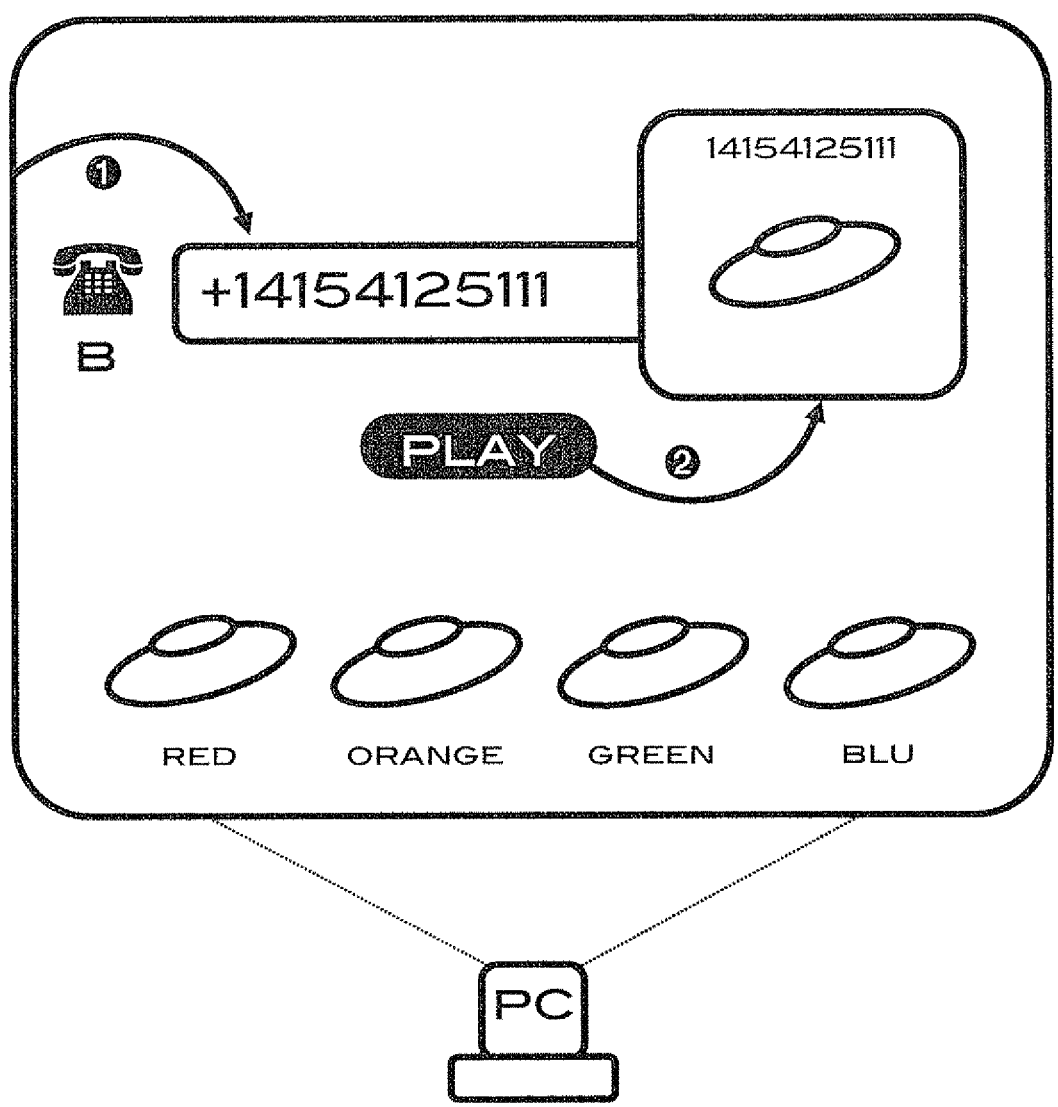
FIG. 39: FRISB World Wide Web service embodiment.

Describing the "game" in one embodiment with reference to FIG. 39, FRISB is played between an Internet web browser and a conventional telephone.

F39 Step1. Web user A directs the browser to "frisb dot com" and enters a conventional telephone number B # ("14154125111" as illustrated), sending the disc to the contact they wish to establish communication with.

Figure 40:
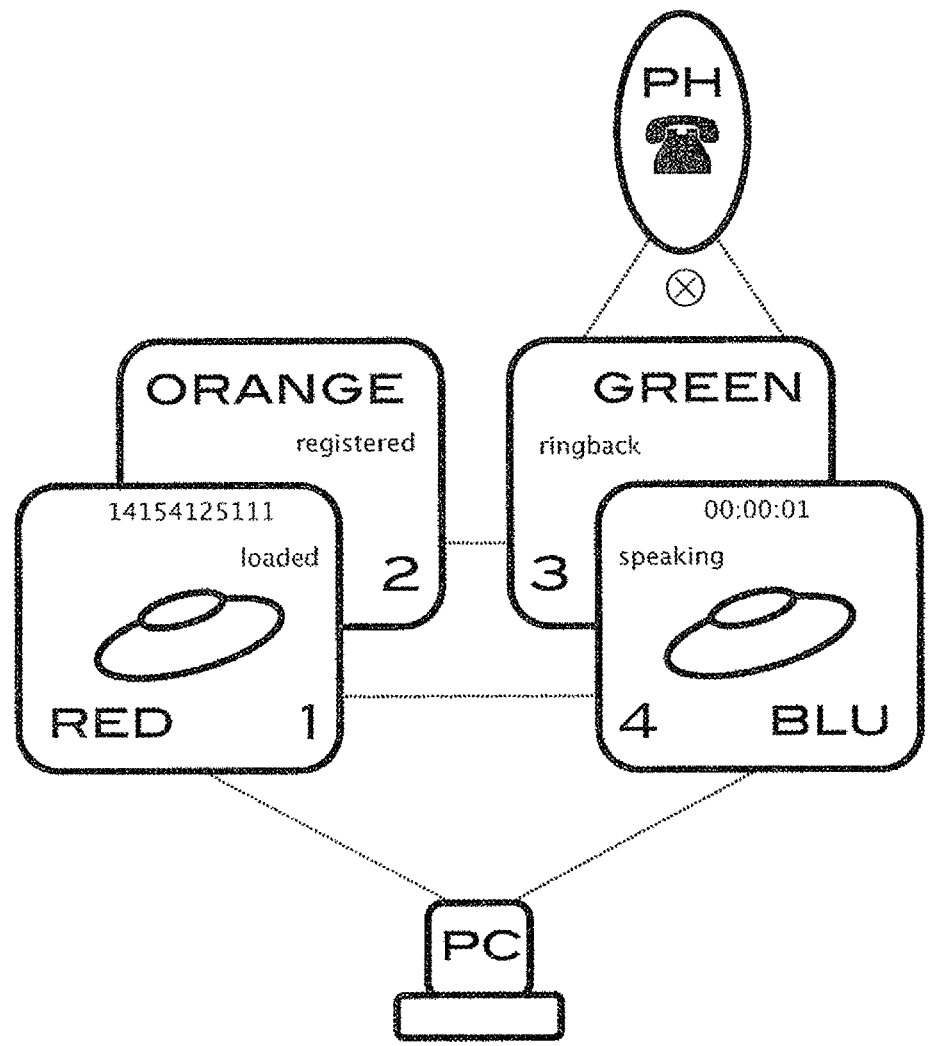
FIG. 40: FRISB universal color coded signaling state management.

The web home page screen presents a colored disc progression along the lower edge, indicating the various states through which the game progresses. These states are described in FIG. 40 below.

F39 Step2. On entering the B player phone number, the web service "pops up" a second browser window titled B ("14154125111") that references and downloads the embedded SIP phone applet.

The applet is automatically configured to register the B "disc extension" as per the SOLO method and system described above. On completing automatic service registration, FRISB has established a logical callback path from telephone B to the web browser window with same title.

Telephone B receives a "virtual disc", presented as a callback notification and prompt. In one embodiment this call back notification is a "missed call" with the local service Gateway that the disc registered into set as the caller line identity.

FRISB thus automatically registers and logically creates a "direct voice channel back to the browser embedded SIP endpoint", all on the user associating the Internet browser with the address of conventional telephone subscriber. When the associated telephone calls a local service gateway, the browser rings and the telephonic connection is established in reverse.

FIG. 40

FRISB uniquely presents a universal interface using the elements of light (color) and sound to signal call state and progression. The disc alters state by changing color and flying (animating) into view. Utilizing the universal signaling color spectrum, the disc progresses in state from Red to Orange to Green and finally to Blue. Describing this progression in more detail with reference to FIG. 40 (F40):

F40 Screen1: on successfully embedding and initializing the applet, the window displays a "disc" colored RED.

Red indicates the state of "wait".

F40 Screen2: on loading the applet the service automatically registers the browser embedded VOIP endpoint A with the media server that is used to route the call back to the browser address captured in registration. On successfully registering the browser endpoint for callback, the B telephone is pinged (as described below) and disc goes Orange.

Orange indicates the state of "shift".

F40 Screen3: when the phone number B previously identified to the service by user A calls the access gateway, the connection is routed back to the browser which then rings. On successfully ringing the browser the disc goes Green.

Green indicates the state of "go".

F40 Screen4: if the browser rings back within a short "delta" timeframe (for example, within 90 seconds) from user A spinning the disc, the embedded phone automatically answers the return call, otherwise the internet user clicks the now green disc to pickup the call. On successfully answering the call the disc goes Blue.

Blue indicates the state of "communication".

FRISB is now "flying" and full duplex audio circuits are established between the browser and the phone permitting both players to talk. Since users typically rendezvous the connection establishment, the callback is returned within the automatic answer timeframe and the call is automatically completed. A clock showing current call time in "hours minutes and seconds" is displayed in the window title (00:00:01 as shown).

Disc signaling and associated "color spectrum" thus transitions from:

Red (service and dial tone establishment) to
Orange (dialing and initiating callback) to
Green (ring back) and finally to
Blue (in communication)

This all without the sender A having to interact with the disc elements. This timely and automatic progression in connection state gives the impression that the call is actually being established in the forward (AB) rather than the reverse (BA) direction, since the "ring back" from B typically presents within an acceptably short time frame to be interpreted as a forward established "ring back tone" (the B party is ringing) rather than what it in fact is, a "ring back" (B calling back and ringing A).

When either party disconnects the call, the disc returns to Orange.

If the return call from telephone player B arrives after the automatic answer period, that is it arrives later than what would be interpreted as a forward established connection from A to B as described, the disc presents as a "ringing phone", repeatedly "flying into view" (animating) while ringing, awaiting the user to click it, to "catch it" and answer the call.

If the user answers the call, for example by clicking the now Green disc, the connection is established and the disc changes color to Blue. If the call goes unanswered after a predetermined period of time, the disc returns to Orange and indicates a "missed call". If user A wishes to "spin the disc again" and thereby ping the caller B for callback once again, clicking the now Orange disc restarts the game and reengages automatic pickup on the expectant return.

FIG. 41

Figure 41:
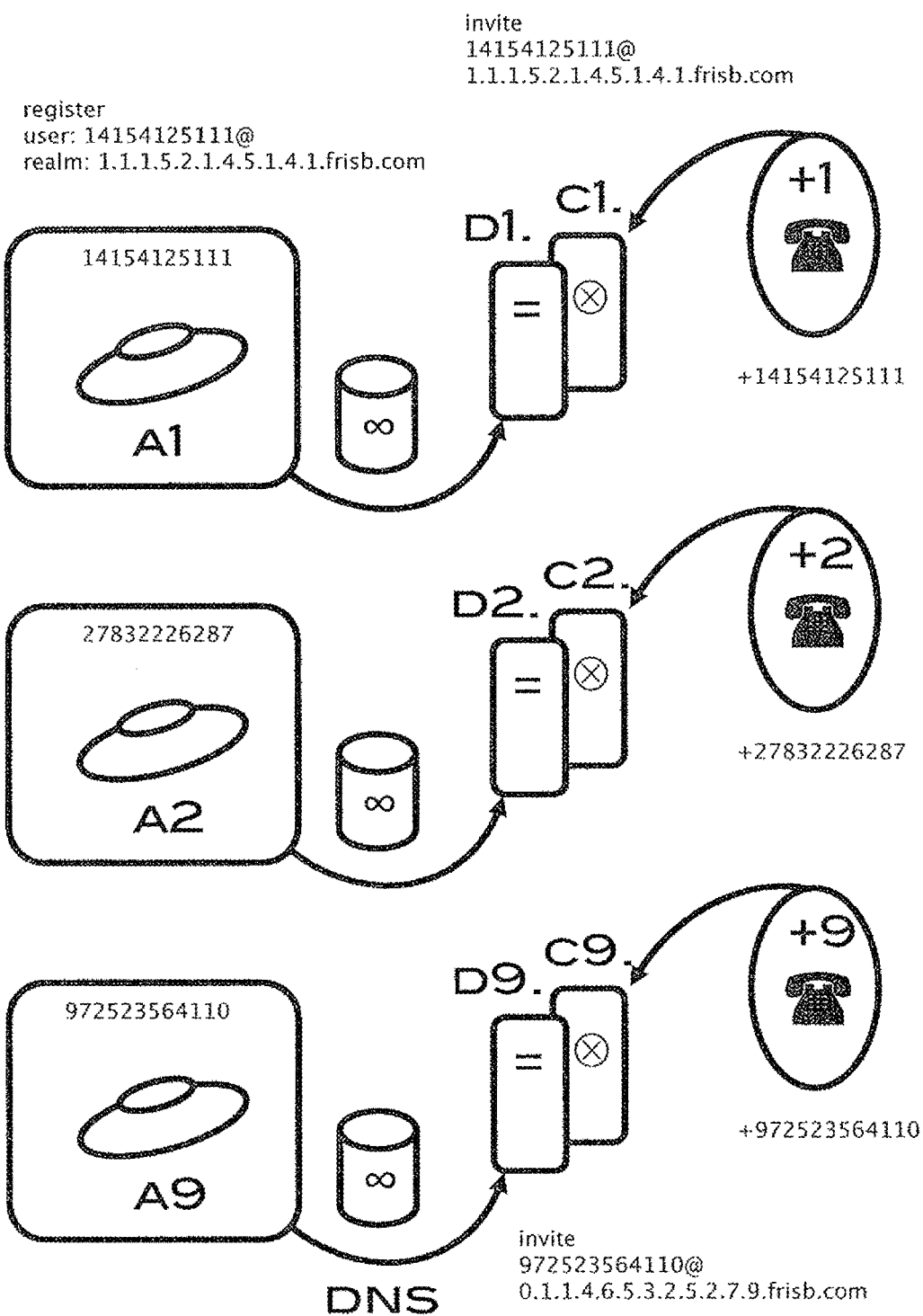
FIG. 41: FRISB disc edge caching over dynamic DNS.

In particular with reference to the SOLO embodiment, the FRISB phone client registers on an ENUM Realm that dynamically and geographically distributes the game over the E164 dial plan. FIG. 41 illustrates three such distributed registrations and callback paths:

F41 Disc A1. URL www.frisb.com/14154125111 registers disc to:

14154125111@1.1.1.5.2.1.4.5.1.4.1.frisb.com

The above URL resolves via DNS to the delegated Registry D1 servicing gateway C1, locally registering all USA disc destinations (E164 leading digit "1" equals United States of America).

F41 Disc A2. URL www.frisb.com/27832226287 registers disc to:

27832226287@7.8.2.6.2.2.2.3.8.7.2.frisb.com

The above URL resolves via DNS to the delegated Registry D2(7) servicing gateway C2(7), registering all ZA disc destinations (E164 leading digits "27" equals South Africa).

F41 Disc A2. URL www.frisb.com/972523564110 registers disc to:

972523564110@0.1.1.4.6.5.3.2.5.2.7.9.frisb.com

The above URL resolves via DNS to the delegated Registry D9(72) servicing gateway C9(72) locally registering all IL disc destinations (E164 leading digits "972" equals Israel).

On disc registration the servicing Gateway deposits a missed call on the telephone described in the registration headers. This missed call is programmatically delivered as described above.

On receiving the return call from the registered telephone the Gateway assembles the SOLO URI, formulated on the B calling line identity as disclosed, that routes the connection back to the web browser. The Outbound Proxy for the FRISB realm (Registry in the illustrated embodiment) resolves the URI to the IP address of the browser that registered the disc.

FIG. 42

To the skilled VOIP artisan, the elastic nature of the VPN (Virtual Private Network) Architecture encapsulated in the URI syntax above will be evident. DNS servers responsible for resolving the FRISB Realm may authoritatively delegate zones at any point in the "B dotted path" (the path to the right of "@"), massively and automatically distributing service over the geographic numbering plan.

FIG. 42 illustrates the dramatic distinction between a Level 2 ("zero zoned") DNS resolution, and a Level N zoned and delegated DNS tree.

The upper panel wildcards all discs on the primary domain "frisb.com" by configuring the DNS A record to point all connections to a single Gateway D, represented by address IP(D), collapsing service to a single central node.

The lower panel creates N zones to the left of the primary domain, configuring the DNS A record to point each zone N to its servicing Gateway D(N), represented by address IP(DN), thereby distributing service over N nodes.

Thus, whereas the upper panel would switch all calls to a single central servicing gateway for routing logic, the lower panel automatically switches connections to the distributed node N as configured by DNS. That is, the one and same URI yields different switching paths based on the current DNS configuration.

By abstracting the routing logic to DNS, the service can "retroactively scale" by distributing the switching layer on creating more nodes in the DNS tree, all without modifying the programmed switching logic and URI assembly.

FIG. 43

Expanding on DNS zone delegation, FIG. 43 (F43) tabulates example DNS A records. The upper table distributes disc registration and switching by country, the lower table increases granularity by configuring DNS zones down to network or regional network operator.

With reference to the upper table, the first DNS A Record "wildcards" and catches all global disc registrations that are not zoned and delegated to any particular region. The second DNS A record wildcards all discs addressed to phone numbers beginning with US international dialing code "1" to point to the US located disc serve (IPx1) and so on.

The more granular service distribution is achieved on delegating zones "to the left along the dotted path" as illustrated by the example records listed the lower table. Detailed zone delegation per the NANP, for example, is described in more detail with reference to FIG. 18 above.

Continuing with playing FRISB . . .

In the case that a plurality of players spin discs to the same telephone number, even although, in one embodiment, discs from different sources may present to the phone via the same generic call back number, simple service logic resident in either the disc browser or the Gateway may effectively route returns, as per the automatic answer and LIFO queuing models described earlier, in particular with reference to FIG. 33.

Notwithstanding the anonymous registration and generic callback presentation, the "loose coupling between A and B" nevertheless delivers "high cohesion", since there is a 3rd (space) and 4th (time) dimension to the game that is captured outside the service realm by the social context. While Internet players A are anonymous to "the system", they are typically known to phone users B.

Given that FRISB is a "light communications product" with a high degree of informality, connections are rendezvoused between friends, where for example, either player may send the other an advanced game notification using any of a number of existing collateral communication channels (including email, instant text and even short telephone calls), establishing "the space" (who is on the net and fixed, who is mobile) and "the time" (to play).

For example, a typical rendezvous is where user A sends contact B a mobile short message such as "frisb in 5 mins?" and on being acknowledged, establishes the desired connection by spinning a disc to B who then "catches and returns the missed call to A" within the established window. Conversely B can invite Internet user A into the game by sending a text message to telephone number A, requesting a disc ("spin me a disc in 5 mins?").

Continuing with multiplayer FRISB . . .

By permitting multiple discs addressed to the same B phone player, the service registers multiple "B net extensions", as per the SOLO protocol described above with reference to FIG. 33. As illustrated in the above embodiment, when B returns the gateway "group rings all the associated extensions". That is all the B registered discs ring "in parallel", where the first disc to then "catch the call" and thereby answer and establish communication, becomes the active "player".

In this instance, when caller B returns, all such registered discs go green (ring), and the moment the first disc answers, all the remaining discs go orange (indicating a "missed call"). Since the connection is rendezvoused as previously described, the user A that addresses phone destination B "last" (most recently) is typically the one to catch the return, since in all likelihood the prearranged call arrives within the automatic answer window.

This "game theory" permits anonymous disc players "A1 A2 . . . An" to spin discs to a single phone player B and yet still establish the desired connection without any additional address information and manual player selection on the return. Further, "multiplayer" engagement delivers a powerful new way to conference call on the fly.

Unlike conventional "multiple endpoint registrations", where a single user registers multiple VOIP phones at different locations (home, work, travel, mobile, fixed etc.) and where "ringing all" permits the single owner to pick up at the preferred location, the multiple disc registrations disclosed here actually represent multiple players "clustered around a commonly registered phone identity".

Continuing with the "ring all, first to answer wins" as described, once phone user B has connected with player A1, B may place the active call on hold and redial the service gateway to establish a second connection with another player. Since player A1 is already connected to caller B and the endpoint (extension) is engaged, the second call from phone user B now rings all the remaining discs "A2 A3 . . . A(n)".

In this call topology, the next disc player to pickup, "A2 then A3 and so on", may thus be conferenced, on the legacy network side, into the already established connection with player A1, using well understood fixed and mobile network handset functionality. In such a multiplayer game, the phone acts as the "conference moderator", selectively adding and removing discs (note, in the above examples for legibility, A1 is assumed to be the most recent player).

Phone player B can invite and rendezvous connections with friends around the world who spin virtual discs "catch the return" and get placed into conference without cost whatsoever. Once again given the "informal" nature of the service, any particular player who answers a call and is not intended to participate in the desired conference, disconnects and lets the next disc ring unanswered.

Legacy conferencing serves to illustrate how "truly converged networks", networks that connect tangentially as symbolized by the infinity "∞" symbol, rather than networks that overlap and intersect and where the resultant total sum is less than the individual parts, leverages service capability on one network without replicating the functionality on the another. The conferencing functionality available on legacy telephones and networks thus obviates the need to build out call bridging functionality on the net.

In a further embodiment, disc anonymity may be supplemented with an "IP geo tagging" service that automatically pinpoints the Country and/or City associated with the browser IP address. By example, if player A1 spins a disc from an IP address range allocated to USA CA state, then the registry may tag the disc with the region identified and announce the disc "source" to the caller B using standard text to speech.

Given the social context to the game, announcing a Country and City player list (for example announcing players from "US CA dot", "IL dot", "ZA dot" and so on) is sufficient to indicate selection to the caller. Additional standard IVR interactivity may permit the caller to select individual, multiple and all players.

Clearly, the service website may offer additional personalization features, permitting players to personal their game. For example, the user may enter a "handle" to identify the disc. Typically this handle would be the user's first name, nickname or simply the first and last initials, as in "AK", since discs tagged with just two and three letters will have relevance to the sender and receiver. In this instance the Gateway IVR may then announce a quick "AB" player list for caller selection.

Identifying players by their initials have the additional "interactive" advantage in that IVR announcements are crisp and caller interaction minimal. Announcing the player(s) prior to connecting the call back to browser delivers "secondary caller line identification" that personalizes a shared gateway access telephone number. This contains caller "exposure" in that the caller may disconnect from the service prior to ringing the browser, allowing the caller to "exit the game" without offending a player.

Alternatively, the disc player may select a feature to personalize the disc by voice, wherein the web service initiates a registration call to capture a player "sound bite", where by example, users announce and identify themselves by speaking their name, which is then stored for play back at the servicing gateway. Such personalization may also be automatically engaged on sending a first disc from the connecting browser. The identifying sound bite may also be locally recorded on the browser device itself and sent to the service registry for play back at the Gateway.

In further identification embodiments, Internet player lists may be presented to the disc identified telephone using alternate bearers and protocols. In one such embodiment, phones may receive an SMS message listing the players and the associated Gateway access number. This permits instant and "silent" selection, where the phone user may dial the Gateway number embedded in the SMS and immediately key the initials, for example pressing "25" to select player "AK", without having to listen to IVR prompts.

In a related embodiment, the user may at any time ring the Gateway and disconnect the call prior to answering, and thereby "ping the gateway" and request delivery of such an SMS player list at no cost. In yet a further embodiment FRISB telephones identified by internet users may register their email address with the service and receive email notifications of players and pending games.

In a more tightly coupled version of the game, discs arrive on the destination telephone presenting a Gateway access number that uniquely associates and identifies "internet player A to telephone number B", as per the PICO protocol described. This "primary identification" permits phone disc recipients to screen Internet invites by number.

Significantly, as the game revolves around the identified legacy phone number B and since the FRISB phone is embedded directly in the web browser page and is automatically loaded and registered when accessed, FRISB can present a "viral B" telephony link to global free communication.

In what can best be described as a "reverse disc spin", where telephone user B, rather than net user A, invites users into the game, FRISB delivers a compelling email signature line, as illustrated by the following "tel net link" example:
"www.frisb.com/14154125111"

This "1click 2global free telecommunications" link instantly presents the browser embedded and automatically registered FRISB session programmatically preaddressed to the linked phone number, allowing any internet user to establish a frictionless global callback session without any specialized client software, setup and cost.

Since everyone knows their own telephone number, and anyone can send such a text link "without permission", the disclosed method and system could create the delivery of a pushed and virally propagated service, once again, without downloading software, without registering for service and without paying to connect and talk.

While "call buttons" can mask the phone identity and may be easily generated using well known scripting methods (for example, entering a phone number in a web page that generates the associated and automatically constructed web object), the value in displaying the actual URL in "clear text" as shown above, is it virally propagates the service "forward with instruction". That is, it shows recipients of a FRISB telephony link how to construct and send their own telephony link onwards to others.

In a related embodiment, the FRISB architecture similarly extends game playing directly over the Internet between two browsers, in addition to playing between Internet and phone. "FRISB on the net" is a uniquely self discovering service that instantly matches two discs launched on the same URL, connecting them peer to peer.

In this related embodiment, Internet users A1 and A2 share a "secret disc handle" over a complimentary communications channel such as SMS, email or conventional phone call, to engage a new category of speech dubbed "Instant Voice". By example, A1 and A2 share the alpha(numeric) disc handle "panther" launched on the following link:
www.frisb.com/panther Using an adapted ENUM ("ANUM") variant to cater for alphabetic service name distribution, the FRISB server renders a realm that encodes the handle according to the following algorithm:

1. IF the first disc letter is alpha then it constitutes the L3 domain (as with the "p" in "p.frisb.com" for "panther")

2. IF the first disc letter is numeric then the handle is prefixed with a leading alpha character to prevent zone intersection with the legacy phone realm. For example, if the shared secret handle is "147ak", the system registered handle would be "ZI47AK"

3. Every subsequent letter is encoded using the ABC/2 alpha/numerical mapping schema as displayed on the conventional mobile keypad, to deliver a sufficiently distributed digital zoning schema.

4. The resultant domain is reversed as per the ENUM specification

Using the above, the resultant DNS tree has "A through Z" as the primary L3 delegated zone, each followed by numeric L4 and greater zones as per the ABC/2 encoded schema. Thus, a "PANTHER" titled disc (capitals for emphasis) would result in the following registered domain:
7.3.4.8.6.2.P.frisb.com Where the ABC/2 encoding on the reversed dotted PANTHER string, excluding the first letter, is R.E.H.T.N.A.(P) yields the numeric sequence:
pqRs/7. dE3. gHi/4. Tuv/8. mNo/6. Abc/2. (P)

Describing the discovery process in more detail, user A1 enters the "www.frisb.com/panther" URL into a browser. FRISB returns with the embedded phone applet page as described above. Panther A1 goes red.

On successfully embedding the phone applet, the disc programmatically registers itself on the ANUM URI realm, as above. Panther A1 goes orange.

On disc registration, disc A1 invites a connection, using the same URI it registered with, to locate its mated pair.

During this invite, disc A1 "engages its line", that is it goes off hook rejecting any incoming call, to prevent a loop back connection with itself.

Since A2 has not yet linked to "www.frisb.com/panther", the initial invite by A1 fails to locate its mated disc.

A2 now enters the "www.frisb.com/panther" URL into a browser and loads as above. Panther A2 goes red.

On disc registration disc A2 now similarly invites a connection with "itself" in an attempt to locate its mated pair. During this invite, disc A2 similarly "engages its line" to prevent a loop back connection.

Since A1 is linked and registered as "panther", A2 locates its mated pair.

Disc A1 instantly goes blue, automatically answering the call and skipping the ringing state green, in one embodiment.

Disc A2 similarly goes blue on detecting call answer by A1.

The connection establishment is as magnetic as it is redefining. Discs "pop into the blue" to deliver "instant voice" between two commonly linked browsers. Metaphorically speaking, FRISB over the net delivers an "IP Intercom" on the fly.

If A1 or A2 inadvertently discovers and connects to an unknown A3 opening the same disc handle at the same moment in time, "serendipity connects two strangers". If stronger disc channel privacy is required, users select longer and more personal disc handles.

The FRISB experience veils IP Telephony "systems complexity", much as the "on/off" light switch masks a billion dollar power grid delivering electricity to the mass consumer. By insulating the user from the "tangled wires and underlying circuitry", from all the setup, configuration and the overwhelming arrays of non essential IP telephony features, FRISB allows Internet and telephone users to "connect and talk".

By converging technology and culture without, FRISB delivers a service, where the net essence delivers a core frictionless, and where the telephone engages "virtually" at the pinnacle of the telephony real estate, inviting the phone user into the game via the "missed call presentation manager".

Operating as it does on the defining Internet link and exclusively on "the most pivotal key in the cellular universe", FRISB is engaged with "1 link" on the web and "1 click" on the phone. User A clicks a link and B presses SEND (Green) in order to return the disc, to call the gateway, and establish the connection back to the net player. FRISB hooks into the "mass click and dial stream".

Further in leveraging existing mobile telephone technology and mobile commerce on the reverse caller association and connection establishment from "phone back to net", FRISB and the disclosed methods and systems, inherit the mass established cellular billing model without coercing payment on the net.

By preserving the "mass net free proposition" thus, playing digital FRISB pulls the "mass mobile paying" into the game, potentially generating additional inbound (interconnect) revenue for the Internet Service Provider in terminating the call on net, rather than incurring the outbound (terminating) penalty which would be the conventional forward VOIP switching case.

The plurality of systems methods and protocols disclosed describe varying degrees of "coupling" between IP and Telephony domains. Individually and collectively the methods and systems yield a new class and order of IP switching matrices between conventional and Next Generation Networks. The disclosed systems methods and protocols described above may be summarized as depicted in FIGS. 44 through 48.

FIG. 44

NANO. Number as named object.

NANO delivers a "1:many:1" (Telephone B to VOIP A to Telephone B) switching relationship. As disclosed, advance association with B automatically establishes a numbered VOIP client with contacts A. Many VOIP users A(xyz) can be reached by one telephony user B, who conversely may be reached by many VOIP users, when "ON net" as disclosed.

Figure 44:
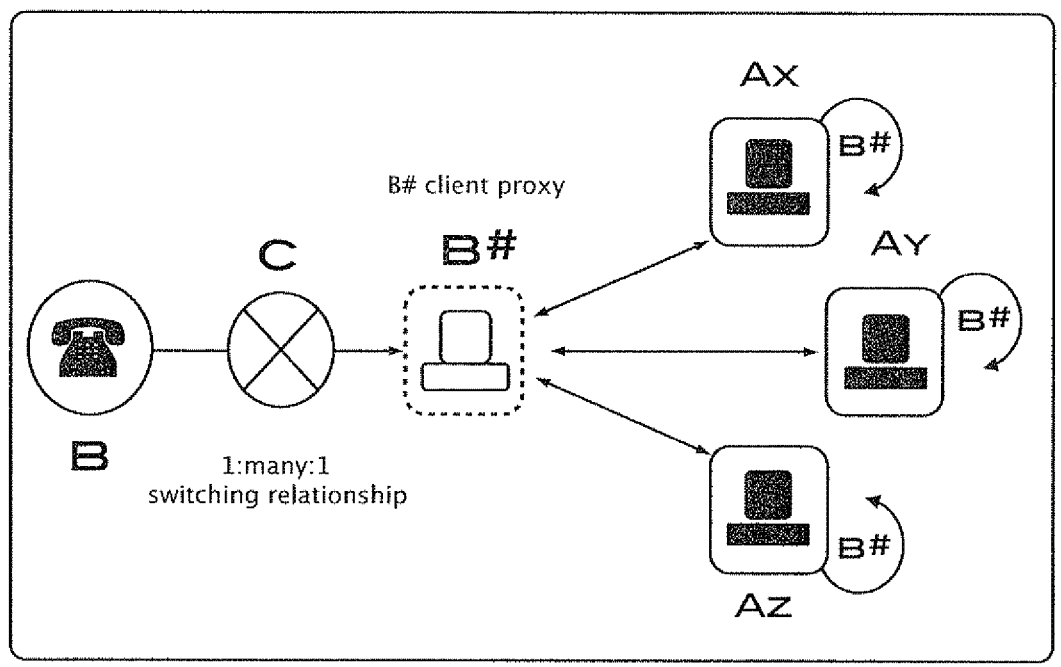
FIG. 44: NANO (Number As Named Object) "1:many:1" switching.

This switching matrix is depicted in FIG. 44. Telephone user B dials gateway C, where users A, who have previously identified B by number, are presented as "net contacts". C instantiates VOIP client proxy B(#) that publishes "B online tele-presence indication" to users A, permitting them to terminate outgoing connections on net with B, via the proxy.

FIG. 45

ALTO. Authenticated line to owner.

ALTO delivers a "many:1" (Telephone B to VOIP A) switching relationship. As disclosed, VOIP client A registers an existing legacy phone number A # as net alias. Participating legacy network operators assign a symbolic net prefix (#) that permits users to dial IP direct on the prefixed number, thereby connecting to the net aliased client. Many phone users B can thus reach one VOIP user A, who has aliased their net identity.

Figure 45:
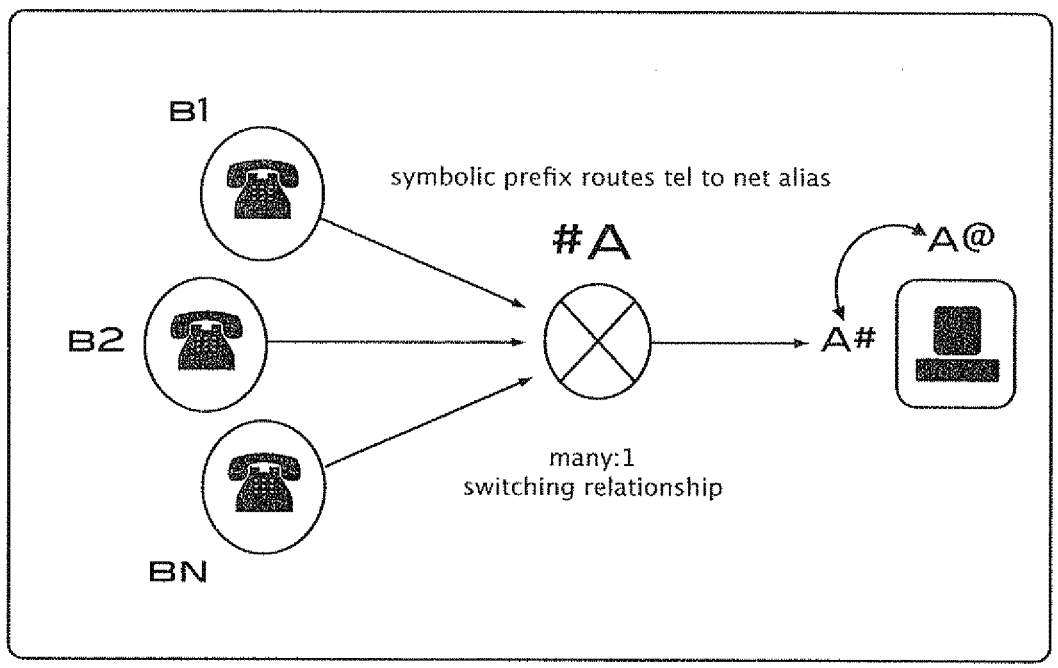
FIG. 45: ALTO (Authenticated Line To Owner) "many:1" switching.

This switching matrix is depicted in FIG. 45 (F45). Legacy telephone users B symbolically prefixes phone number A registered to VOIP user A. The originating switch routes the connection on the prefix to a servicing IP gateway, which maps the A number to the VOIP A user address, ringing the net client.

FIG. 46

UNNO: Universal net number.

UNNO delivers a "1:1" (Telephone B to VOIP A) switching relationship. As disclosed, a universal carrier independent Virtual Country prefix uniquely routes to registered VOIP user A resolved using ENUM NAPTR recorded on a private or public domain.

Figure 46:
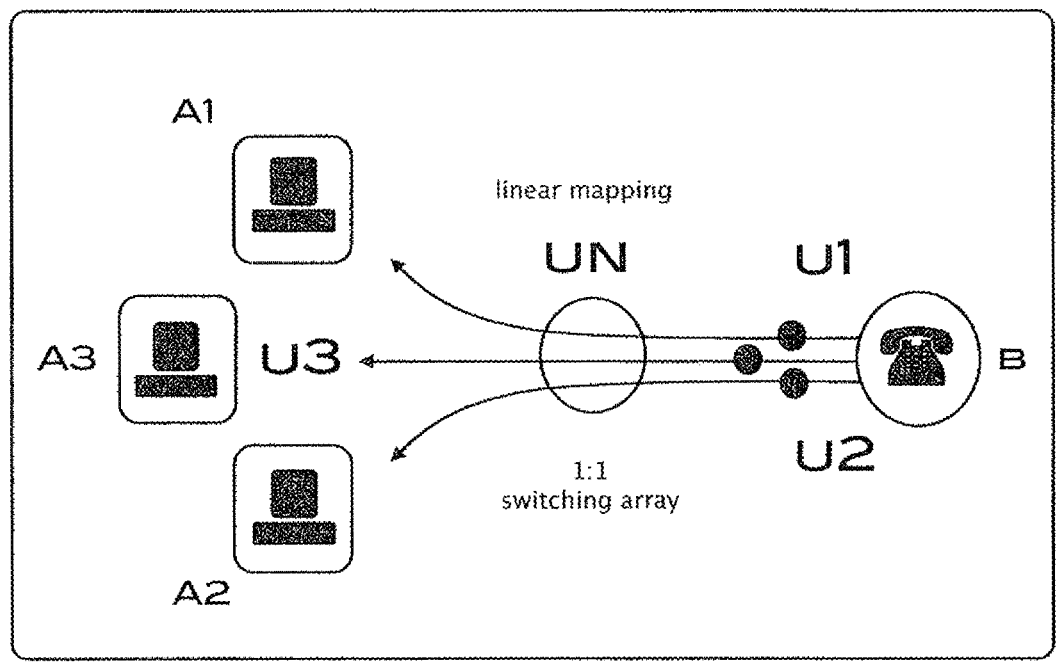
FIG. 46: UNNO (Universal Net Number) "1:1" switching.

This switching matrix is depicted in FIG. 46 (F46). Telephone user B dials a triple digit country code prefix that in one embodiment resolves on Global Title Translation to an Internet Multimedia Subsystem (IMS) node on the originating network. IMS resolves the dialed digits via DNS to the appropriate URI.

FIG. 47

PICO: Paired index coupling.

PICO delivers a "many to many" (Telephone B to VOIP A) switching relationship. As disclosed, Gateway C automatically slot assigns each VOIP user A dialing phone B a uniquely paired DID number from a shared pool of Gateway numbers. Many VOIP users A can thus present a primary calling line identity to B who can then directly dial many VOIP users A.

Figure 47:
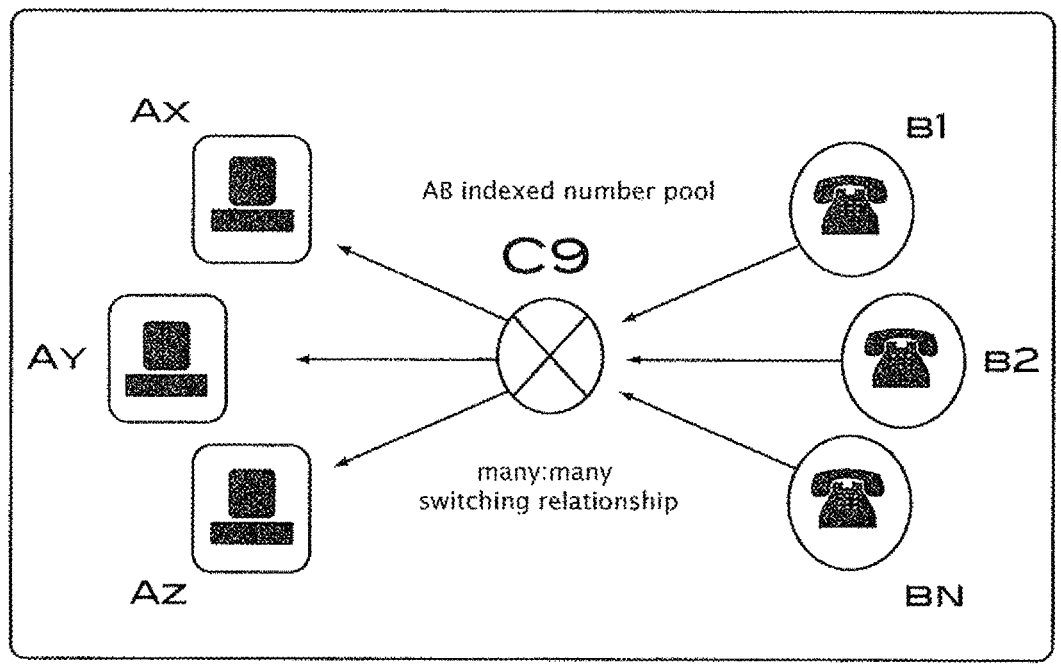
FIG. 47: PICO (Paired Index Coupling) "many-many" switching.

This switching matrix is depicted in FIG. 47 (F47). Telephone user B dials gateway access number C(N), which indexes the B array to determine the assigned VOIP user identity A. The number pairing is only unique between A and B and typically just "10 base pairs" (C0 through C9) are sufficient to uniquely map all phones B with all their net contacts A.

FIG. 48

SOLO. Switched on line origination.

SOLO delivers a "1:many" (Telephone B to VOIP A) switching relationship. As disclosed, anonymous VOIP clients A enter phone number B to register as "B net extension" on an ENUM realm. One telephony user B can thus reach many linked VOIP users A.

Figure 48:
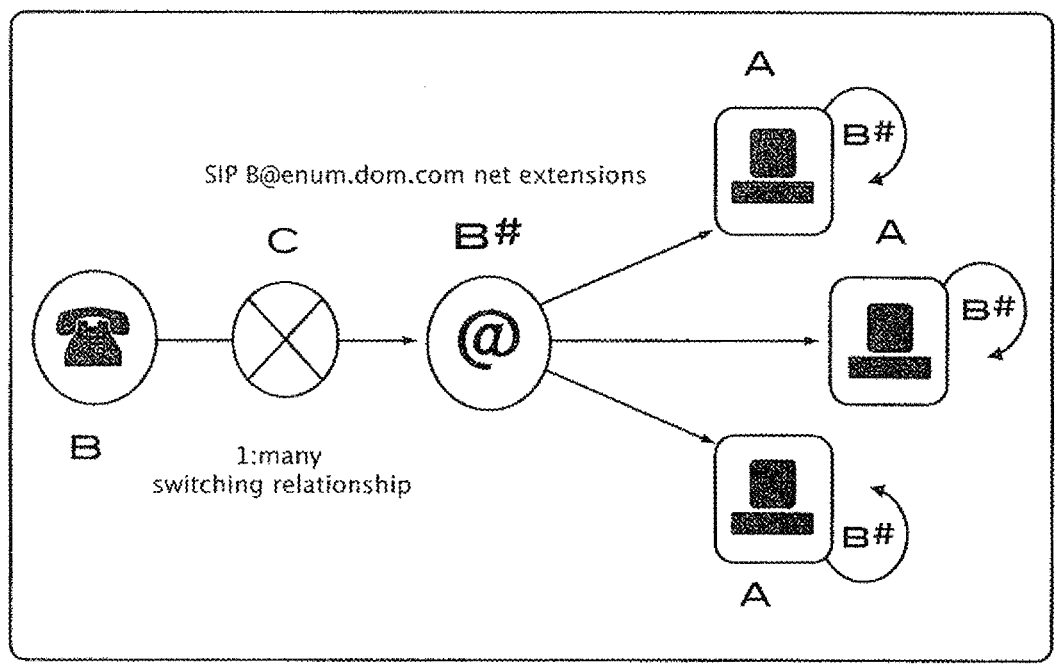
FIG. 48: SOLO (Switched On Line Origination) "1:many" switching.

This switching matrix is depicted in FIG. 48 (F48). Telephone user B dials gateway C, which formulates a SIP ENUM URI on the B calling identity, that in one embodiment locates and group invites all net extensions A. Alternatively C invites the last registered extension first.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A system comprising:
a computing device that is configured to:
  determine a telephone number associated with a user using an Internet connected device;
  determine a calling line identity;
  associate the telephone number and the calling line identity in a memory of the computing device;
  provide to a telephony network an instruction to initiate a phone call;
  wherein the instruction comprises:
    the telephone number and
    the calling line identity;
  receive a submission from the Internet connected device;
  compare at least part of the submission to the calling line identity in the memory of the computing device; and
  recognize the telephone number as an authenticated telephone number when the at least part of the submission matches the calling line identity in the memory of the computing device.

2. The system of claim 1, wherein the computing device is further configured to associate the authenticated telephone number with a Voice Over Internet Protocol (VOIP) identity of the user.

3. The system of claim 1, wherein the computing device is further configured to dynamically assign the calling line identity to the user.

4. The system of claim 1, wherein the computing device is further configured to randomly generate the calling line identity.

5. The system of claim 1, wherein the calling line identity is unique to the user.

6. The system of claim 1, wherein the computing device is further configured to:
initiate a timer after providing the telephony network with the instruction to initiate the phone call; and
reject the telephone number as the authenticated telephone number when the submission is received after the timer has expired.

7. The system of claim 2, wherein the computing device is further configured to record the associated between the authenticated telephone number and the VOIP identity of the user in an Internet registry.

8. The system of claim 1, wherein the computing device is a gateway.

9. The system of claim 1, wherein the computing device is further configured to establish a virtual account of the user based on the authenticated telephone number.

10. The system of claim 1, wherein the computing device is further configured to determine the telephone number associated with the user, by receiving the telephone number from the user via the Internet connected device.

11. A method comprising:
determining, by at least one computing device, a telephone number associated with a user using an Internet connected device;
determining, by the at least one computing device, a calling line identity;
associating, by the at least one computing device, the telephone number and the calling line identity in a memory of the computing device;
providing, by the at least one computing device, to a telephony network an instruction to initiate a phone call;
wherein the instruction comprises:
  the telephone number and
  the calling line identity;
receiving, by the at least one computing device, a submission from the Internet connected device;
comparing, by the at least one computing device, at least part of the submission to the calling line identity in the memory of the computing device; and
recognize the telephone number as an authenticated telephone number when the at least part of the submission matches the calling line identity in the memory of the computing device.

12. The method of claim 11, further comprising:
associating, by the at least one computing device, the authenticated telephone number with a Voice Over Internet Protocol (VOIP) identity of the user.

13. The method of claim 11, further comprising:
dynamically assigning, by the at least one computing device, the calling line identity to the user.

14. The method of claim 11, further comprising:
randomly generating, by the at least one computing device, the calling line identity.

15. The method of claim 11, wherein the calling line identity is unique to the user.

16. The method of claim 11, further comprising:
initiating, by the at least one computing device, a timer after providing the telephony network with the instruction to initiate the phone call; and
rejecting, by the at least one computing device, the telephone number as the authenticated telephone number when the submission is received after the timer has expired.

17. The method of claim 12, further comprising:
recording, by the at least one computing device, the associated between the authenticated telephone number and the VOIP identity of the user in an Internet registry.

18. The method of claim 11, wherein the computing device is a gateway.

19. The method of claim 11, further comprising:
establishing, by the at least one computing device, a virtual account of the user based on the authenticated telephone number.

20. The method of claim 11, further comprising:
determining, by the at least one computing device, the telephone number associated with the user, by receiving the telephone number from the user via the Internet connected device.

* * * * *